(12) United States Patent
Migdal et al.

(10) Patent No.: US 6,208,347 B1
(45) Date of Patent: Mar. 27, 2001

(54) SYSTEM AND METHOD FOR COMPUTER MODELING OF 3D OBJECTS AND 2D IMAGES BY MESH CONSTRUCTIONS THAT INCORPORATE NON-SPATIAL DATA SUCH AS COLOR OR TEXTURE

(75) Inventors: Alexander A. Migdal; Blaise Aguera-Arcas; Alexei Lebedev, all of Princeton, NJ (US)

(73) Assignee: Real-Time Geometry Corporation, Short Hills, NJ (US)

( * ) Notice: Subject to any disclaimer, the term of this patent is extended or adjusted under 35 U.S.C. 154(b) by 0 days.

(21) Appl. No.: 08/881,874

(22) Filed: Jun. 23, 1997

(51) Int. Cl.[7] .......................... G06T 15/00; G06T 17/00; G06T 17/20
(52) U.S. Cl. ......................... 345/419; 345/420; 345/423
(58) Field of Search .................................. 345/423, 428, 345/419, 430, 431, 420; 382/289, 299, 300, 232

(56) References Cited

U.S. PATENT DOCUMENTS

| | | |
|---|---|---|
| 4,888,713 | 12/1989 | Falk . |
| 4,912,664 | 3/1990 | Weiss et al. . |

(List continued on next page.)

FOREIGN PATENT DOCUMENTS 0 747 862 A2  11/1996  (EP) .

OTHER PUBLICATIONS

Silicon Graphics Indigo[2] Impact Website, http://www.sgi.com/Products/hardware/Indigo2/tech.html, Printed Jun. 22, 1997.
Silicon Graphics Technology Website, http://www.sgi.com/Products/hardware/desktop/tech.html, Printed Jun. 22, 1997.
Certain, Andrew et al., "Interactive Multiresolution Surface Viewing", SIGGRAPH 96 Conference Proceedings, pp. 91–98, 1996.
Lindstrom, Peter et al., "Real–Time, Continuous Level of Detail Rendering of Height Fields",SIGGRAPH 96 Conference Proceedings, pp. 109–117, 1996.
Schroeder, William J. et al., "Decimation of Triangle Meshes", *Computer Graphics,* 26(2) pp. 65–70, Jul. 1992.

(List continued on next page.)

Primary Examiner—Mark R. Powell
Assistant Examiner—Chante Harrison
(74) Attorney, Agent, or Firm—Kenyon & Kenyon

(57) ABSTRACT

A system and method for modeling 3D objects and 2D images by wireframe mesh constructions having data points that combine both spatial data and surface information such as color or texture data. The use of the complex data points (e.g., X, Y, Z, R, G, B in 3D and x, y, R, G, B in 2D) allows the modeling system to incorporate both the spatial features of the object or image as well as its color or other surface features into the wireframe mesh. The present invention's 3D object models (such as those created by laser scanning systems) do not require a separate texture map file for generating display or other object manipulations. In an exemplary embodiment, the mesh constructions of the present invention contain sufficient color information such that the triangles of the meshes can be rendered by any processor supporting linear or bilinear interpolation such as Gouraud shading (available in many 3D and 2½D systems). For 2D systems (such as digitized photographs, film frames, video frames and other bitmap images) the 2D mesh models created from the teachings of the present invention replace bitmap files and present a greater level of data compression and flexibility in image manipulation than is currently available in compression systems such as JPEG. In addition, the presented modeling system has dynamic resolution capability, such that surface details like color or texture can be rapidly added or subtracted from the model.

3 Claims, 37 Drawing Sheets

U.S. PATENT DOCUMENTS

| | | |
|---|---|---|
| 4,933,889 | 6/1990 | Meshkat et al. . |
| 4,941,114 | 7/1990 | Shigyo et al. . |
| 4,994,989 | 2/1991 | Usami et al. . |
| 5,125,038 | 6/1992 | Meshkat et al. . |
| 5,175,806 | 12/1992 | Muskovitz et al. . |
| 5,193,145 | 3/1993 | Akeley . |
| 5,214,752 | 5/1993 | Meshkat et al. . |
| 5,255,352 | 10/1993 | Falk . |
| 5,257,346 | 10/1993 | Hanson . |
| 5,333,245 | 7/1994 | Vecchione . |
| 5,343,558 | 8/1994 | Akeley . |
| 5,367,615 | 11/1994 | Economy et al. . |
| 5,369,736 | 11/1994 | Kato et al. . |
| 5,379,371 | 1/1995 | Usami et al. . |
| 5,381,526 | 1/1995 | Ellson . |
| 5,398,307 | 3/1995 | Arakawa . |
| 5,410,644 | 4/1995 | Thier et al. . |
| 5,440,674 | 8/1995 | Park . |
| 5,448,686 | 9/1995 | Borrel et al. . |
| 5,448,687 * | 9/1995 | Hoogerhyde et al. ............... 345/125 |
| 5,465,323 | 11/1995 | Mallet . |
| 5,471,566 | 11/1995 | Kirk . |
| 5,495,429 | 2/1996 | Craven et al. . |
| 5,504,845 | 4/1996 | Vecchione . |
| 5,519,515 | 5/1996 | Komatsu . |
| 5,522,019 | 5/1996 | Bala et al. . |
| 5,528,737 | 6/1996 | Sfarti . |
| 5,535,315 | 7/1996 | Itoh . |
| 5,550,960 | 8/1996 | Shirman et al. . |
| 5,553,206 | 9/1996 | Meshkat . |
| 5,553,208 | 9/1996 | Murata et al. . |
| 5,555,532 * | 9/1996 | Lucas .................................... 345/423 |
| 5,561,746 | 10/1996 | Murata et al. . |
| 5,561,749 | 10/1996 | Schroeder . |
| 5,579,454 | 11/1996 | Billyard et al. . |
| 5,581,673 | 12/1996 | Kikuchi . |
| 5,586,246 | 12/1996 | Nobori et al. . |
| 5,590,248 | 12/1996 | Zarge et al. . |
| 5,602,979 | 2/1997 | Loop . |
| 5,617,322 | 4/1997 | Yokota . |
| 5,748,865 * | 5/1998 | Yamamoto et al. ................. 345/423 |
| 5,774,124 * | 6/1998 | Itoh et al. ............................. 345/423 |
| 5,886,702 * | 3/1999 | Migdal et al. ....................... 345/423 |
| 6,046,744 * | 5/2000 | Hoppe .................................. 345/419 |
| 6,064,771 * | 5/2000 | Migdal et al. ....................... 382/232 |

OTHER PUBLICATIONS

Hoppe, Hugues et al., "Mesh Optimization", Computer Graphics Proceedings/Annual Conference Series, pp. 19–26, 1993.

DeRose, Tony et al., "Fitting of Surfaces to Scattered Data", Proceedings of the SPIE—The International Society for Optical Engineering, vol. 1830, pp. 212–220, 1992.

Hoppe, Hugues, "Surface Reconstruction from Unorganized Points", PhD thesis, Department of Computer Science and Engineering, University of Washington, Jun. 1994 (TR 94–06–01).

Eck, Matthias et al., "Multiresolution Analysis of Arbitrary Meshes", Computer Graphics Proceedings, Annual Conference Series, pp. 173–182, 1995.

Hoppe, Hugues, "Generation of 3D geometric models from unstructured 3D points"Microsoft Corporation.

Agishtein, Michael E. et al., "Smooth Surface Reconstruction from Scattered Data Points", *Comput. & Graphics,* vol. 15, No. 1, pp. 29–39, 1991.

Hoppe, Hugues, "Progressive Meshes" SIGGRAPH 96 Conference Proceedings, pp. 99–108, 1996.

Hoppe, Hugues, "View Dependent Refinement of Progressive Meshes",SIGGRAPH 97 Conference Proceedings, pp. 217–224, 1997.

* cited by examiner (PLURALITY OF DATA POINTS)

(TEXTURE)

TEXTURE MAP MESH
(Low Resolution Construction)

TEXTURE MAP MESH
(Middle Resolution Construction)

TEXTURE MAP MESH
(High Resolution Construction)

TEXTURE MAP MESH
(Return to Middle Resolution Construction)

TEXTURE MAP MESH
(Return to Low Resolution Construction)

Low Resolution Image
Generated From Mesh at Fig. 2c

Image Generated From Mesh of Fig. 2d

Image Generated From Mesh of Fig. 2e

A Mesh Construction of 2D Photo Image

Digitized Photographic Image

SYSTEM AND METHOD FOR COMPUTER MODELING OF 3D OBJECTS AND 2D IMAGES BY MESH CONSTRUCTIONS THAT INCORPORATE NON-SPATIAL DATA SUCH AS COLOR OR TEXTURE

CROSS-REFERENCE TO RELATED APPLICATIONS

This application is related to:

Co-pending U.S. patent application entitled "System and Method for Asynchronous Compression and Decompression of Graphic Images Based on 2D and 3D Data" filed on even date herewith;

Pending U.S. patent application Ser. No. 08/730,980, entitled "System and Method for Rapidly Generating an Optimal Mesh Model of a 3D Object or Surface" filed on Oct. 16, 1996; and Pending U.S. patent application Ser. No. 08/730,979, entitled "System and Method for Computer Modeling of 3D Objects or Surfaces by Mesh Constructions Having Optimal Characteristics and Dynamic Resolution Capabilities" filed on Oct. 16, 1996.

Each application referenced above is expressly incorporated herein by reference.

FIELD OF THE INVENTION

The present invention relates to the field of computer-aided object, surface and image modeling, with relevant applications in other fields, including without limitation computer graphics, animation, surface mensuration and mapping, security and identification systems, medical imaging and other imaging fields. In particular, the present invention relates to computer systems for mesh constructions that model three-dimensional ("3D") objects and two-dimensional ("2D") images. For 3D objects, the present invention permits construction of mesh models that represent 3D objects, terrains and other surfaces. The models have "dynamic resolution" capabilities such that the system of the present invention can incrementally add and remove points of detail from the mesh construction to create meshes that display the object in varying levels of detail. To create 3D mesh constructions, the present invention merges the spatial detail values (X, Y, Z—in 3D) of ordinary mesh data points with other detail values (such as color (R,G,B) or other non-spacial details) to build complex, spatial/texture "trixel map" data points such as a set of 6D (X, Y, Z, R, G, B) data points. The conglomerate or combined data points enable the system of the present invention to generate "trixel map" meshes which take into account both the spatial and color details of the object.

In addition to creating meshes to model 3D objects, the present invention can also be used to create mesh constructions which represent 2D images (photographs, film frames, video images and other images) which have been digitized to bit map or other formats. For 2D mesh constructions, the present invention combines the 2D spatial coordinate locations of the data (such as the x, y locations of the bitmap pixel coordinates with the associated color values, such as the R,G,B color assignments) to create a set of combined 5D (x,y,R,G,B) "tricture" data points. The present invention uses the 5D data point values to build a "trixel map" mesh which models the 2D image through its geometric mesh construction. Like the 3D object model described above, the 2D image models of the present invention have "dynamic resolution" capabilities.

Through its simplification techniques, the present modeling system is reductive both in its 2D and 3D applications. The simplification techniques reduce the number of data points needed to create quality images. The resulting mesh describes an object or image with good accuracy using far fewer data points than normally required by graphic systems using other techniques. Although the system stores information during simplification so that the system can make "lossless" transitions from a low to a high resolution mesh, it is noted that each instance of a simplified mesh model represents a "lossy" approximation of the original data which can be stored as a compression of the original object or image and transmitted by itself. Thus, in addition to the fields identified above, and without limitation, the present invention also relates to the field of data compression and decompression for graphic images.

The teachings of the presented system and method for incorporating non-spatial coordinates into mesh structures and using those combined values for building dynamic resolution mesh constructions can be applied generally. In addition to color and texture data, the present invention can be used to create mesh structure which incorporates other types of data which describe the surface of an object or terrain, for example, temperature data, energy absorption, or information concerning the object's structural or molecular properties.

BACKGROUND OF THE INVENTION

There is great interest in the improvement of computer graphic systems that use 3D and 2D data to create images. Current uses for visual images in graphic applications demand systems that store extensive image data more compactly, build images with greater control in detail resolution and process images with increased speed and efficiency. Although 3D and 2D graphic systems have different underlying methods for image generation, both have common difficulty in processing the massive amount of data necessary to generate still images and animated sequences with computational efficiency and convincing realism. Background on both 3D and 2D systems is presented as follows.

3D Data Systems

A 3D object modeling system typically generates a model of an object, terrain or other surface (hereinafter an "object") from input data and uses that model to create a display or reproduction of the object (such as a monitor display or printout). When a 3D object model replicates the entire surface of the object, a 3D graphics system allows a user to output or display images showing any side or face of the object from any vantage point. A user of a 3D graphics system can load a 3D object model into a viewer program and change his or her view of the object by commands to rotate the viewing window around the object or "zoom" close to or away from the object. A 3D graphics system builds more complex scenes by grouping different object models and viewing them together. For example, 3D object models for a chair, a boy, a lamp, and a book can be loaded into a viewer to show a boy sitting in a chair reading a book. As the 3D models contain information to show all sides of the objects in the scene, the user can rotate the viewing window and view the scene from all angles.

Because 3D object modeling systems can access complete three-dimensional information about each object depicted, they facilitate the construction of complex, interactive animated displays, such as those created by simulators and other user choice-based programs. Although 2D image generation systems currently predominate in the display and manipulation of graphic images, the use of 3D modeling systems is perceived as a more efficient way to present graphic information for interactive graphics, animated special effects and other applications and the use of such systems is growing.

3D systems construct object models from 3D spatial data and then use color or other data (called "texture data") to render displays or images of those objects. Spatial data includes 3D X, Y, Z coordinates that describe the physical dimensions, contours and features of the object. The current effort in computer graphics to incorporate more images of real-life objects into applications has fostered improvements in collecting 3D spatial data such as through the use of scanning systems. A scanning system uses a light source (such as a laser) to scan a real-world object and a data collection device (such as a camera) to collect images of the scanning light as it reflects from the object. The scanning system processes the captured scan information to determine a set of measured 3D X, Y, Z coordinate values that describe the object in question. Some scanning systems can easily gather enough raw data to generate several hundred thousand 3D data point coordinates for a full wraparound view of an object. A typical 3D object modeling system processes the 3D point data to create a "wire-frame" model that describes the surface of the object and represents it as a set of interconnected geometric shapes (sometimes called "geometric primitives"), such as a mesh of triangles, quadrangles or more complex polygons. The points can come to a 3D object modeling system either as a set of random points (i.e., a "cloud of points") with no information concerning shape (known as connectivity information) or the points can come with some connectivity information such as information indicating a "hole," for example, the space bounded by the handle of a tea cup.

Typical mesh modeling systems use the spatial data—the 3D X, Y, Z coordinates—either indirectly, in gridded mesh models, or directly, in irregular mesh models. Gridded mesh models superimpose a grid structure as the basic framework for the model surface. The computer connects the grid points to form even-sized geometric shapes that fit within the overall grid structure, determining the X, Y, Z locations for the grid points by interpolating them from collected spatial data points. There are various ways of creating gridded mesh representations, such as those shown in U.S. Pat. No. 4,888,713 to Falk and U.S. Pat. No. 5,257,346 to Hanson. While gridded models provide regular, predictable structures, they are not well-suited for mesh constructions based on an irregular set of data points, such as those generated through laser scanning. The need to interpolate an irregular set of data points into a regular grid structure increases computation time and decreases the overall accuracy of the model. Hence, modeling systems typically create an irregular mesh model, such as an irregular triangulated mesh, to represent a real-world object.

In addition to using spatial data, 3D mesh modeling systems also use texture data to display and reproduce an object. Texture data is color and pattern information that replicates an object's surface features. Typically, 3D object modeling systems maintain texture data separately from the "wire-frame" mesh and apply the texture data when rendering the surface features. Thus, object modeling systems typically include two distinct and separate processes: first, in a building phase, the system constructs a "wire frame" mesh to represent the object's spatial structure using only 3D X, Y, Z values and, second, during a rendering phase, the system applies the texture data to output a display or reproduction. "Texture mapping" or "texturing" is the part of the rendering phase process that overlays texture data on the geometric faces of a mesh model. The rough face of a brick, the smooth and reflective surface of a mirror and the details of a product label can all be overlaid onto a mesh wire frame model using texture mapping principles.

For models of real-world objects, texture data typically comes from 2D photographic images. The laser scanning systems described above can collect texture data by taking one or more 2D photographic images of the object in an ordinary light setting as they collect laser scan data. Thus, 3D scanning systems both scan an object with a laser to collect spatial data and photograph it to collect color and other surface characteristic information. The laser-collected 3D X, Y, Z coordinate values can be related and linked to specific points (i.e. pixel locations) in the digitized versions of the collected photo images. Commercially available video cameras output frames that can be digitized into a 2D matrix of pixels (e.g. 640×480 pixels in dimension), with each pixel having, for example, a three-byte (24 bit) red, green and blue (R, G, B) color assignment. Storage for each such video frame view then requires approximately 900 K (kilobytes) and the frame will typically be stored as a "bitmap" (such as in TIFF format). A 3D object modeling system will link each mesh face in the generated 3D mesh model to a specific area in the bitmap. The image can be stored as a texture map file and relevant areas of the image can be clipped as texture map elements for use in texture map overlays.

To output a fully-rendered view of the mesh model from a desired perspective, the currently available 3D graphics systems typically overlay corresponding texture map elements on the geometric mesh faces in view. This overlaying procedure presents some complications as the system must rotate and scale each texture map element to fit the image of the wire frame mesh as it appears to the viewer. The widely-followed OpenGL standard, for example, supports the scaling of texture map elements through a technique called "mipmapping". Mipmapping allows the texture map file to contain different-sized versions of each texture map element which the system uses as overlays for different-scaled views of the object.

In addition to the complications presented by the use of the texture data, the use of and demand for 3D modeling is hindered by large storage requirements. Most current systems continue to store both a file of mesh model data and a separate file of bitmap texture map data. Such a configuration imposes a high overhead on the system in terms of the memory needed to access and manipulate the object model. Texturing necessitates that the entire texture map file be loaded into a designated RAM cache, placing great strain on limited RAM resources. For example, a texture map file for a person's head might comprise texture elements from six photographic views of the head—one view for front, back and each side of the head plus a top and bottom view—as well as data necessary to partition the various texture elements and mipmaps. Also, texture has projectability problems. It may be necessary to use multiple textures of the same subject, either for topological reasons or to address projective distortions.

As the photographic images for each view require roughly 900 K of storage, a texture map comprising six views might require on the order of 5 Mb (megabytes). Even when the texture map data is stored in a compressed format, it still must be fully expanded when loaded into RAM for use. When several 3D object models are used for a complex display (such as a figure with background objects—trees and birds, for example), the amount of storage necessary for outputting all the objects in the display can be prohibitively large. The structure and size of the texture map file has also precluded or limited use of 3D applications on communication systems like the Internet, where bandwidth is limited and does not readily facilitate transfer and communication of such substantial object information files.

The use of the texture map file also creates time delays in processing images. Most systems require special graphics hardware for real-time performance. The extra hardware needed increases the cost of the system and, for the Internet, where most users access the system with more limited PC-type computers, such a hardware solution is not currently a viable option. Typically, a PC contains a graphics acceleration device such as a video graphics array (VGA) standard card which assists in "displaying" each image (i.e., rapidly outputting a set of pixel assignments from a window frame buffer to a display monitor). However, on the PC, the tasks of "transformation," (transforming the 3D X, Y, Z coordinates of the object model to "eye-space" coordinates for a particular view, lighting the object accordingly and projecting the image onto a "window space") and "rasterization," (the process of rendering "window-space primitives" such as points, lines and polygons for the particular view and designating detailed pixel color setting information such as texture map information and depth of field calculations), are typically performed by the PC's general-purpose "host" processor. For real-time speed, the correct object modeling systems typically need more advanced and more expensive computers employing special graphics hardware to perform the "transformation," "rasterization" and other processes.

In addition to problems with size requirements and processing delays, current 3D object modeling systems are also hampered by a lack of flexibility in controlling image detail or resolution. Current scanning systems can provide an abundance of data about an object, 3D object modeling systems typically use all of the data to create a single, very detailed 3D object model. However, in some applications, such as computer games and animated sequences, it is desirable that an object be represented in many different resolutions. For example, an object depicted from a distant viewpoint does not require the same level of detail as an object seen close-up. Moreover, as the available transmission bandwidth of the Internet places limitations on the amount of image detail any one image can carry, it would be desirable for a 3D object modeling system to have the capability to vary the level of resolution in the model and correspondingly, vary the texture map information. Such a system would have a modeling system which could display a mesh at many levels of resolution, from low to high, depending on the constraints of the system and the application. There are other systems for meshing which have the ability to optimize and incrementally add and remove points or edges from a mesh construction, such as shown by Hoppe (see, e.g., "Progressive Meshes" (SIGGRAPH 96) and "View-Dependent Refinement of Progressive Meshes" (SIGGRAPH 97) and others. While such systems can optimize and change resolution, inter alia, they typically require large amounts of processing time to prepare the mesh or do not provide a reliable visual representation of the object when the mesh contains few polygons.

Real limitations in the use of 3D graphics systems arise in part from the use of texture map files and the subsequent coordination of texture data with the spatial data in the mesh model. Therefore, it would be preferable to make such coordination more efficient or to incorporate the texture map data into the mesh model and thus eliminate texture map data as a separate element altogether. A new system and method for modeling 3D objects that eliminates the need for the texture map file, permits more compact storage of the 3D object model and provides a rapid, flexible system to create and vary the resolution of the object model would represent an advance in the art. The reduced storage needs of such a system and its flexibility in specifying resolution would enable the object model to be easily transmitted across a communication system like the Internet and would allow for faster image display and manipulation without advanced hardware.

2D Data Applications

Although 3D object modeling and display systems represent the future in many interactive applications, 2D image display systems continue to have great utility for graphic representations. It would be an advantage to improve the efficiency of such systems, especially in the way they process picture data such as bitmap data. As described above, a bitmap is a 2D array of pixel assignments that when output creates an image or display. The computer "reads" photographs, film and video frame images in bitmap format, and such 2D bitmap images constitute very large data structures.

2D image display systems share with 3D object modeling systems the fundamental problem of data storage. It is not uncommon for a single 2D image to comprise a bitmap matrix of 1,280×1,024 pixels where each pixel has a 3 byte (24 bit) R, G, B color depth. Such an image requires approximately 4 Mb of storage. A typical frame of raw video data digitizes to a computer image 640×480 pixels in dimension. As stated above, if each pixel has a 3 byte color assignment, that single frame requires approximately 900 K of storage memory. As film and video typically operate at 24–30 frames per second to give the impression of movement to the human eye, an animated video sequence operating at 30 frames per second requires roughly 26 Mb of pixel assignment information per second, or 1.6 Gb (gigabytes) per minute. Even with enhanced RAM memory capabilities, the storage requirements of such 2D images can impede the operating capacity of the common PC; processing a single image can be difficult and processing an animated sequence is impossible without special video hardware. The size of these image files makes them unwieldy to manipulate and difficult to transport. For example, a user wishing to download a 2D image from an Internet or other communication system site to a PC typically finds the process slow and cumbersome. Such a constraint limits the use of 2D images in many applications, including the new, interactive Internet web applications.

Currently, graphic data compression techniques provide some answer to the impediments posed by 2D bitmap data storage requirements. Such procedures replace raw bitmap data with an encoded replica of the image. Compression techniques are known as either "lossless," meaning that they lose no data in the encoding process or "lossy," meaning that they discard or lose some of the original bitmap data to achieve a high compression factor. One widely used "lossy" compression standards for still 2D images is the JPEG (Joint Photographic Experts Group) standard. JPEG compresses individual photographs or video frame images following a technique that takes advantage of the image's specific spatial structure. Within the image's color area, JPEG will disregard or homogenize certain pixel information to remove redundant information and thus reduce the overall size of the digitized image for storage and transport. However to display an image, a compressed JPEG file must be decompressed.

JPEG and other similar currently available compression systems possess real advantages for the compression and decompression of image data in certain circumstances.

However, there are also drawbacks to these systems. JPEG represents only a method for data reduction; it is a compression process used mainly for storage. Its compression, which occurs on a pixel by pixel basis, goes far in reducing the overall size of the data chunk needed to store an image but at low resolutions the image quality becomes unacceptable. Moreover, the compression is not continuously dynamic such that details cannot be easily added or removed from an image. For small memory spaces, (such as those needed to send and transmit files via the Internet in real-time) the quality of the image can deteriorate sharply. Further, when a JPEG file is loaded into RAM it must be decoded and expanded before it can be used thus limiting for real time applications some of the compression benefit. (JPEG's "progressive buildup" extension, which outputs a rendering of an image in detail layers, offers some relief for systems which display JPEG files on the fly, but progressive JPEG is time consuming and, ultimately a quality resolution image requires a substantial block of RAM space, and the resolution of the image cannot be dynamically changed.) In addition, although JPEG standard users have some choice in determining the level of compression and the amount of "lossiness," JPEG's flexibility is limited by the way in which it reads and modifies the graphic image.

A system for modeling 2D images that lent an overall structure or model to the image and subsequently compressed data based on structure rather than on individual pixel values would allow greater compaction and more flexibility of use. Such a system would not only reduce the amount of data necessary to store and transmit a 2D image but would also provide other capabilities, such as the ability to vary the resolution quality of the model rapidly and dynamically. Such a system would also permit the data to remain compressed at runtime, thereby facilitating its use in real time applications.

SUMMARY OF THE INVENTION

The present invention provides a system and method for modeling 3D objects and 2D images by specialized wire frame mesh constructions built from data points that combine both spatial data and other information such as color or texture data. The use of the complex data points allows the modeling system to incorporate into the wire frame mesh both the spatial features of the object or image as well as its color or other features.

As the mesh constructions of the present invention combine spatial data with color, texture map and other information, the invention can render objects and images using only the data contained in the new, wire frame mesh structure. For a 3D object model, the modeling system and method of the present invention eliminates the texture map from the model, thereby providing substantial space savings by its removal while retaining the ability to generate images of clarity and precision. This ability to render using only the mesh data points means that the 3D model for an object does not need to carry a texture map file, which in prior art systems was used to render depictions. For 2D images, the large matrix of pixel values can be replaced with a much smaller mesh, providing substantial compression of the data needed to replicate the image.

With the mesh modeling system and method of the present invention, any rendering engine that supports linear or bilinear interpolation, such as "Gouraud Shading" (available in many 3D and 2½/2D graphic systems), will accept the mesh data points of the present invention and output a high-quality depiction or reproduction of the object or image. The rasterization needed for generating the display can be done on the host processor (or for greater speed on special 3D hardware).

To create the complex points for 3D object modeling, the system of the present invention accepts as input the 3D spatial data concerning the contours and shape of the object (X, Y, Z object coordinates) and a texture map file containing photographic, color or other texture data. If an initial spatial mesh does not already exist, the system builds an initial spatial model of the object. The system then "wraps" the pixel values of the texture map file onto the spatial construction of the model to create a unified set of multi-dimensional/multi-axis coordinates. In an exemplary embodiment, the system creates a set of 6D (X, Y, Z, R, G, B) coordinates to represent the object. Where an X, Y, Z coordinate links to a point in the texture map file, the system creates the 6D coordinate from that link through a process described below. For many of the R, G, B coordinates in the texture map file, there will be no corresponding X, Y, Z value. For those R, G, B, values, the system and method of the present invention will create an X, Y, Z coordinate by a "rasterization" process described below.

For data points in the 2D image model, data comes to a computer of the present invention as a bitmap file of 2D pixel assignments. The bitmap represents a 2D matrix of pixels such as a 1,280×1,024 matrix. The x, y matrix locations represent spatial values, much like X, Y, Z coordinates in 3D object model. As each x, y coordinate in the bitmap will already have a corresponding R, G, B color assignment, it is possible to create a set of 5D (x, y, R, G, B) coordinates and create a mesh model of the image from those points. The meshes will include aspects of the images' spatial and color detail.

Using the data points that combine spatial and texture attributes, the present invention constructs meshes (for 3D objects and 2D images) that have dynamic resolution capabilities, where data points provide surface shape and color details that can be quickly added or subtracted from the meshes. In constructing dynamic resolution meshes, (2D or 3D), the system and method of the present invention works in either "down resolution" fashion (beginning from an initial dense mesh and removing points from it) or in "up resolution" fashion (beginning with an initial mesh structure of only two or three points) into which the system adds data points to build an object.

For both down and up resolution mesh constructions, the system and method of the present invention uses an optimization technique for selecting which point to add or remove from the mesh next. When building a mesh in an "up resolution" format, the present invention executes a selection process which adds the most significant points into the mesh first. For each point insertion process, the system determines the next most significant point to add from the remaining unmeshed points and adds that point into the mesh. In constructing the mesh in "down resolution" format, the system removes the point which is "least" significant to the mesh in terms of adding color or spatial detail. The goal in both up resolution and down resolution process is to keep the points of most significant detail in the mesh at all times.

Either up resolution or down resolution formats can be used to construct 3D or 2D meshes with dynamic resolution capabilities. It is an aspect of the present invention that, as the meshes are constructed (in either a up resolution or down resolution construction format), the system stores the history and sequence of point insertions or point deletions and the related mesh alterations required thereby in a "history list" (such as the insertion list and history list described herein).

With the history list created, mesh details can be immediately added or removed simply by following the set of instructions stored in the history list. The system of the present invention enables the user to toggle back and forth through the history list to add and remove points of detail.

The modeling system and method of the present invention presents substantial advantages over previously existing systems. A 2D image mesh can replace a 1,280×1,024 image bitmap comprising 1,290,720 pixel assignments (8 bit or 24 bit), for example. The mesh model will contain only a few hundred points (for simple scenes) or a few thousand data points (for more complex scenes). Further, when more detail is needed the model can be easily adjusted. In 3D applications, the system's ability to create object renderings based on the mesh data alone eliminates the need to store and maintain texture map images. Elimination of the texture map file creates a substantial storage saving, as the typically large texture map files no longer need to be saved in a RAM location for rendering. In addition, the system and method of the present invention speeds processing time in rendering as the associated look ups between mesh and texture map are also eliminated.

It should also be noted that the present system and method maintains an optimal structure at all times during "up resolution" or "down resolution" mesh construction and in dynamic resolution toggling. Optimal construction refers to the "connectivity" of the mesh or the interconnection of the edges that join the data points and define the geometric primitives of the mesh (e.g., the triangular mesh faces). While there are many techniques which can be implemented to optimize connectivity in up and down resolution construction processes, the present invention, in exemplary embodiments, presents techniques which optimize connectivity by:

Delaunay Triangulation principles, or

Data Dependent Principles

Delaunay triangulation optimality principles help to insure that the irregular triangulated mesh maintains a construction of evenly sized and angled triangles. Delaunay triangulation is recognized as one type of optimization for mesh construction. When a triangulation follows Delaunay principles, a circumcircle defined by the vertices of a triangle will not contain another data point of the mesh.

Data dependent optimization techniques make edge connections which follow the contour lines of the object or image being modeled. Data dependent techniques use normal vectors for the data points and the triangular faces. As normal vectors give indications of the shape or contours of the object, a normal comparison provides a method to consider the shape of the object when making connectivity choices.

However, Delaunayian optimization and data dependent optimization have different advantages. Delaunayian optimization is useful for example in meshing situations where good stability is needed in the structure such as in situations where data points are constantly being inserted or removed from a mesh. An unstable mesh can create problems such as triangles that are extremely narrow and triangles with extremely sharp angles. Such unstable mesh configuration can prevent or hinder smooth rendering. In such situations, it would be advantageous to use a Delaunayian check for optimality because Delaunayian principles foster the construction of a mesh with stable triangles, which move in the direction of being equilateral. Delaunay checking procedures also function in situations where it is not possible or not easily feasible to perform a data dependent check. Where there is no information concerning the contour of the mesh, such as normal data, or no reference object for comparison, Delaunayian checking can be used to create a quality mesh.

Data dependent optimality checking is useful for making sure that the characteristics of the mesh best match the shape and contours of the object being depicted. Data concerning the surface of the object, such as normal data, enable the computer to make edge flips so that the mesh structure can better conform to the object's shape. As Delaunayian checking is not directly tied to the contours of the object itself, data dependent checking can, in some circumstances, provide a mesh which more accurately describes the object.

In the present invention, optimality checking for mesh construction occurs at each instance when a point is being added or removed from the mesh. Adding or removing data points causes changes to the mesh structure. A point addition adds additional triangles. A point deletion removes triangles. The addition or removal of the data point may also necessitate alterations to the structure of the remaining triangles to preserve optimality such as by Delaunay or data dependent principles. To maintain optimality the system executes a checking routine at each point insertion and deletion.

For speed in adding or deleting points and in performing the checking necessary to maintain connectivity optimality, the system provides a mesh navigation system by rigidly ordering the vertices of each triangular face in the mesh. In an exemplary embodiment, the vertices of the triangles are ordered in counterclockwise fashion. However, a clockwise or other rigid ordering system is also suitable. The edges of the newly created triangles and the neighboring triangles related to those edges are also ordered in relation to the counterclockwise or other ordering of the vertices of each face. The order of vertices and neighbors for example allows the system to perform optimality checks in a systematic way, moving in a single direction following the ordering of the points, such as proceeding counterclockwise around the insertion point. The regularized indexing of the vertices enables the checking procedure to easily orient itself within the mesh and quickly maneuver to check for optimized quality. The rigid ordering of triangle vertices and neighbors also provides other speed advantages in processing mesh data.

As each face is checked, the present invention provides that the results of each check be stored in the history files. The system and method of vertex indexing and the system and method of regularized checking enables the present invention to minimize into storage information about the checking in the history files. The system later uses the history files to reverse the mesh construction steps that occurred when the data point was inserted or deleted. In the present invention, data points are added to the mesh in LIFO (last in first out) order in up resolution construction and in FIFO (first in first out) order in down resolution construction, thereby keeping the points of most significant detail in the mesh at all times.

The system and method of the present invention comprises computer hardware, programmed elements and data structures. All the elements set forth are described in more detail below.

BRIEF DESCRIPTION OF THE DRAWINGS AND APPENDICES

Figure 2A:
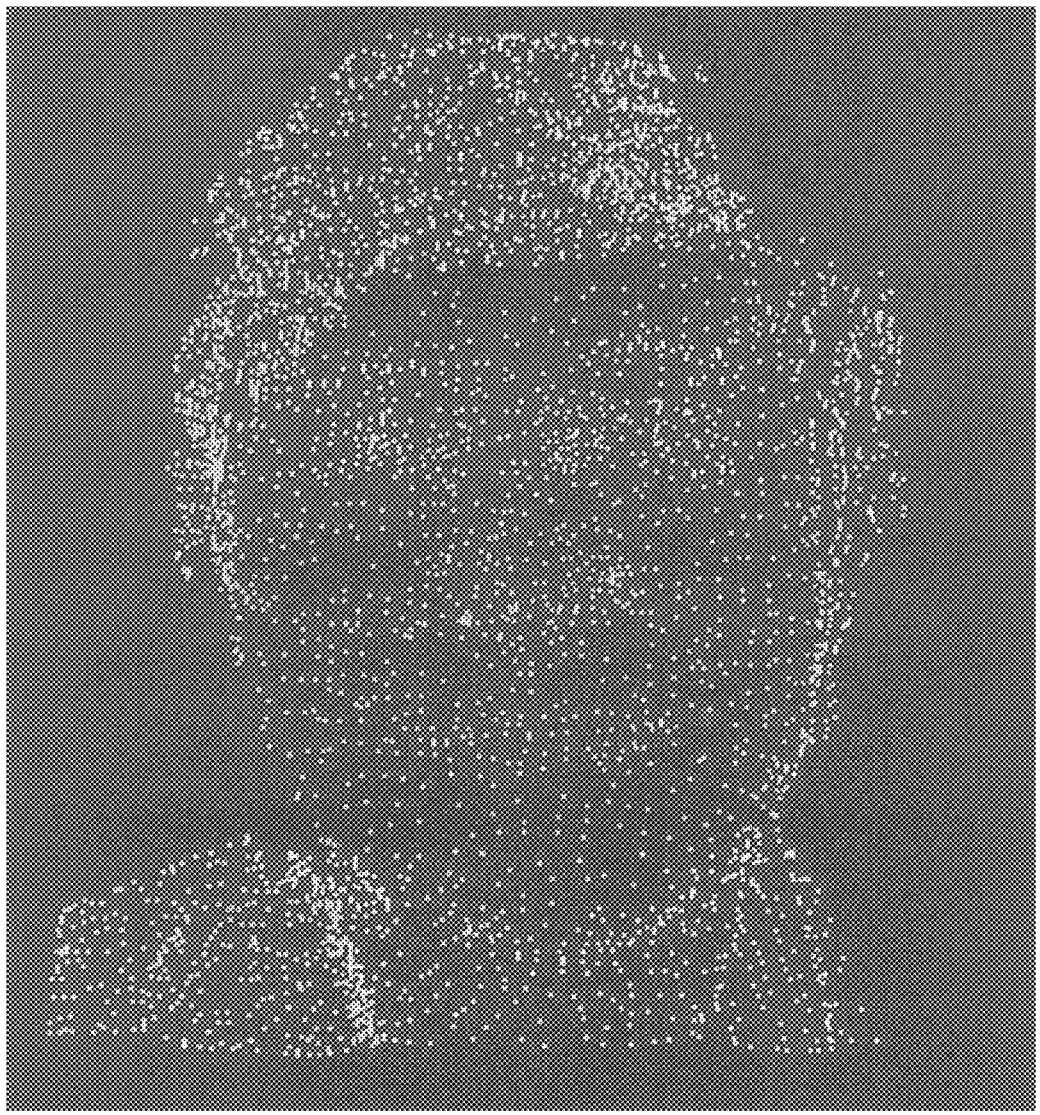
FIG. 2a Depicts a plurality of data points which comprises a set of 3D x, Y, Z coordinates that describe the object.
Figure 2B:
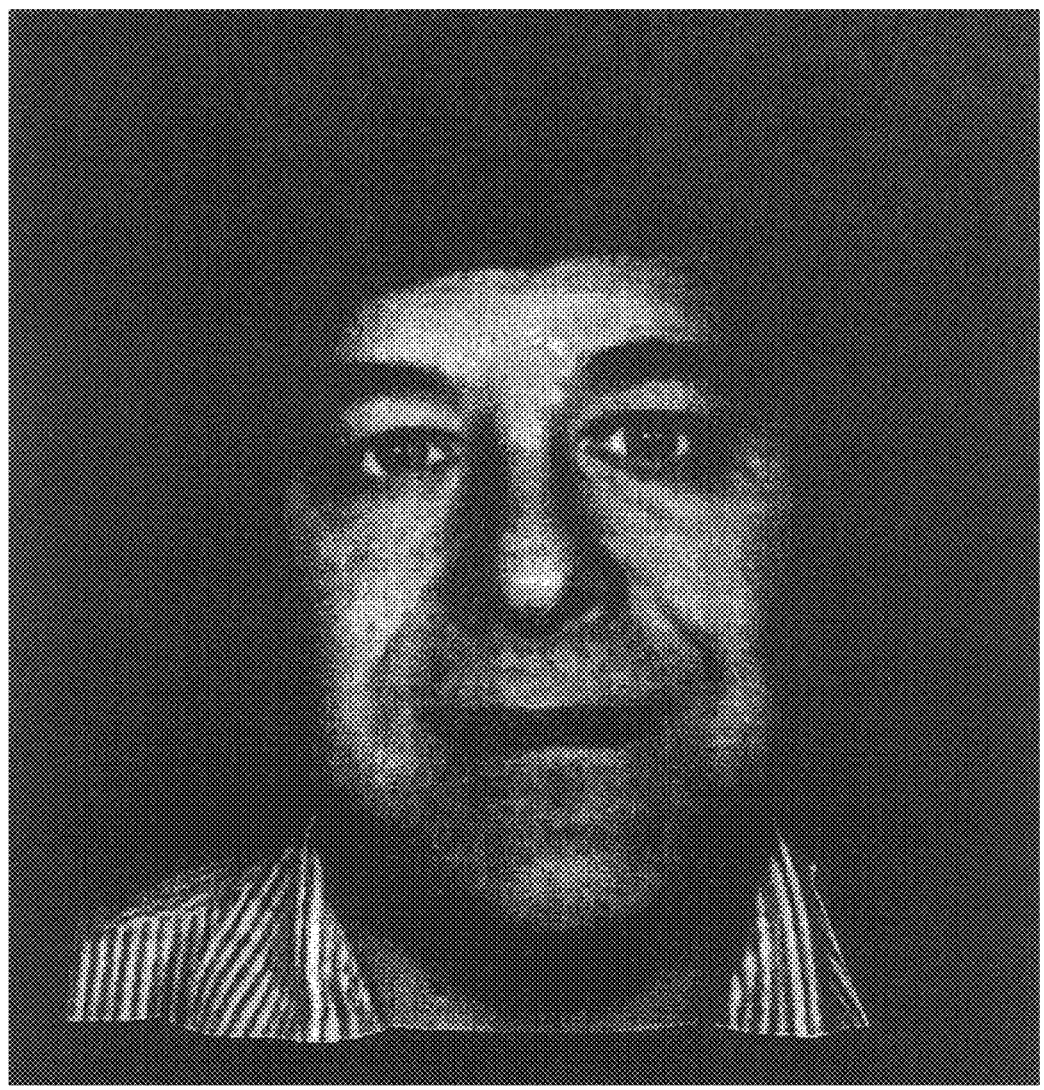
FIG. 2b Depicts exemplary texture map data.
Figure 2C:
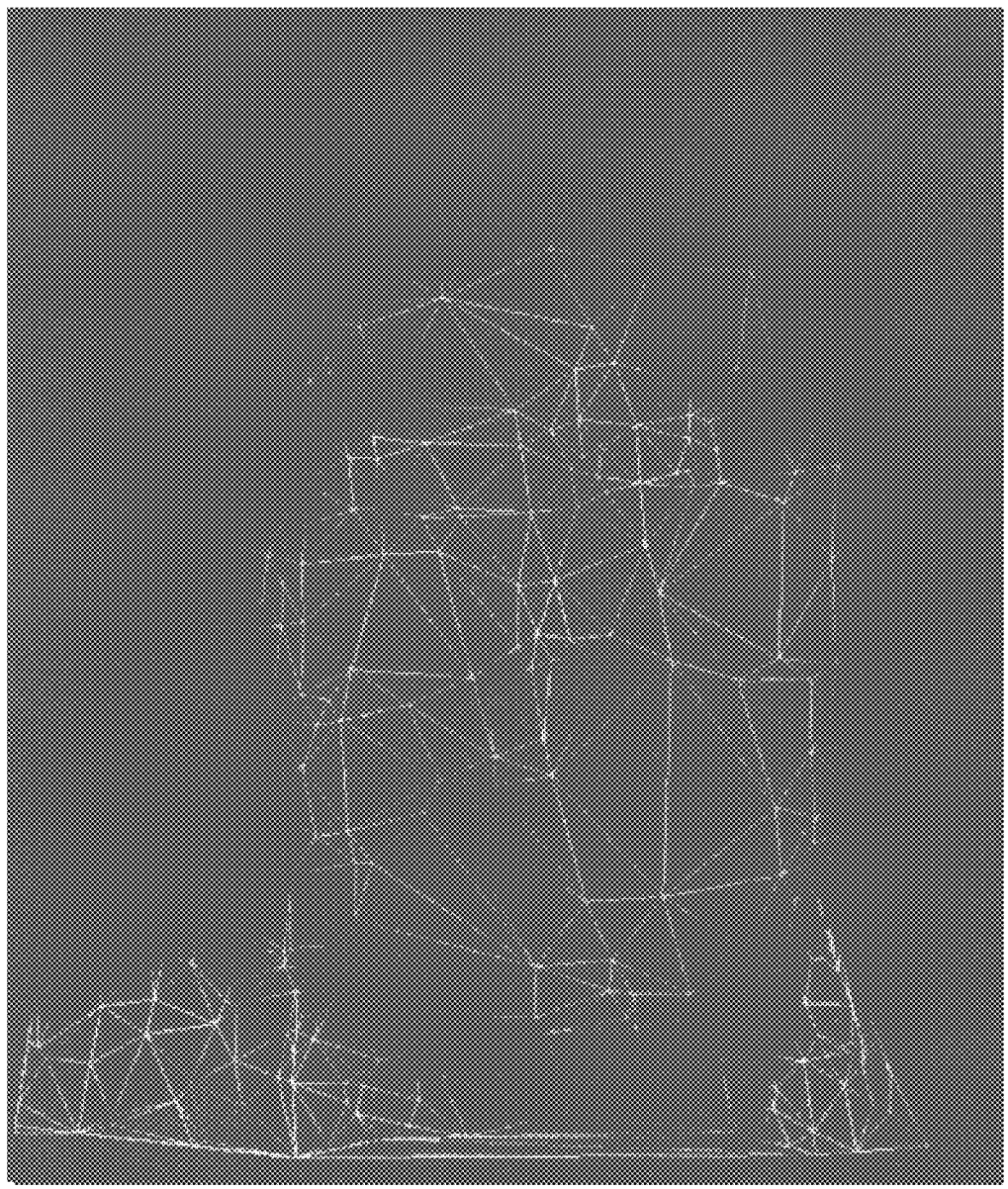
FIG. 2c Depicts a mesh model of comparatively low resolution created according to the teachings of the present invention (depicted for exemplary purposes in gray scale).
Figure 2D:
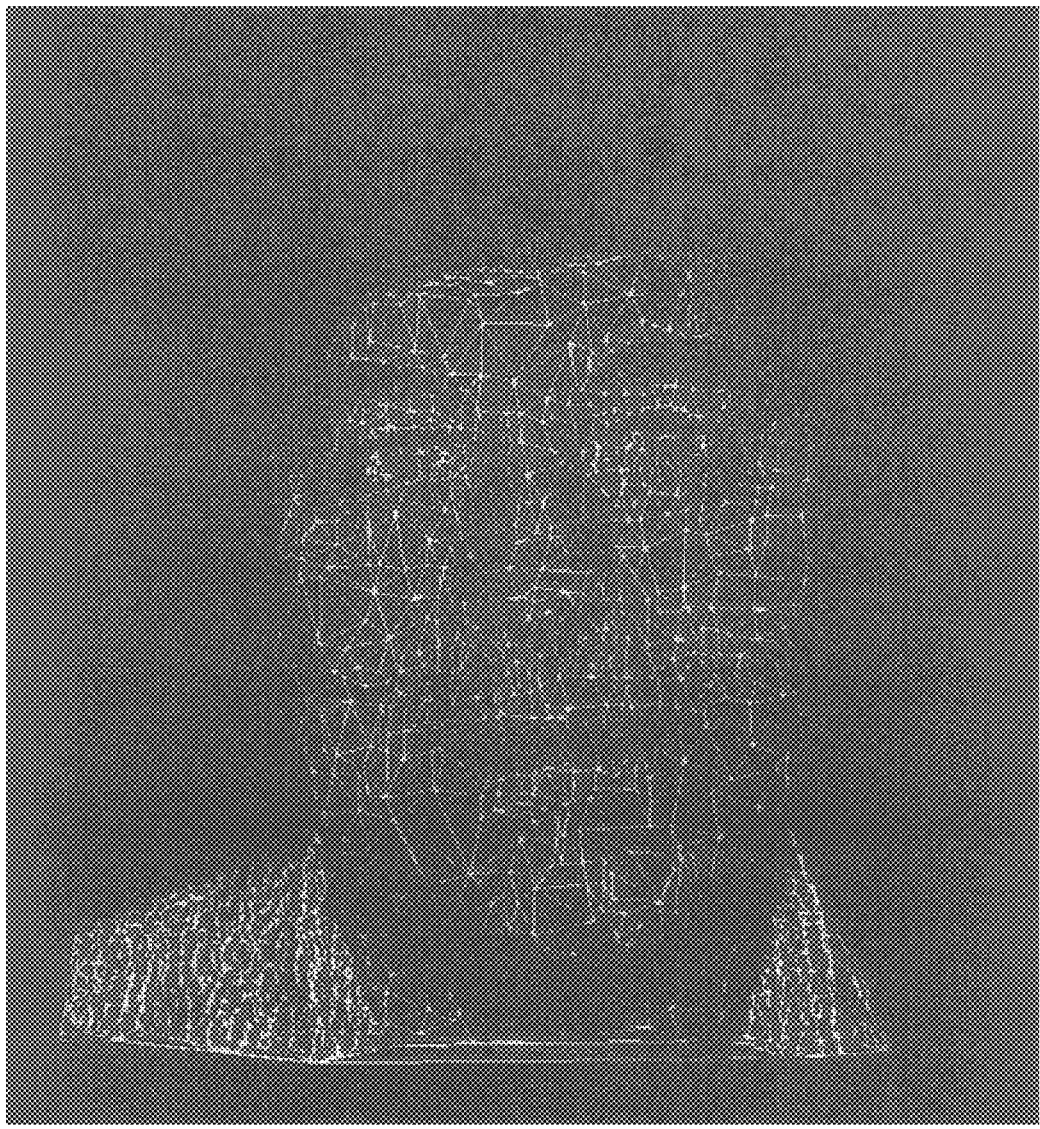
FIG. 2d Depicts a middle resolution mesh model of a 3D object created according to the teachings of the present invention (depicted for exemplary purposes in gray scale).
Figure 2E:
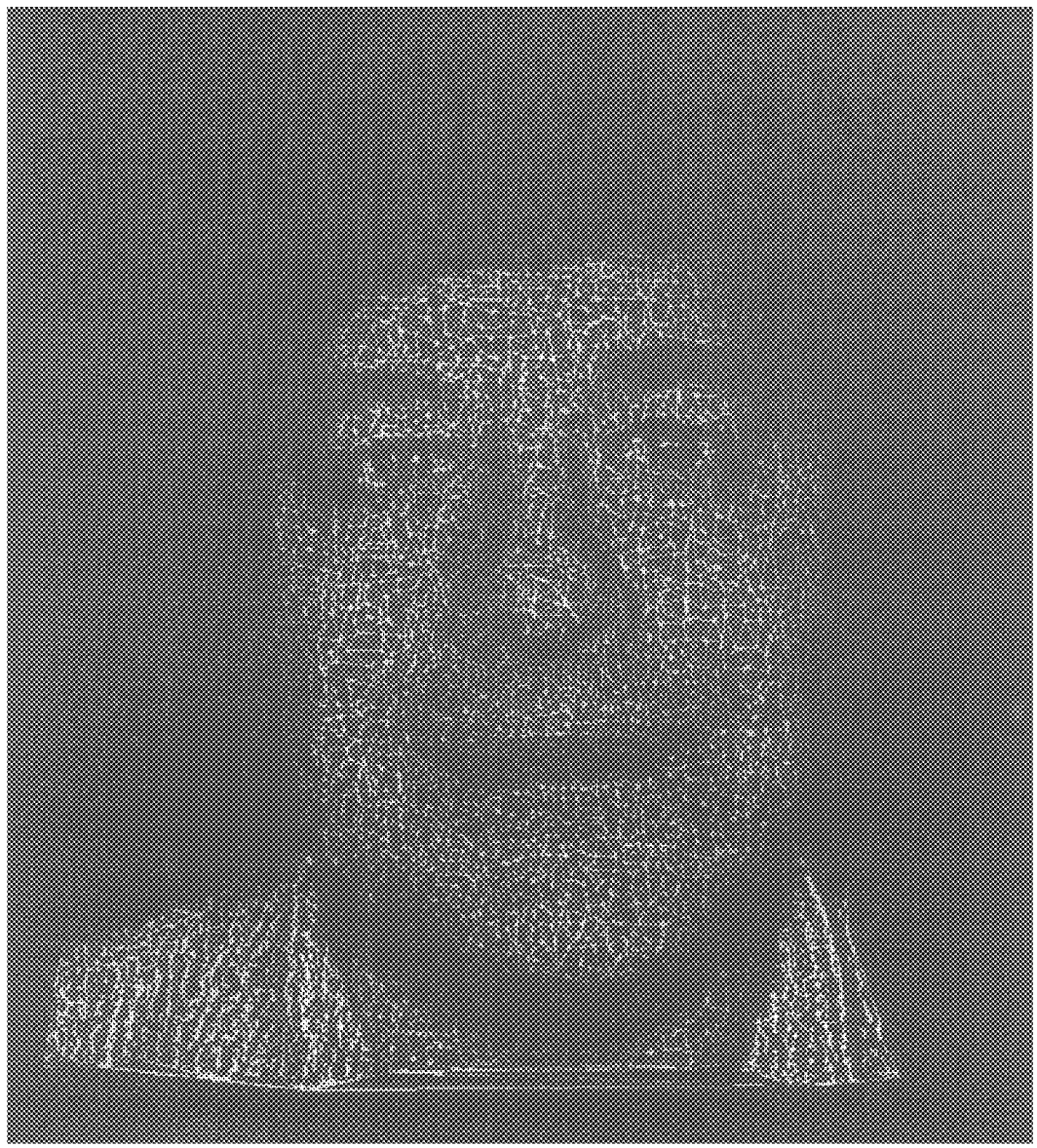
FIG. 2e Depicts a high resolution mesh model of a 3D object created according to the teachings of the present invention (depicted for exemplary purposes in gray scale).
Figure 2F:
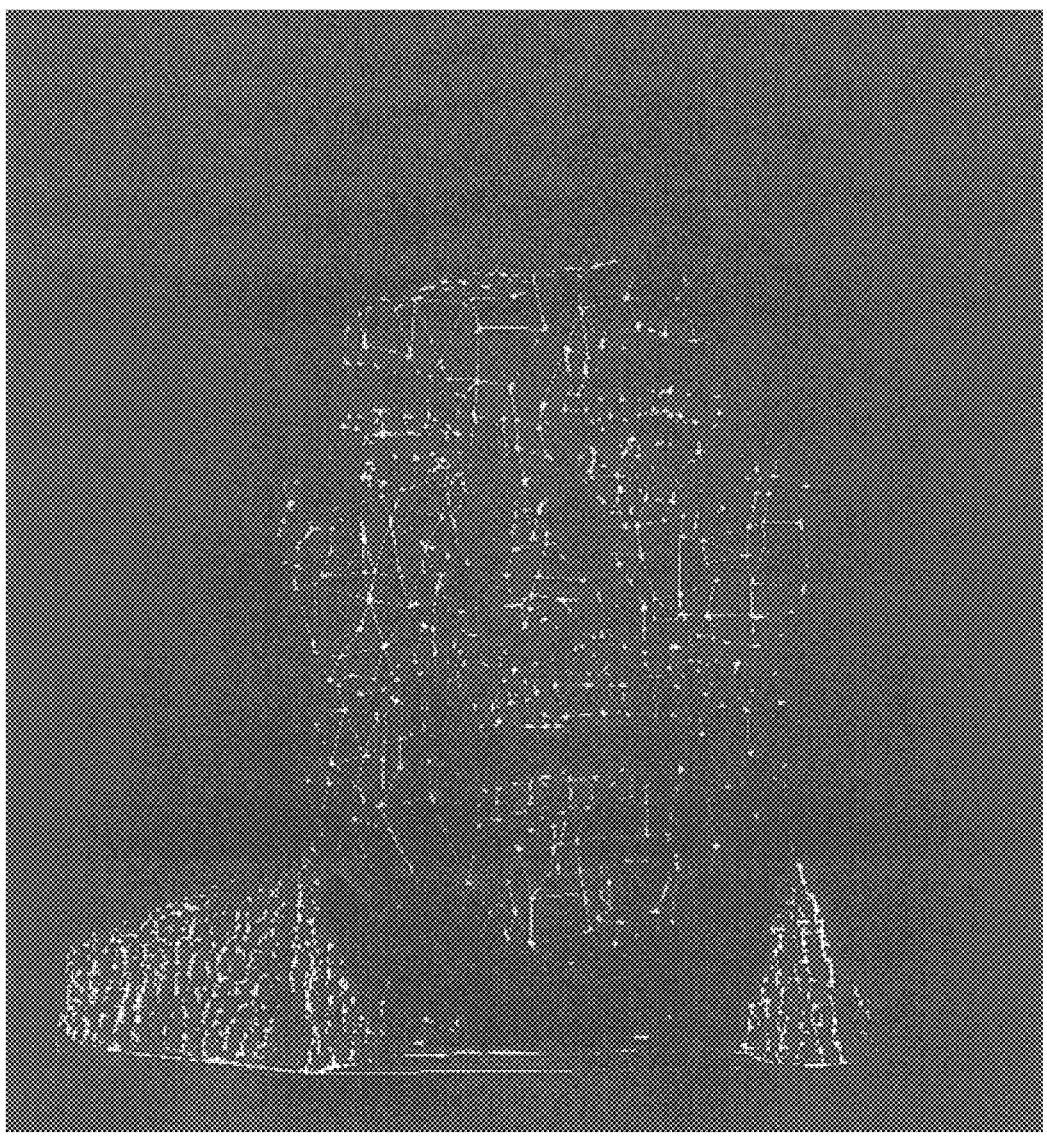
FIG. 2f Depicts a mesh of lower resolution than FIG. 2e created through a down resolution process.
Figure 2G:
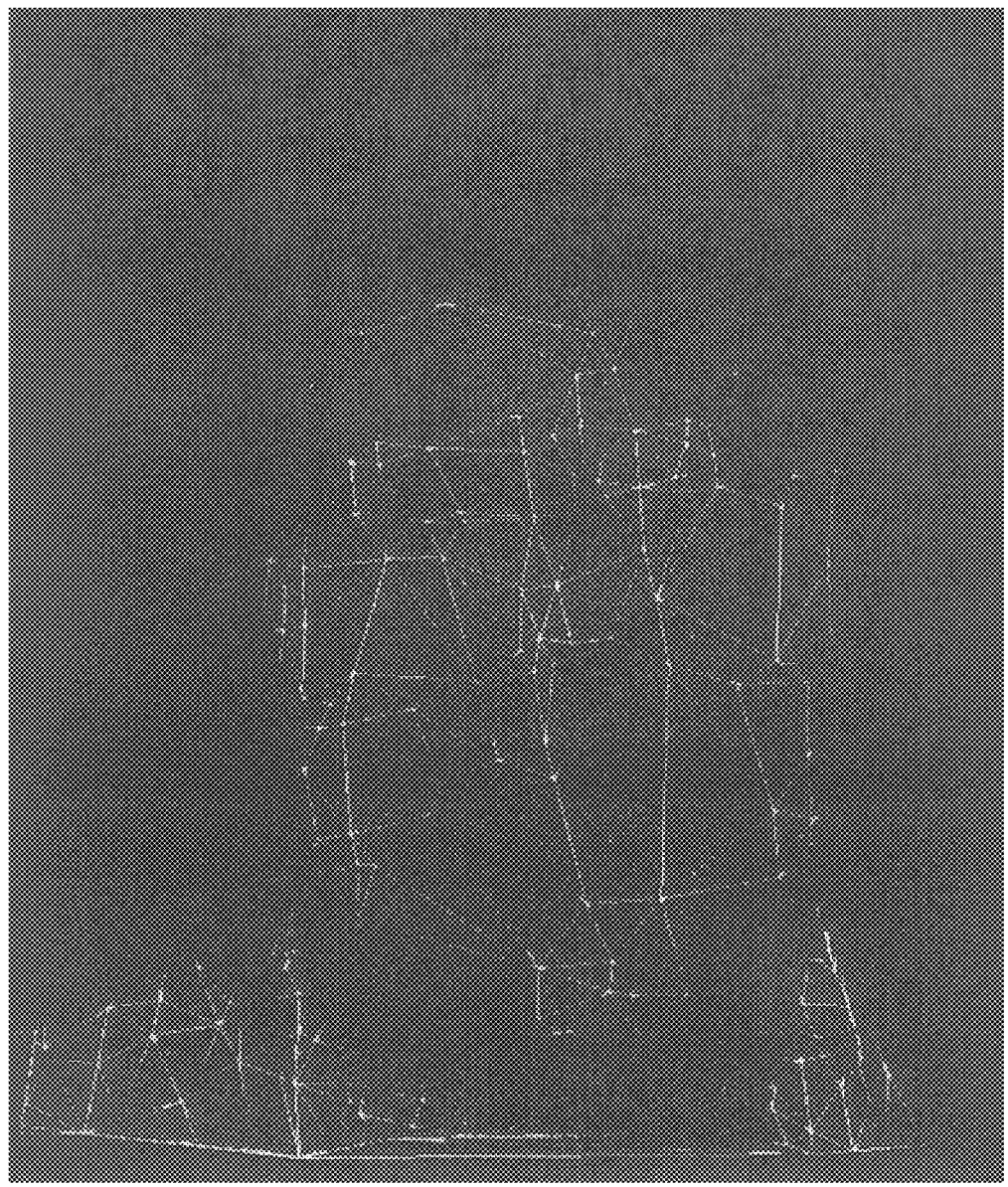
FIG. 2g Depicts a mesh of lower resolution than FIG. 2f created through a down resolution process.
Figure 2H:
FIG. 2h Depicts an image of the object rendered from the information of the low resolution mesh model of FIG. 2c.
Figure 2I:
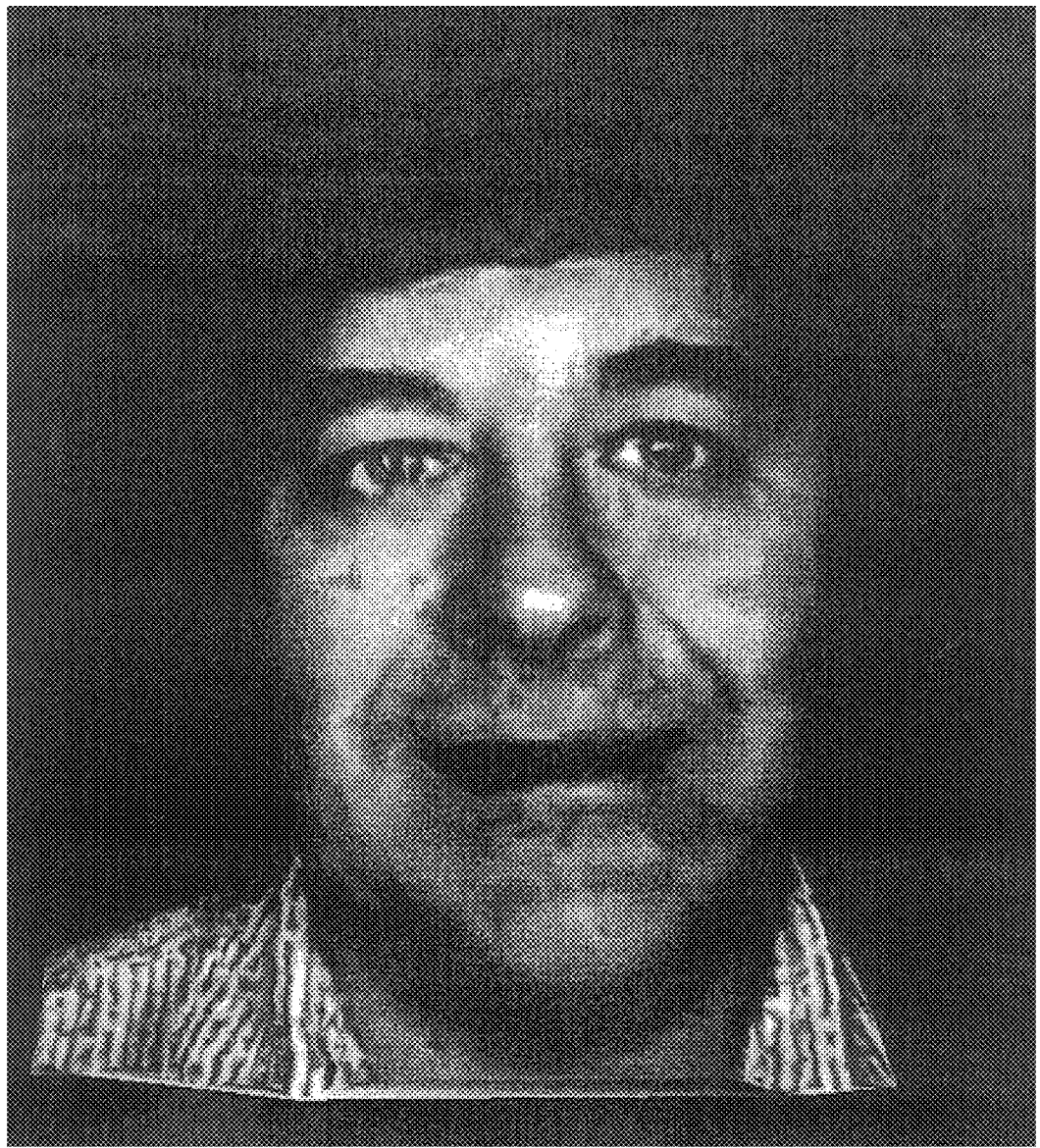
Figure 2J:
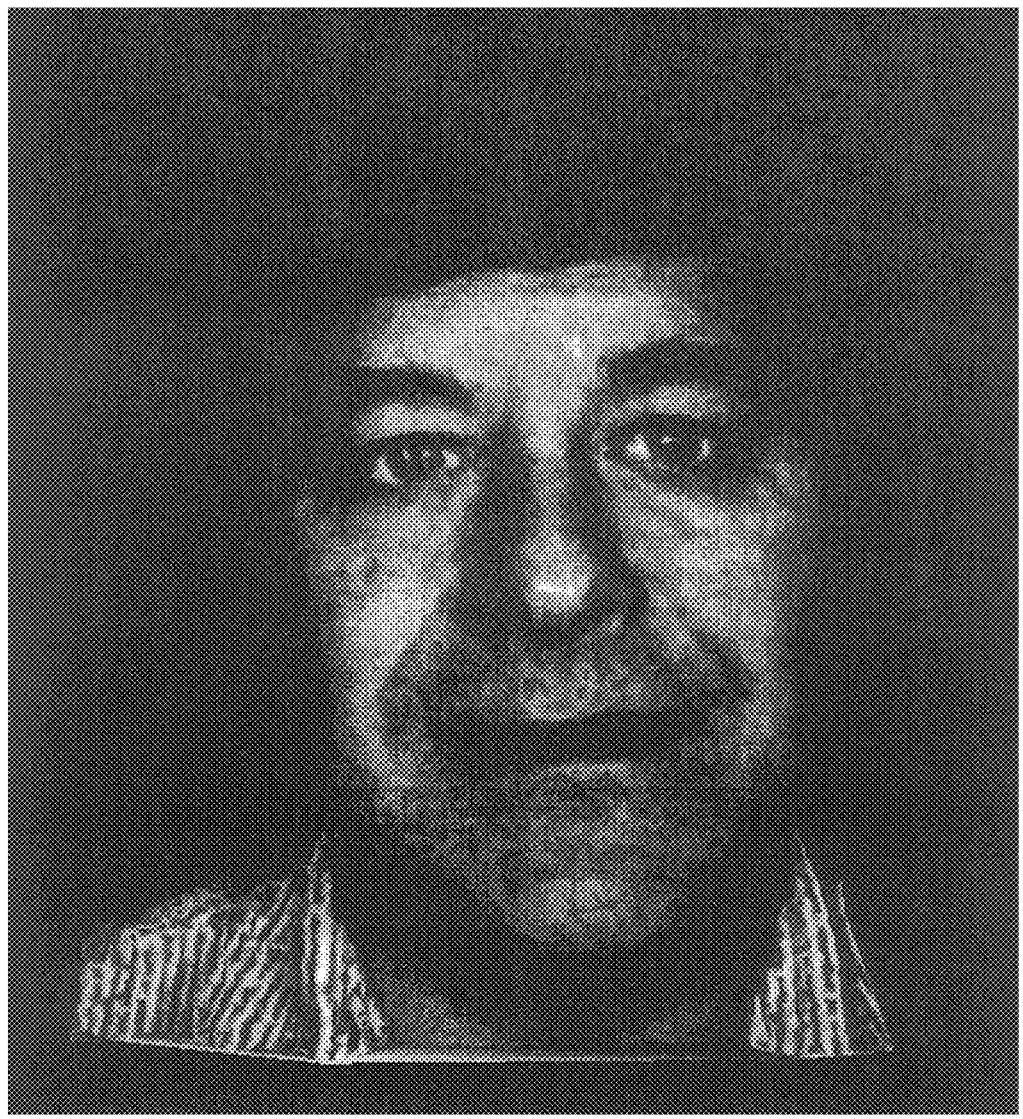

FIGS. 2i–j Depicts images of the object rendered from information of the mesh models of FIGS. 2d and 2e.

Figure 3:
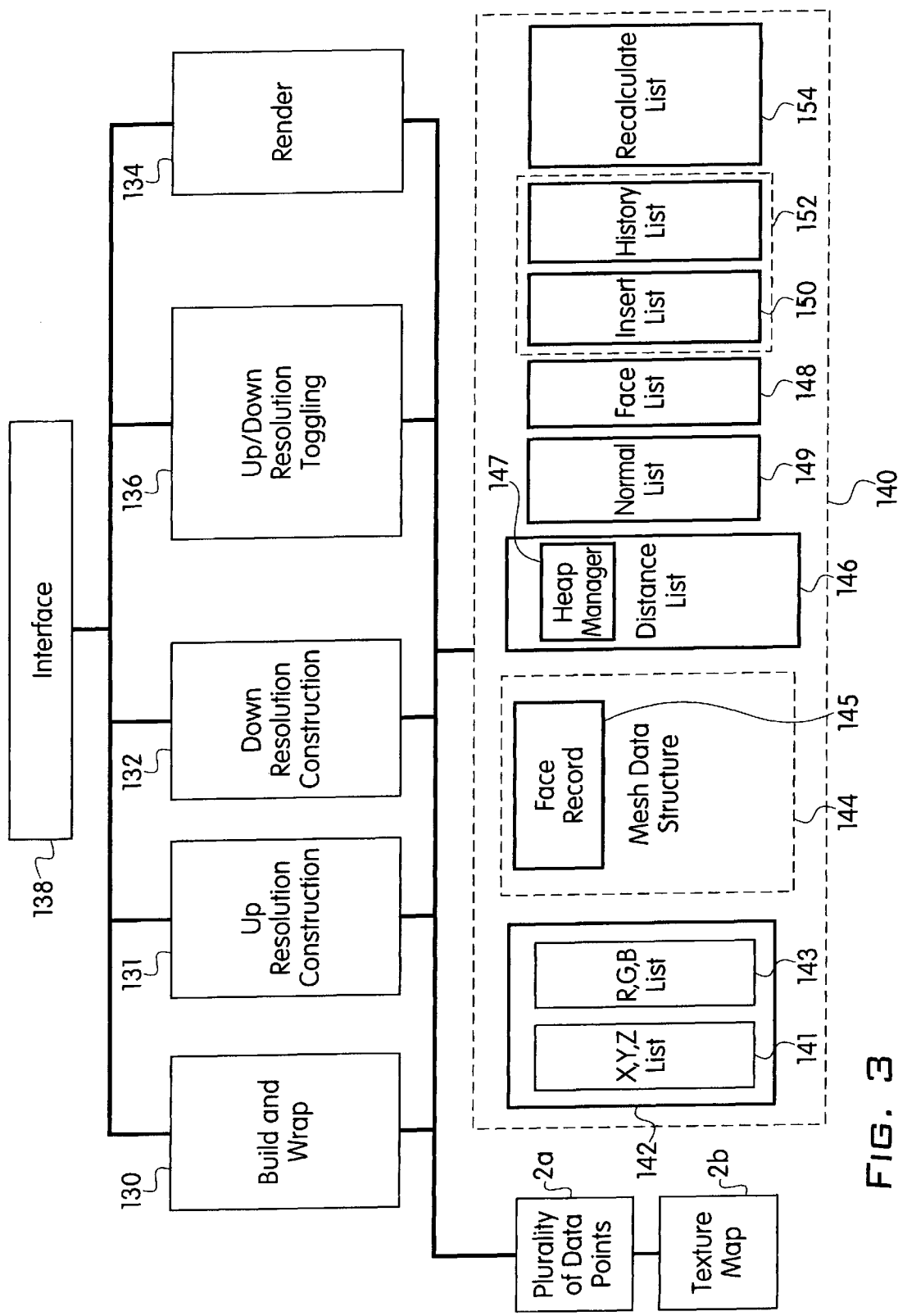

FIG. 3 Depicts an overview of basic programmed elements and data structures used to implement an exemplary meshing system with up resolution/down resolution capabilities.

Figure 4:
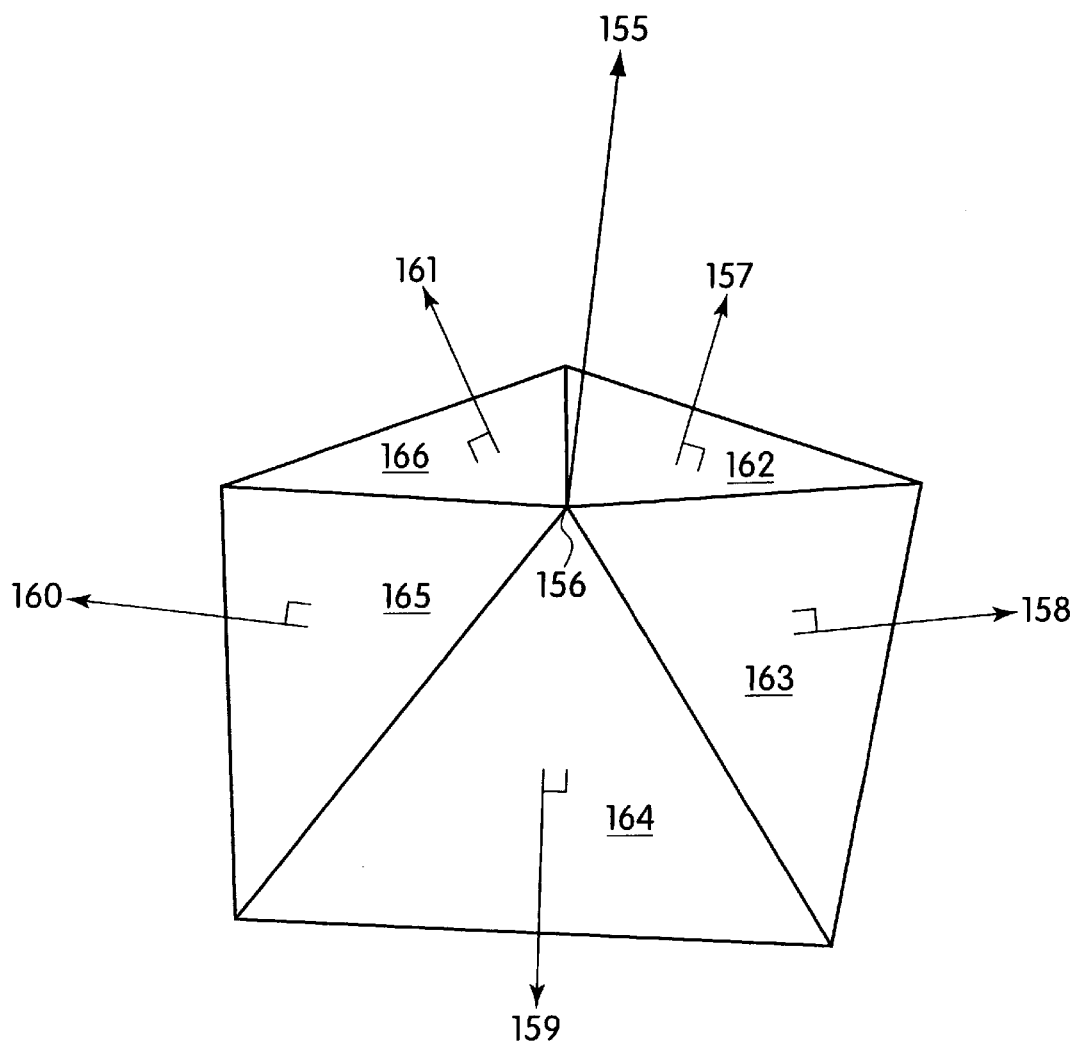

FIG. 4 Depicts a normal calculation for a data point inserted into a mesh structure.

Figure 5:
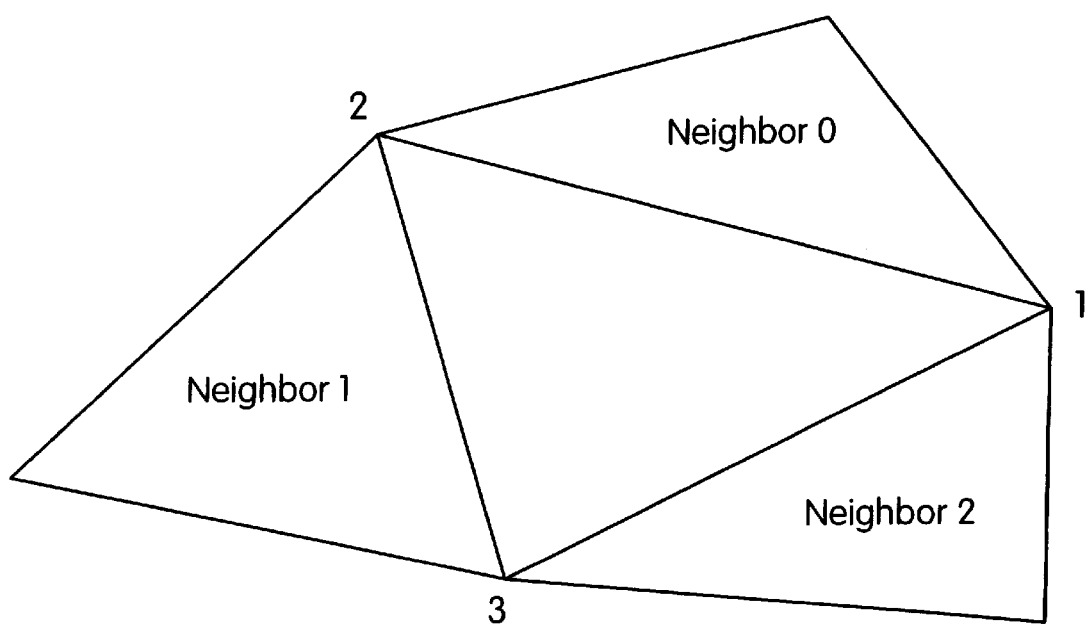

FIG. 5 Depicts an exemplary ordering of points of a mesh face and shows the relationship of those points to neighboring faces according to the present invention.

Figure 6:
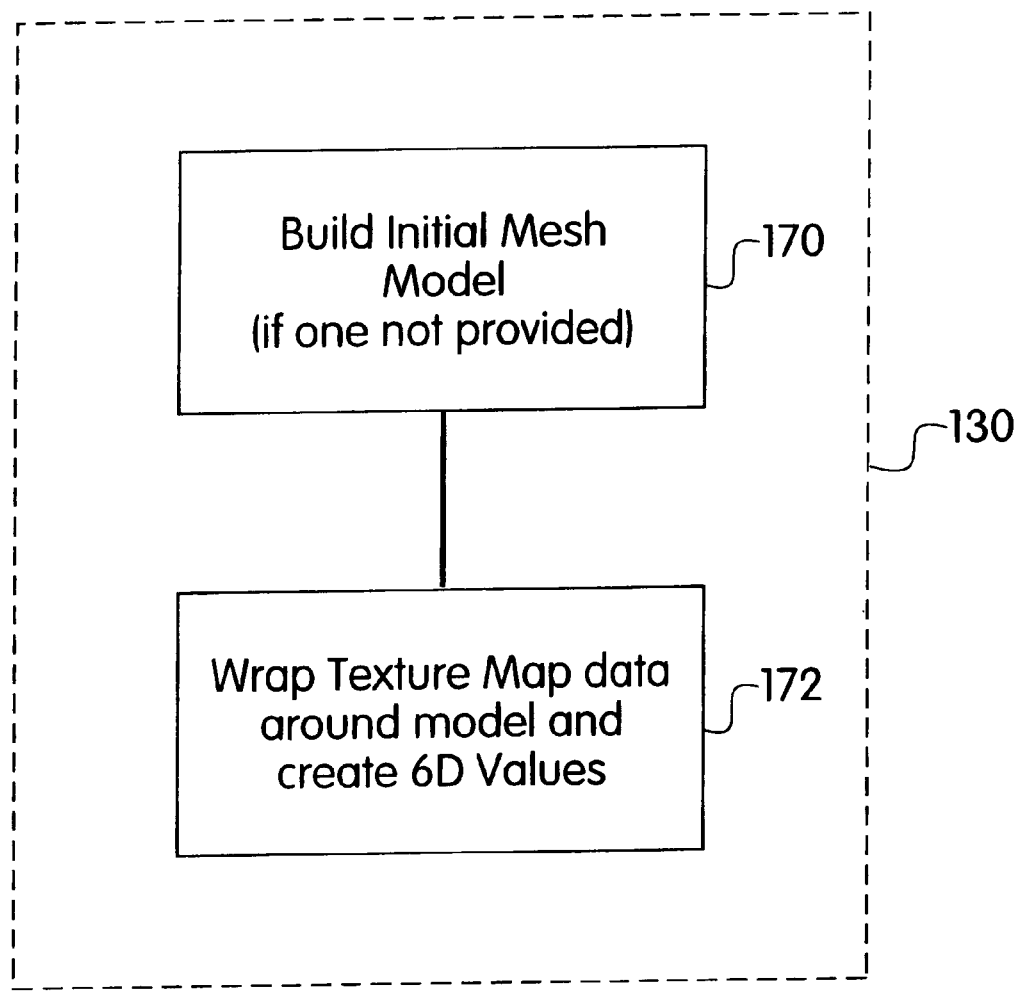

FIG. 6 Depicts an exemplary process flow for an exemplary build and wrap function which creates a set of space and texture coordinate values according to the present invention.

Figure 7:
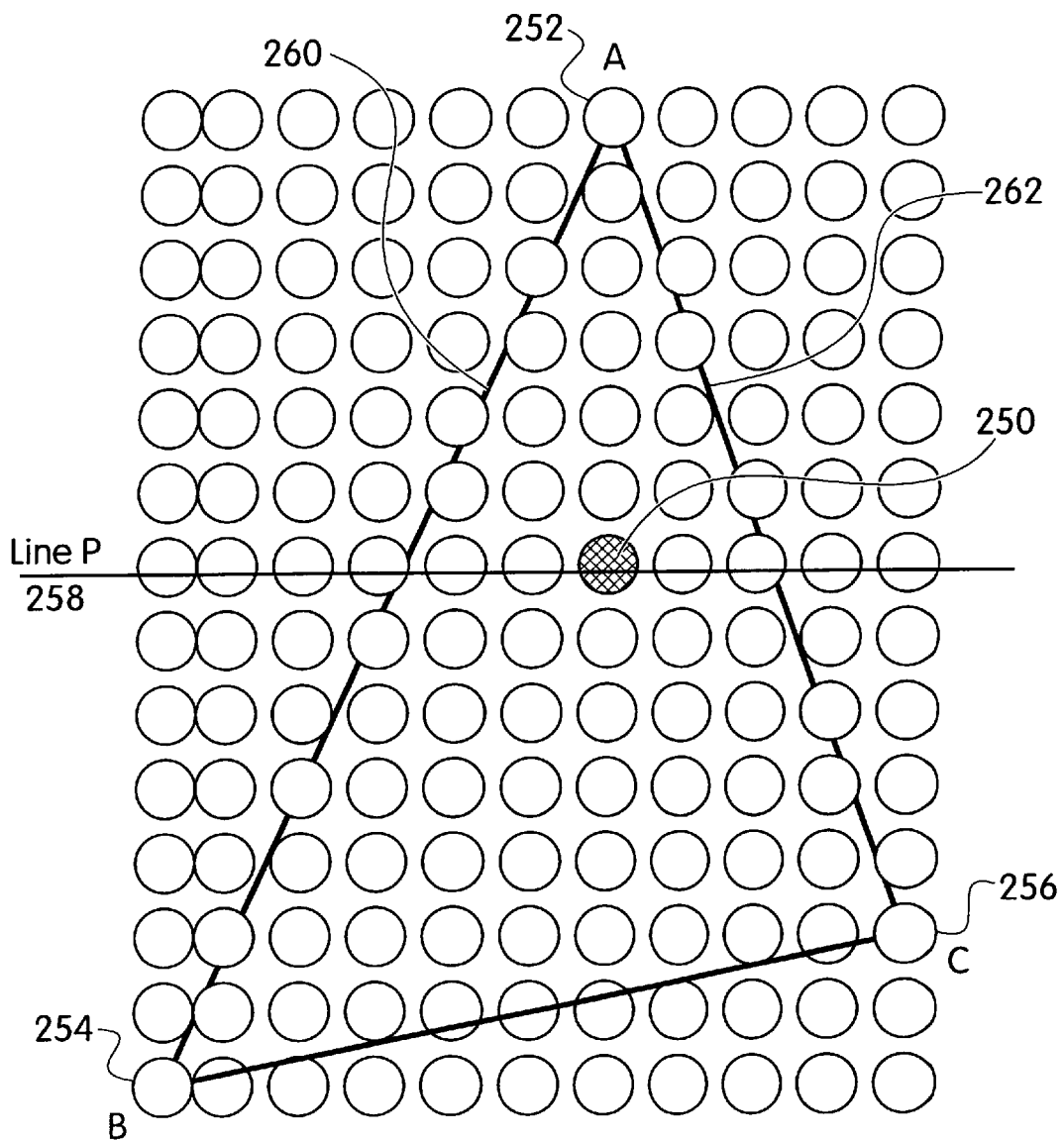

FIG. 7 Depicts an exemplary mesh triangle overlaid on a set of texture map pixel values and shows how a 3D X, Y, Z value is created for a pixel by interpolation.

Figure 8A:
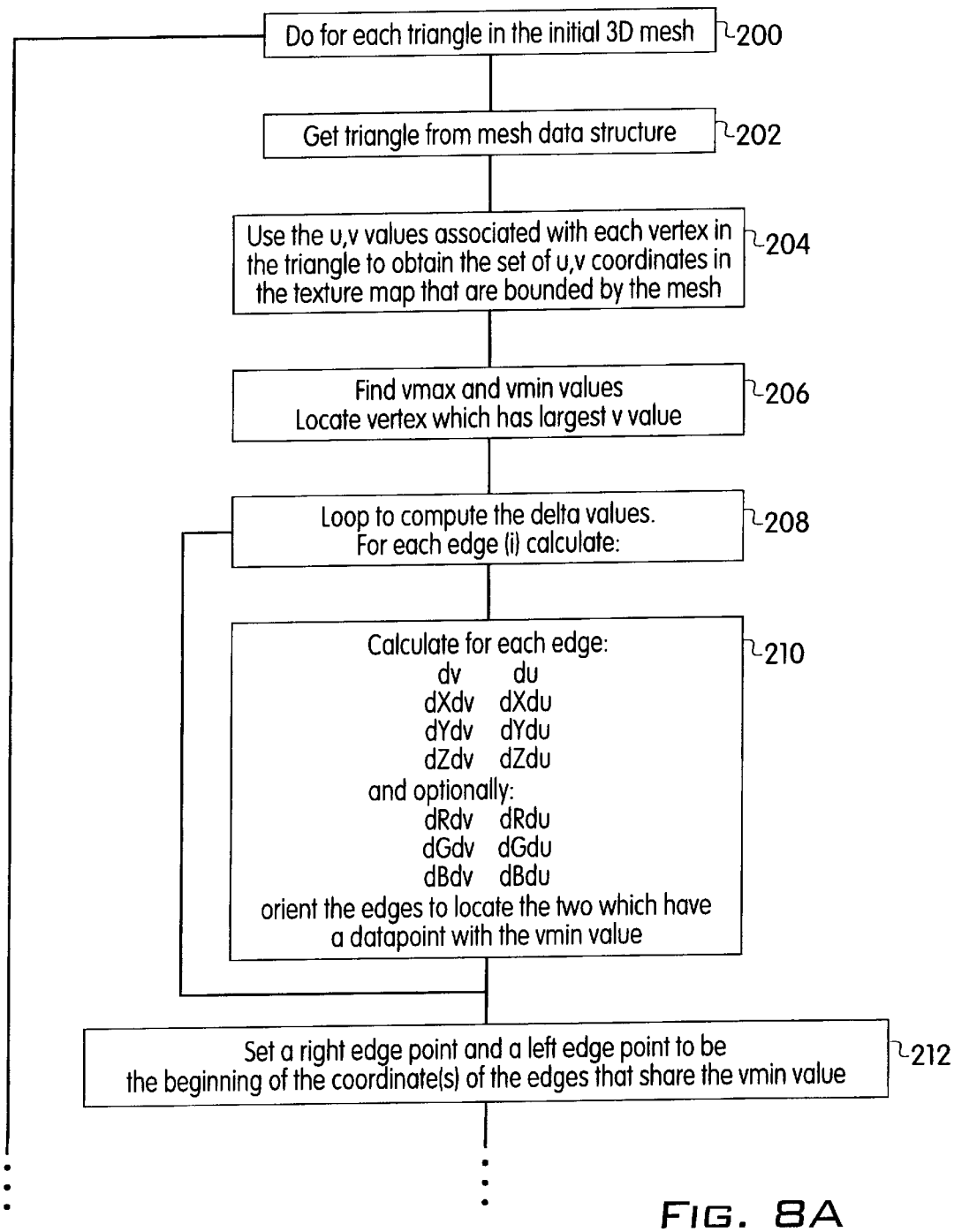
Figure 8B:
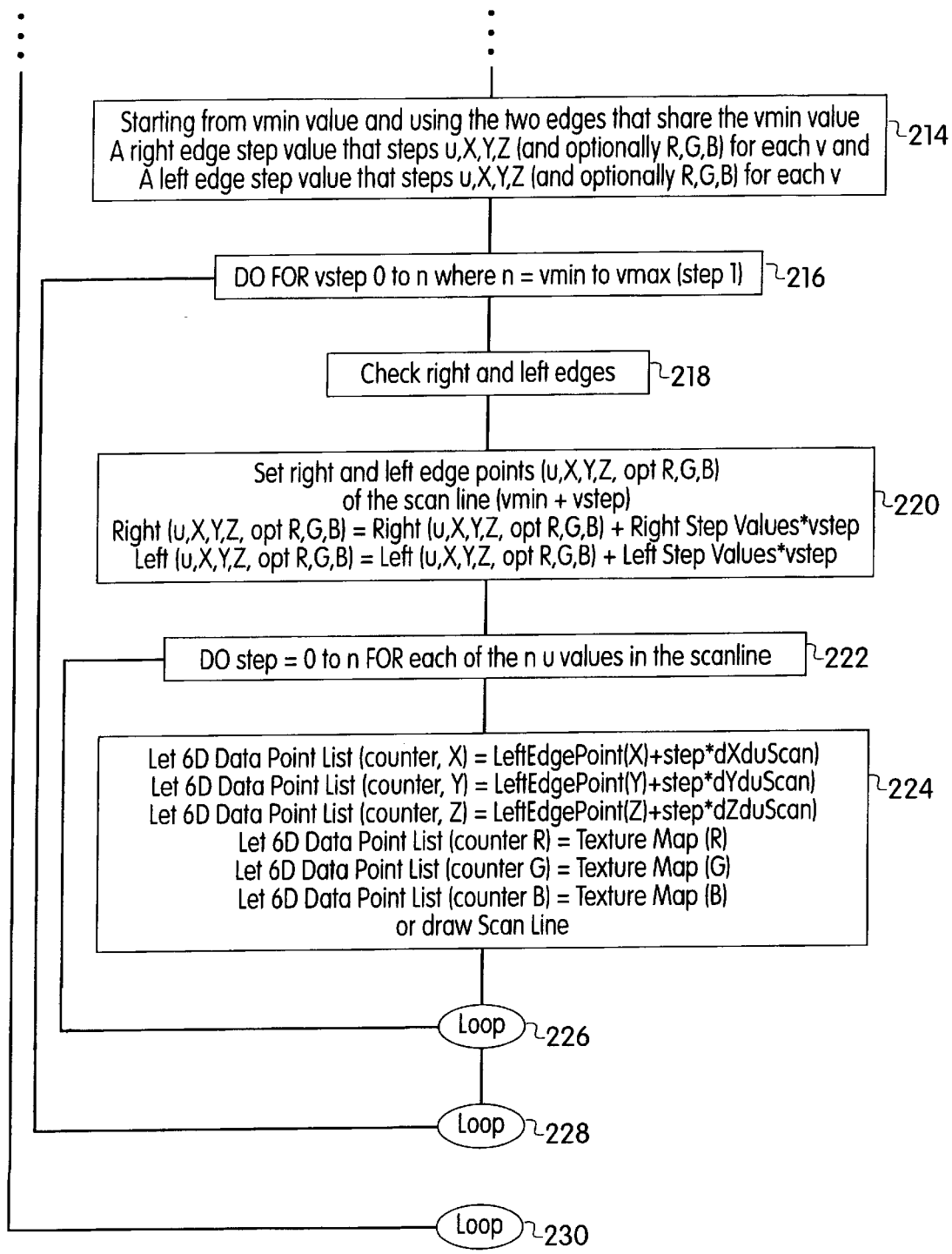

FIG. 8 Depicts an exemplary process flow for the process of rasterization, which creates X,Y,Z values for provided texture map coordinates.

Figure 9:
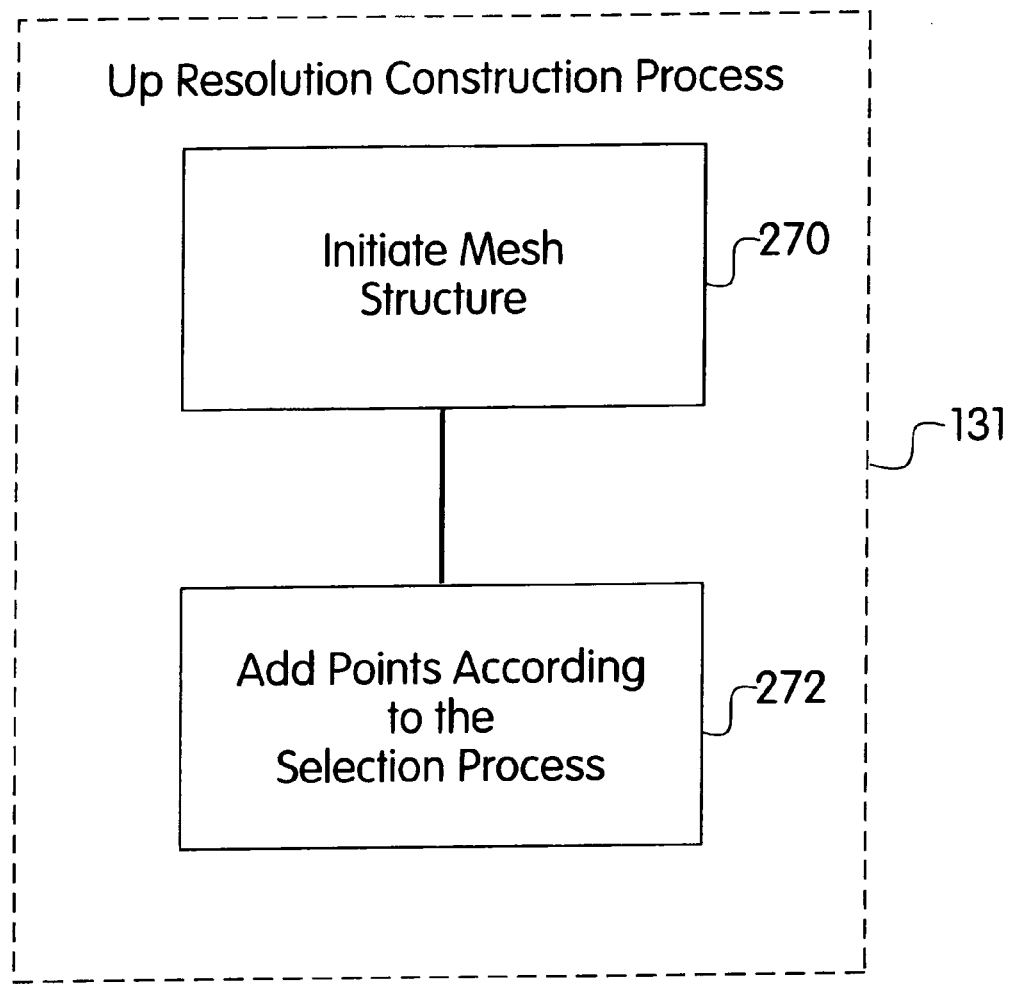

FIG. 9 Depicts the basic process steps of the up resolution function of the present invention.

Figure 10A:
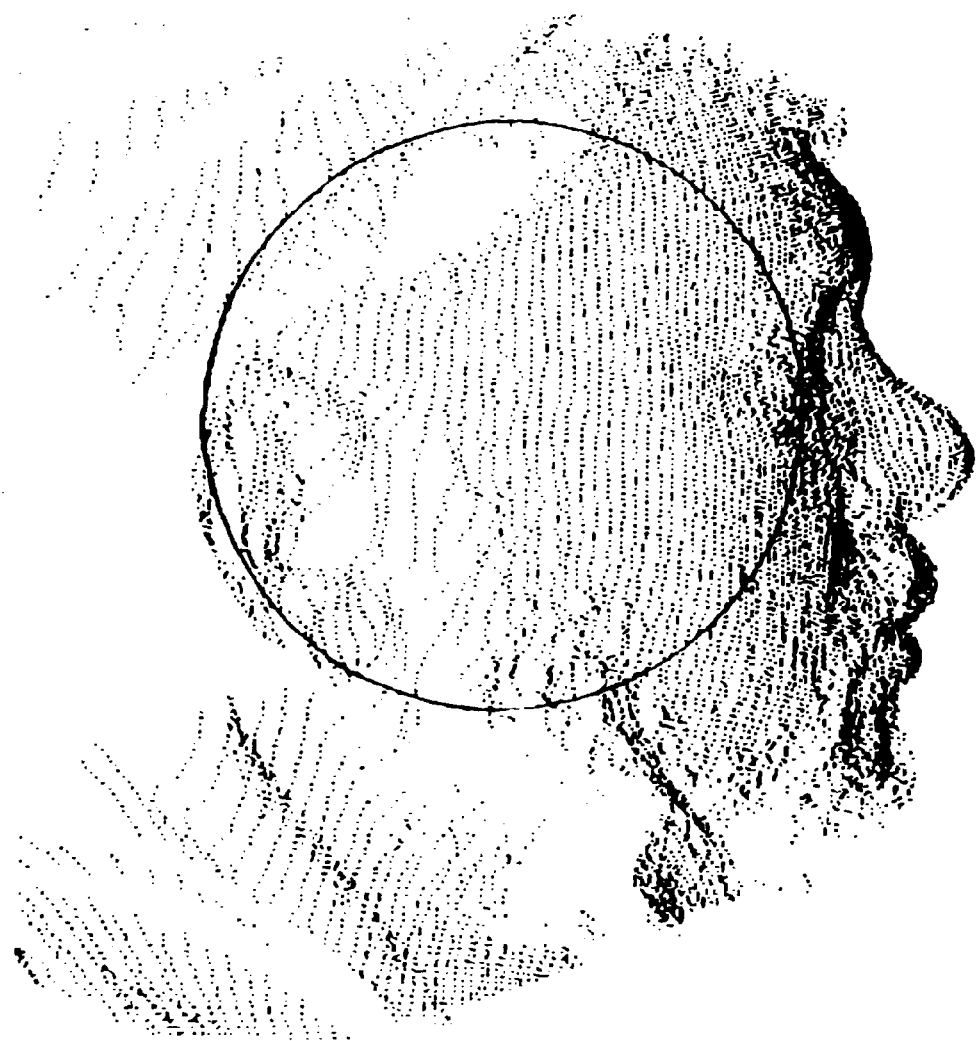

FIG. 10a Depicts a cloud of data points fitted to a sphere.

Figure 10B:
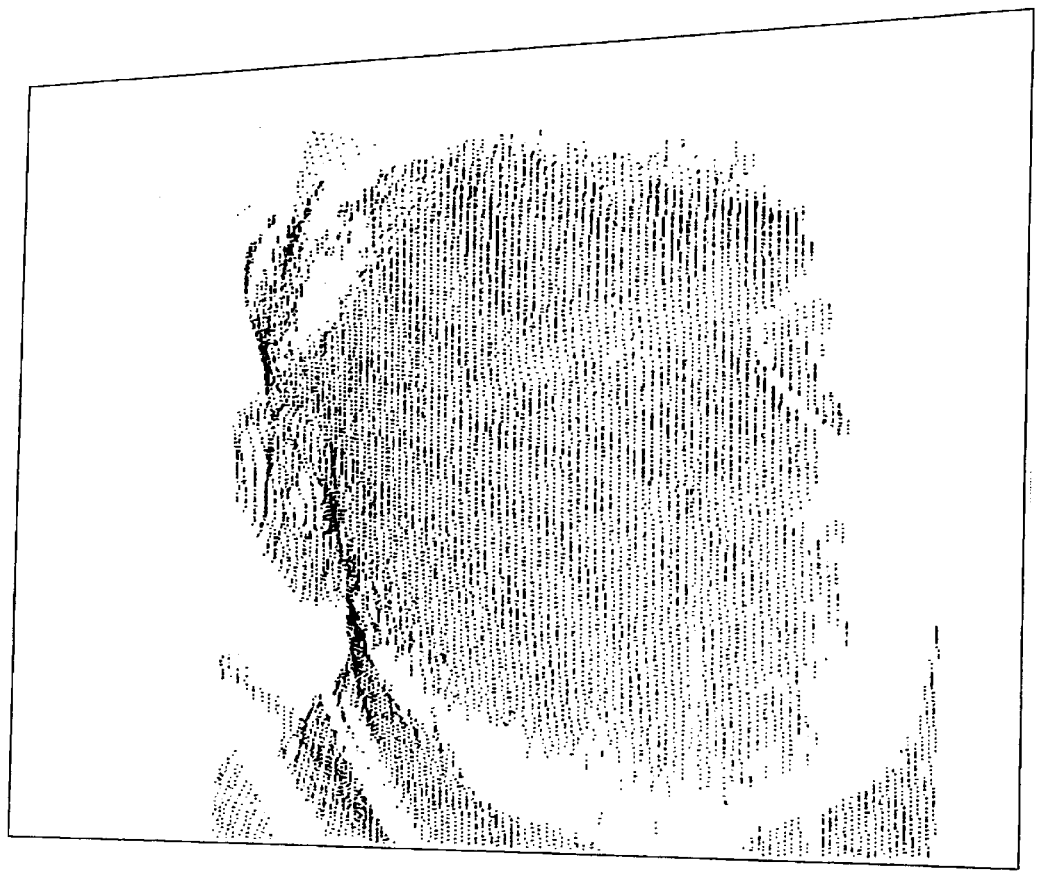

FIG. 10b Depicts a second cloud of data points fitted to a plane.

Figure 10C:
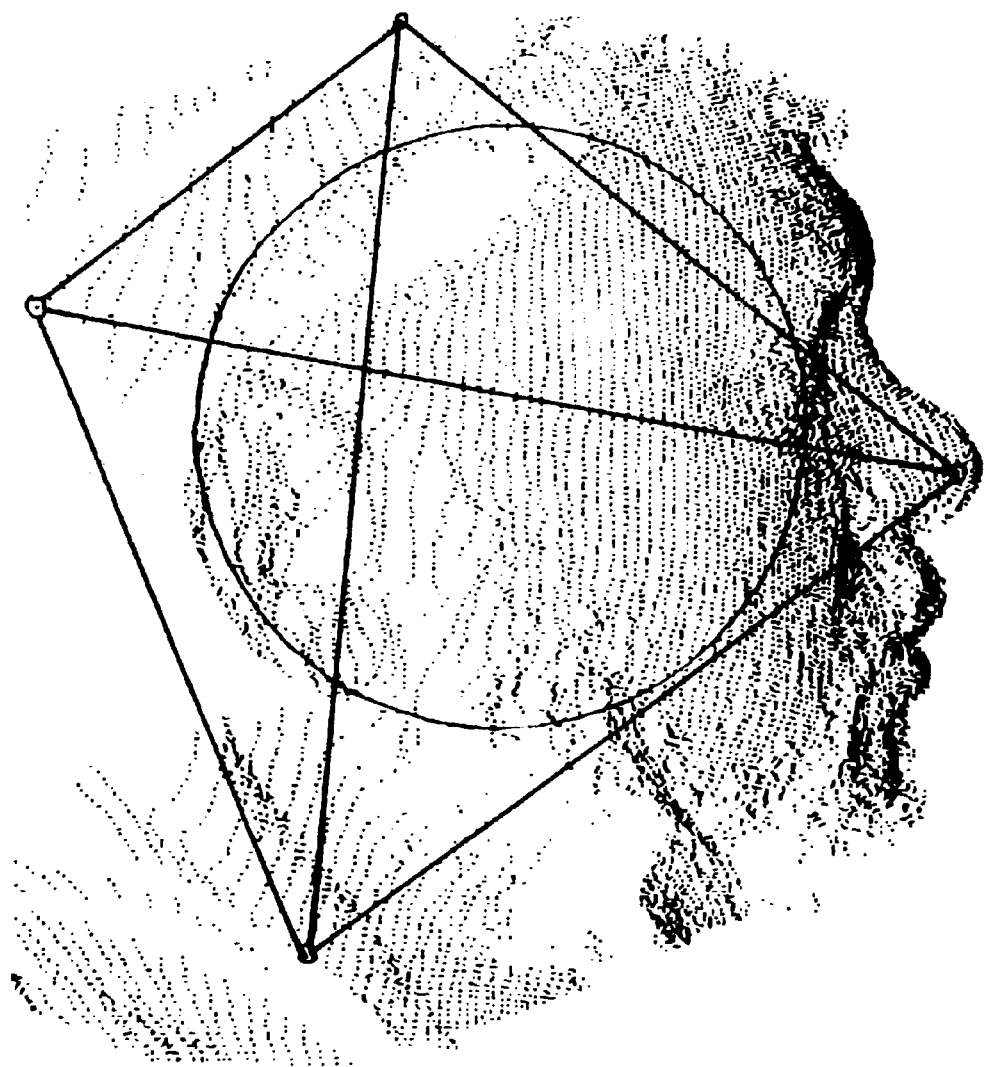

FIG. 10c Depicts a tetrahedron constructed for a cloud of data points where the initial reference object is a sphere.

Figure 10D:
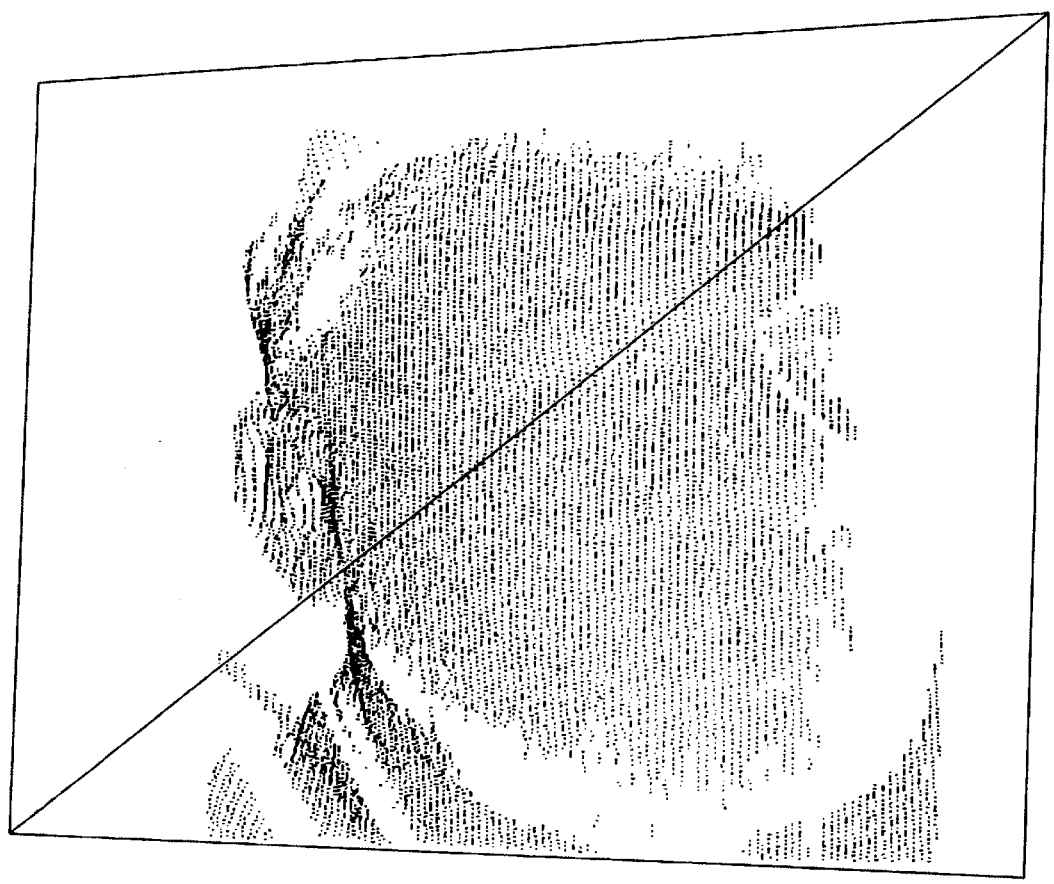

FIG. 10d Depicts an initial mesh constructed from Steiner points where the initial reference object is a plane.

Figure 11:
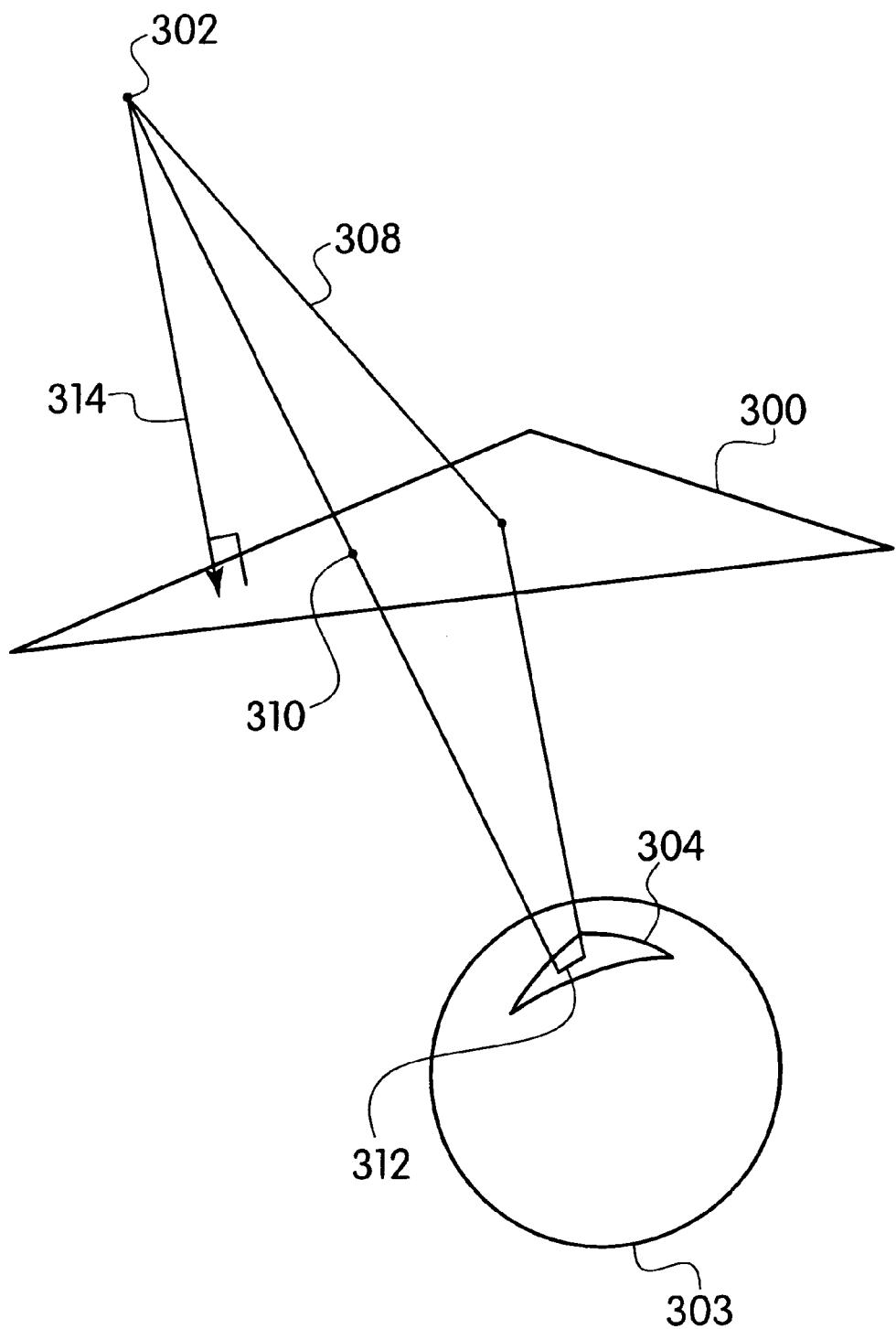

FIG. 11 Depicts a mesh triangle and an associated mesh point for purposes of distance calculations.

Figure 12:
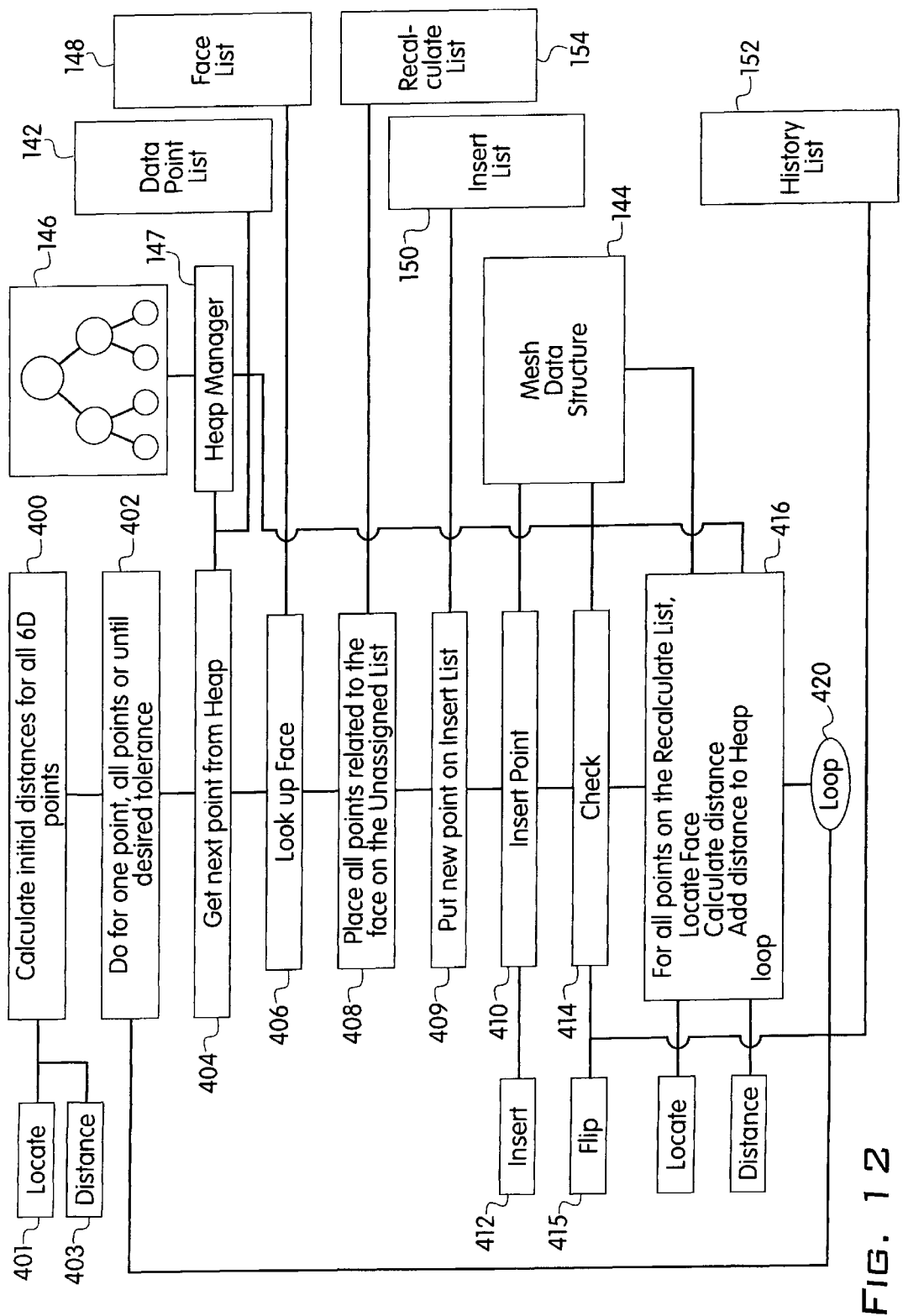

FIG. 12 Depicts an incremental insert procedure for the up resolution function of the present invention.

Figure 13:
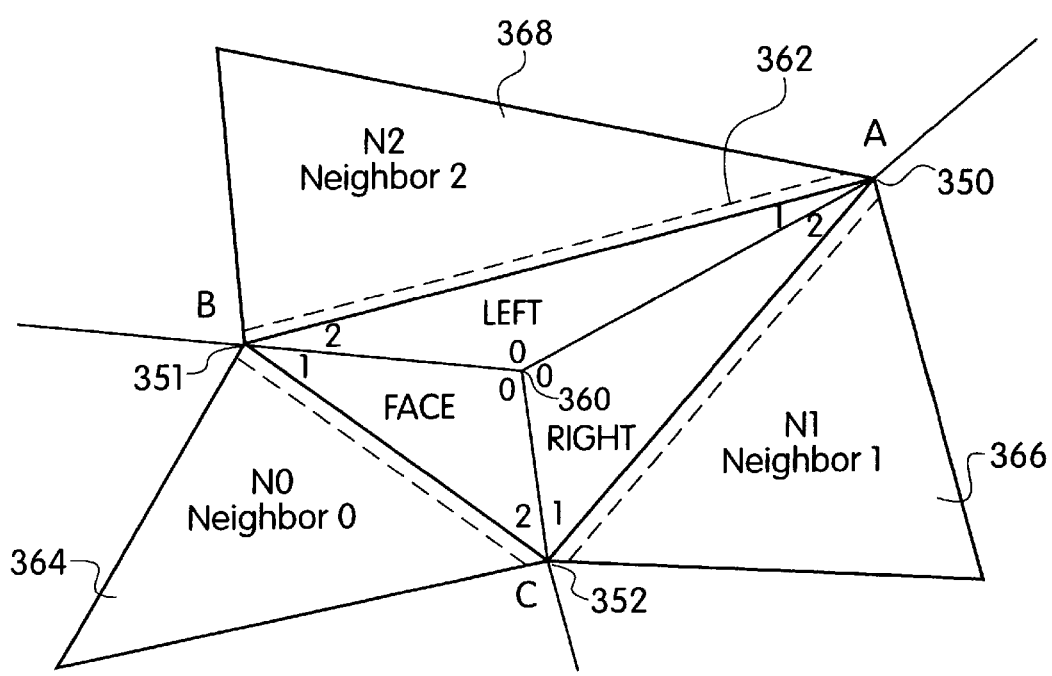

FIG. 13 Depicts a data point being inserted into a mesh triangle.

Figure 14A:
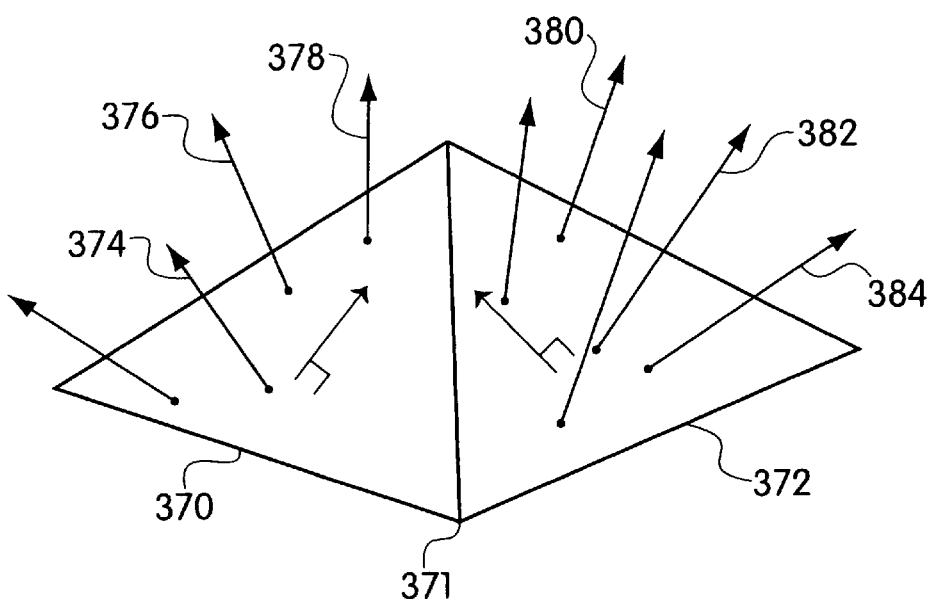

FIG. 14a Depicts two triangles which will be evaluated for flipping by data dependent principles.

Figure 14B:
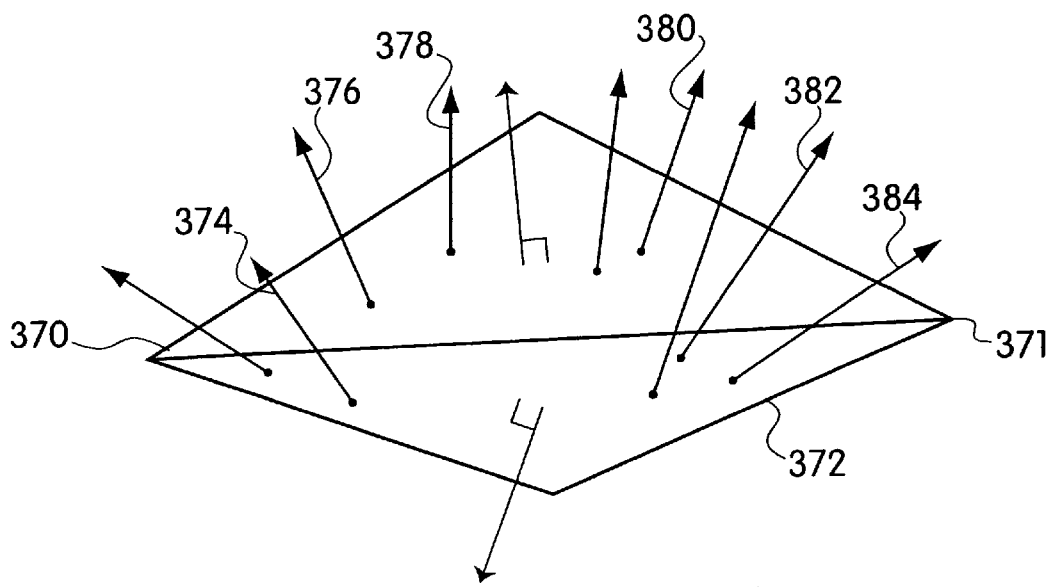

FIG. 14b Depicts the triangle of FIG. 14a after the flip.

Figure 15:
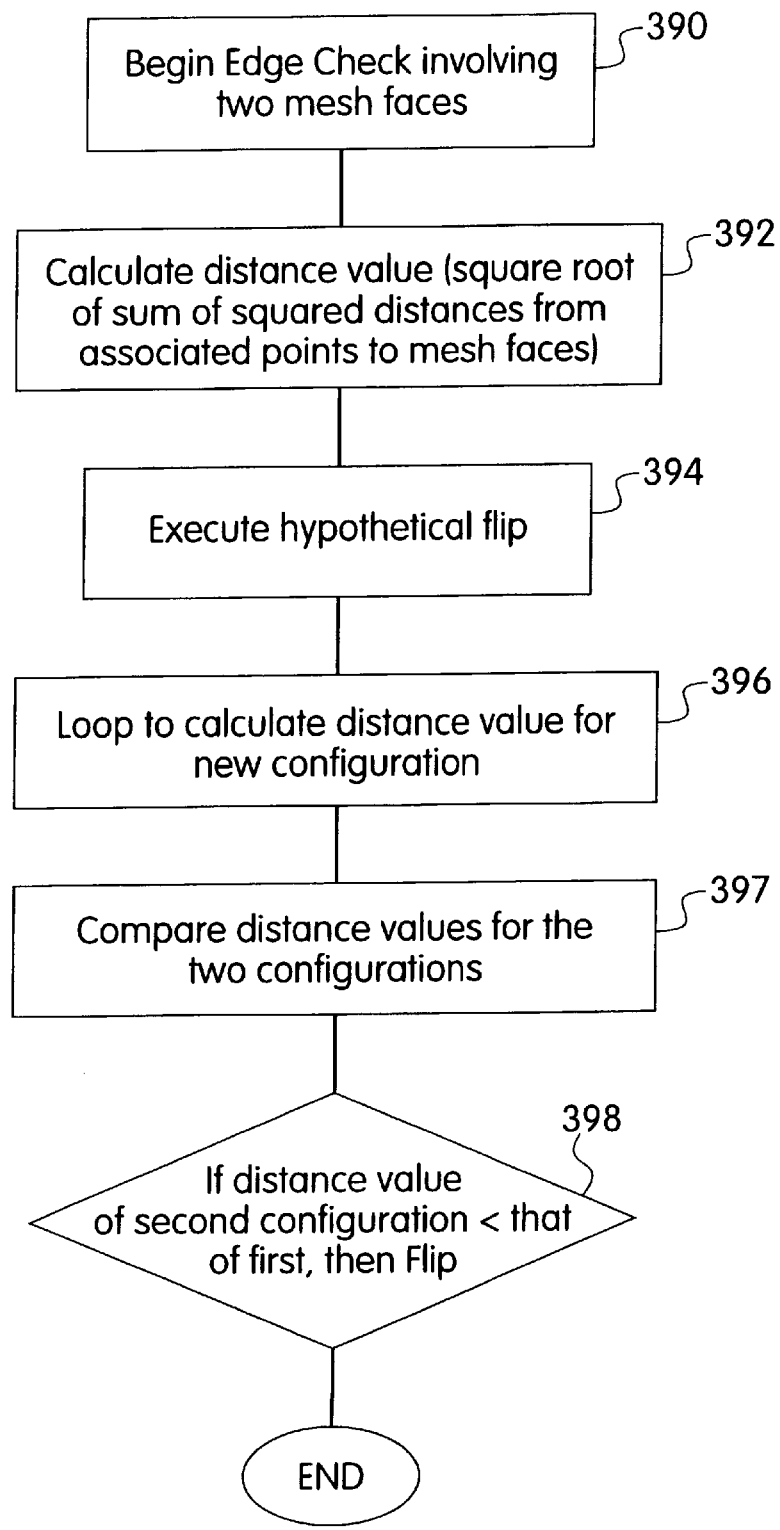

FIG. 15 Depicts an exemplary process flow for a data dependent edge check.

Figure 16:
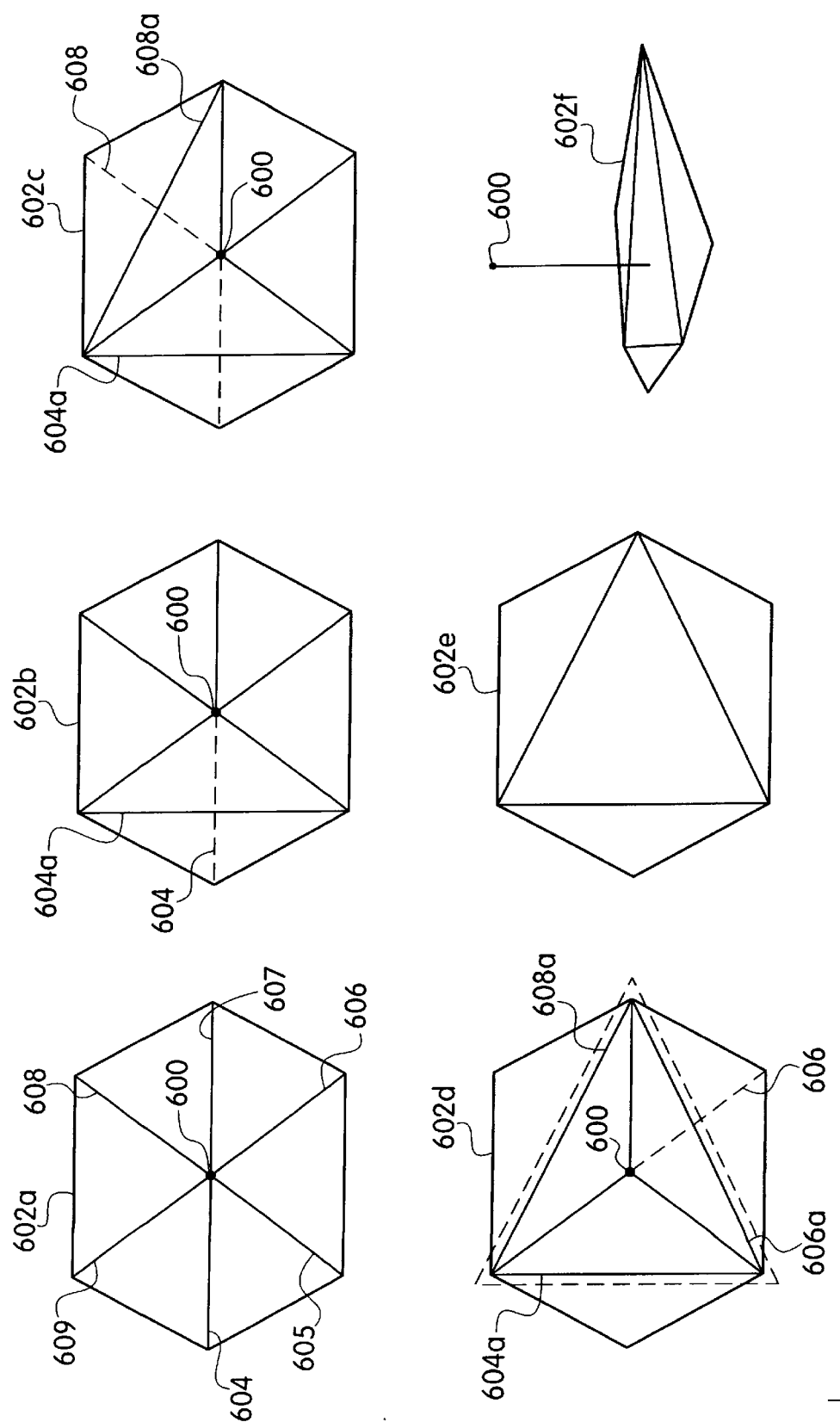

FIG. 16 Depicts a sequence of flips which might be taken to transform a mesh into a configuration for data point removal.

Figure 17:
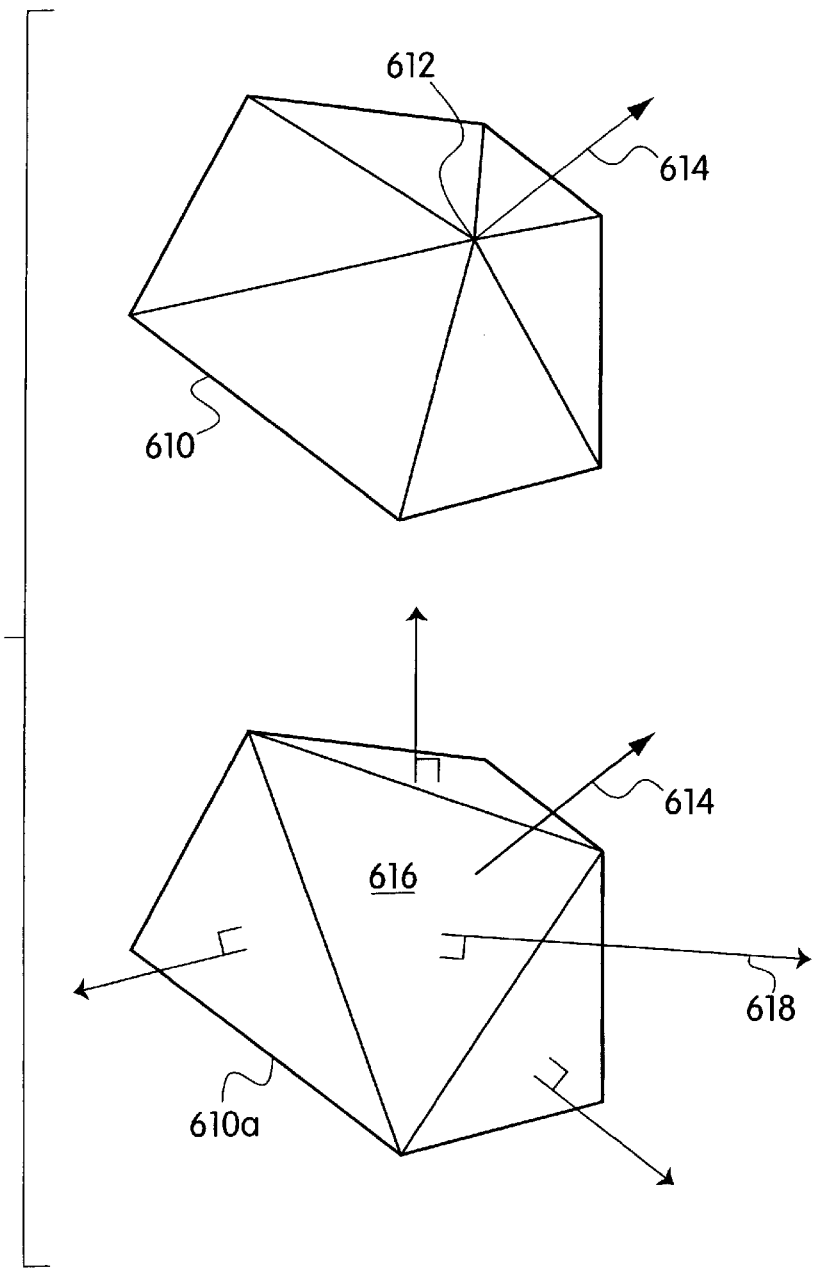

FIG. 17 Depicts a hypothetical point removal in which a distance value for the point is computed using a normal vector.

Figure 18:
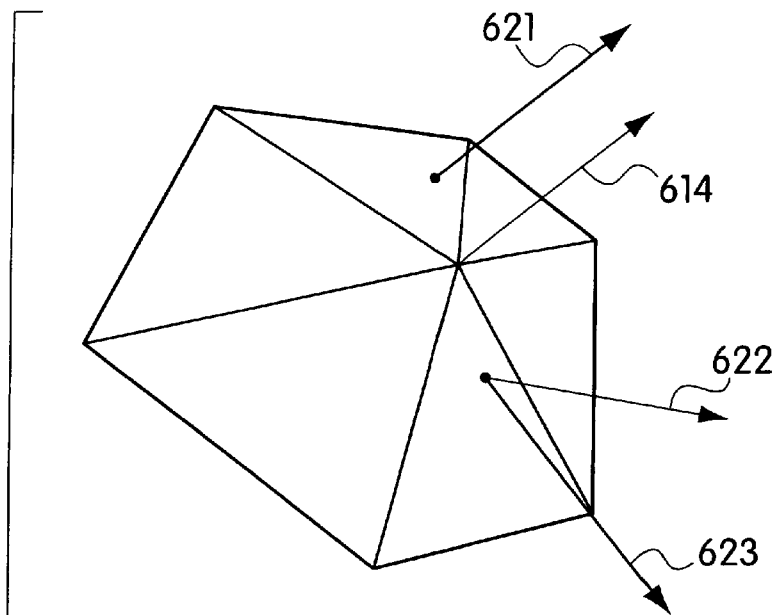
Figure 18:
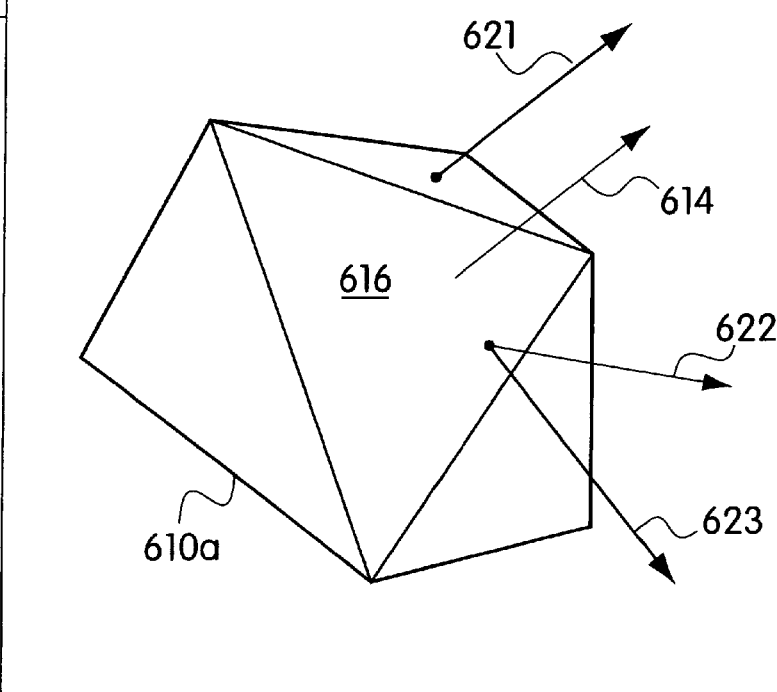

FIG. 18 Depicts a hypothetical point removal in which a distance value for the point is computed using normal vectors of the point to be deleted and the points that have previously been deleted.

Figure 19:
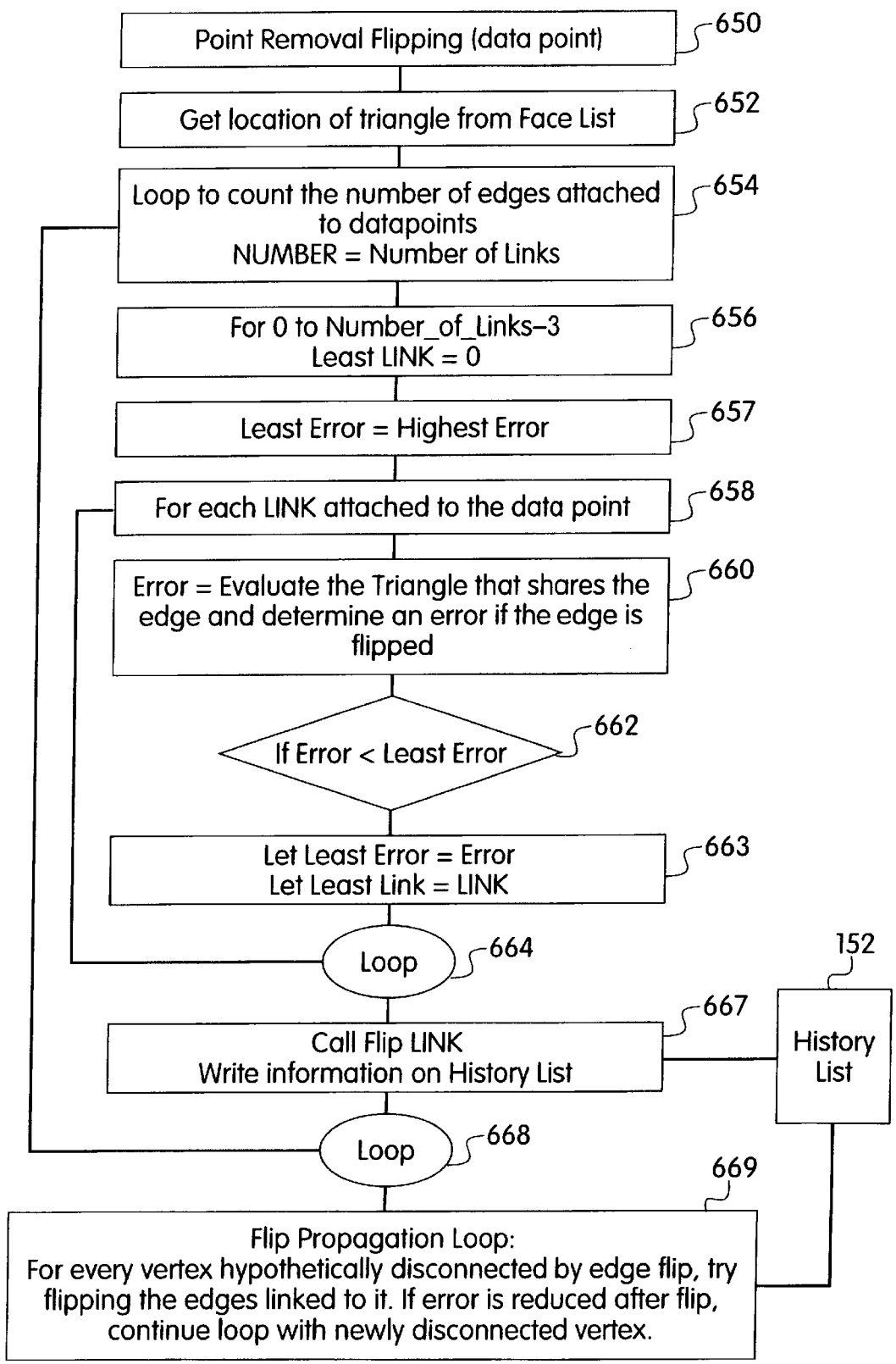

FIG. 19 Depicts an exemplary process flow for a point removal flipping procedure which minimizes structural deviations in the mesh.

Figure 20:
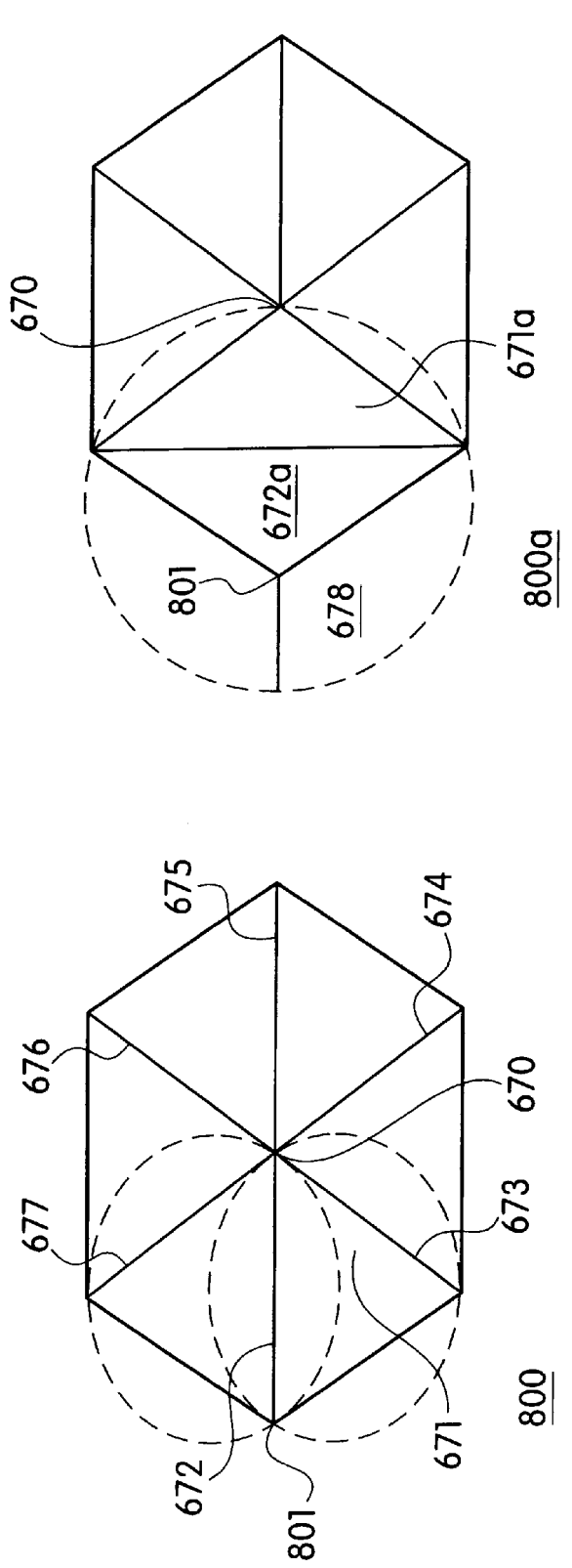

FIG. 20 Depicts the calculation of the error value for a point removal flipping procedure which preserves Delaunayian optimality.

Figure 21:
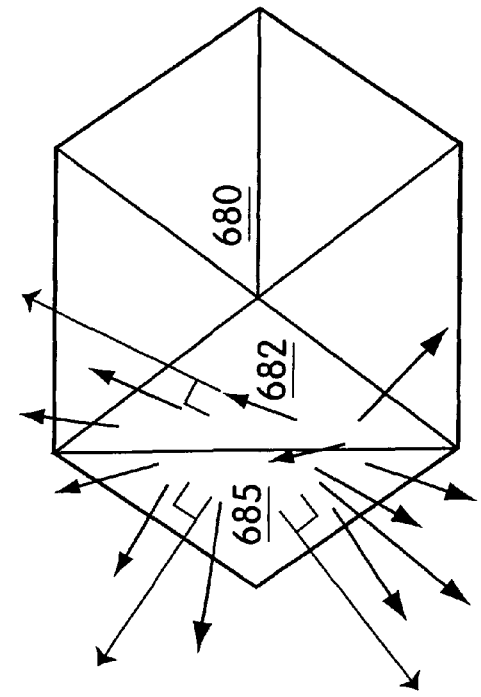
Figure 21:
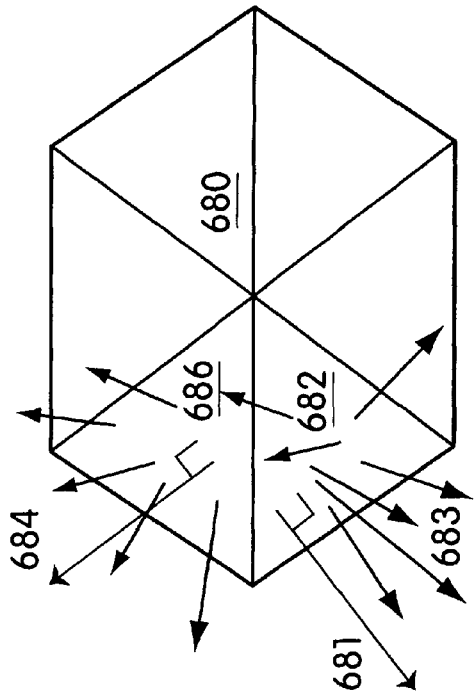

FIG. 21 Depicts the calculation of the error value for a point removal flipping procedure which preserves data dependent optimality using normals.

Figure 22:
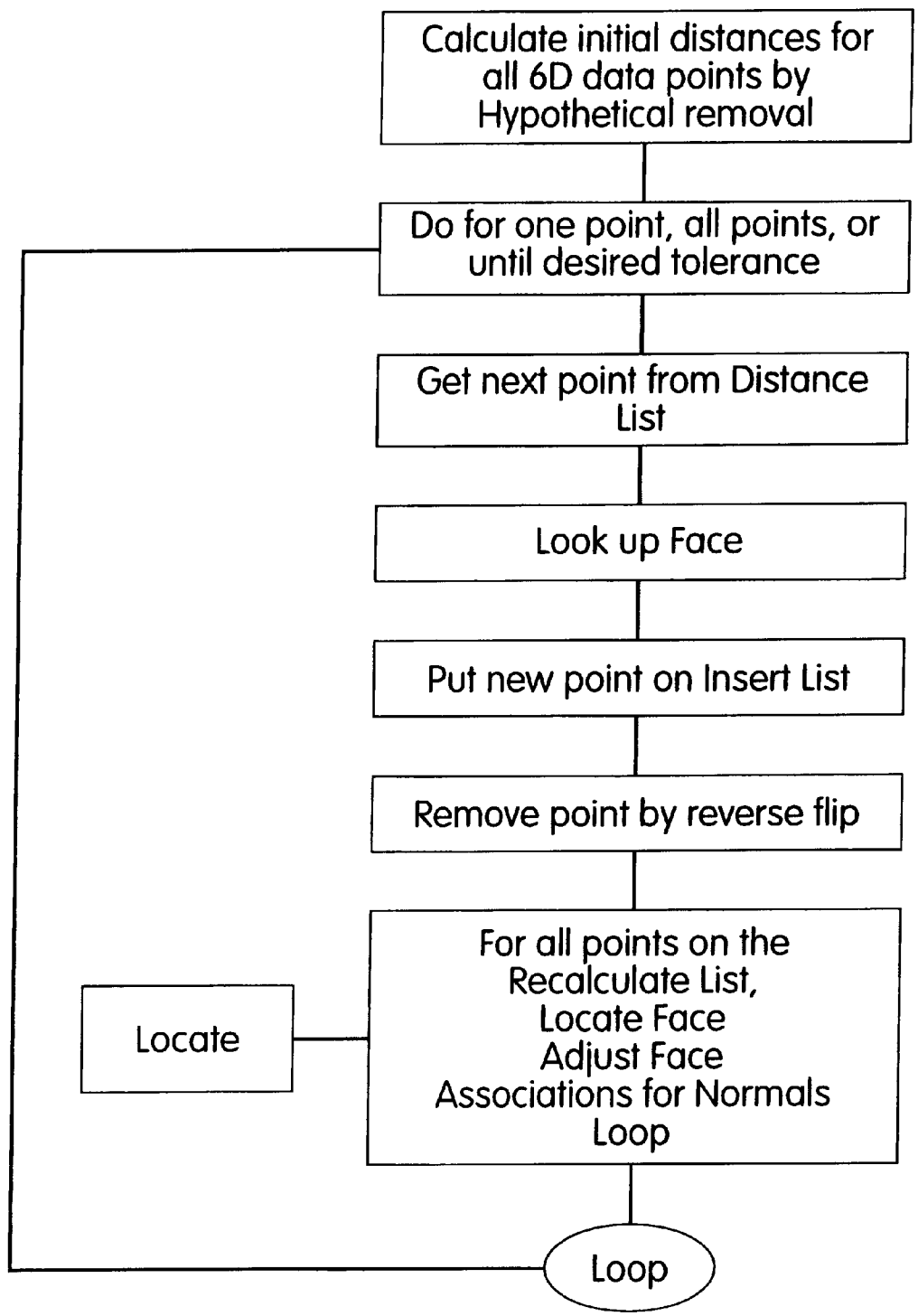

FIG. 22 Depicts an exemplary process flow for a down resolution mesh construction process.

Figures 23A, 23B:
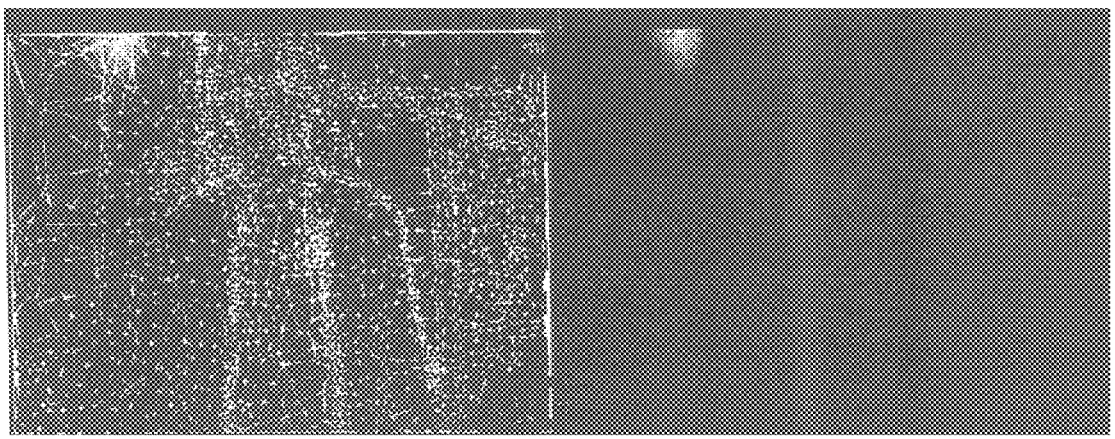

FIG. 23a Depicts a digitized photographic image.

FIG. 23b Depicts a mesh model of a photographic image.

Figure 24:
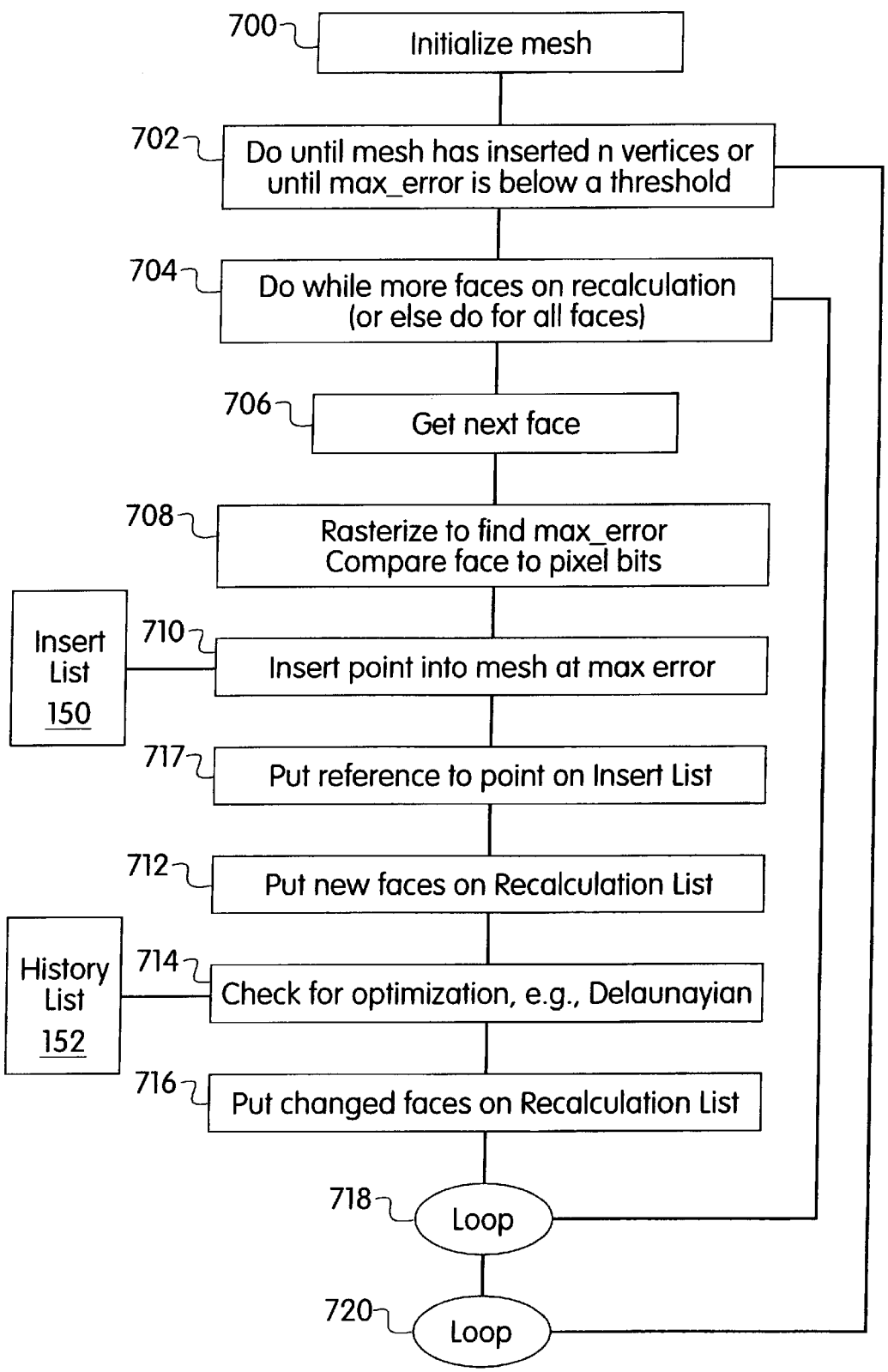

FIG. 24 Depicts an exemplary process flow for creating mesh models from a 2D bitmap.

Appendix I Contains color copies of the meshes depicted in FIGS. 2a–j.

DETAILED DESCRIPTION

Mesh Construction for 3D Object Modeling i. Overview

Figure 1:
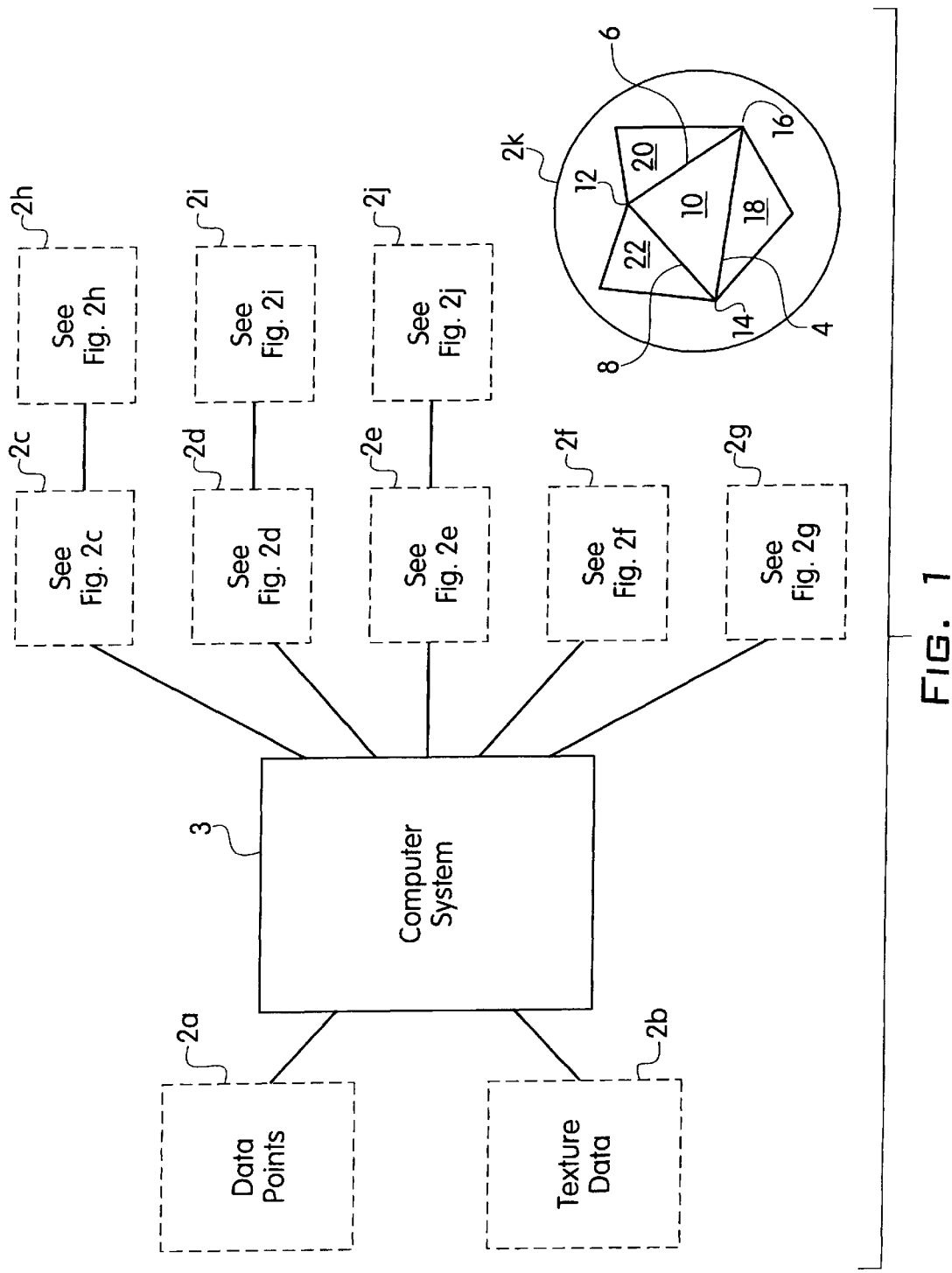
FIG. 1 Depicts a plurality of 3D data points (a cloud of points) and a texture map file which the computer system of the present invention uses to generate meshes of different resolutions and object displays.

For 3D mesh constructions, FIG. 1 depicts a plurality of data points 2a (which can be a "cloud of points" or a mesh with some connectivity information) and a texture map file 2b, which the computer system 3 of the present invention uses to build a series of meshes (e.g., meshes 2c–2g). The plurality of data points 2a are spatial X, Y, Z 3D coordinates that describe the physical contours of the object. The texture map file 2b is a set of one or more bitmaps or 2D arrangements of pixel elements which represent digitized 2D "snapshots" of the object. The X, Y, Z Coordinates in the plurality of data points link to a specific coordinate in the texture map file through a reference to a texture space u, v position. In some cases, the plurality of data points 2a will also have connectivity or other additional data associated with it such as normal data as described below.

The plurality of data points 2a and the texture map file 2b can be collected in any number of ways, such as by user input or laser scanning. A system and method for collecting data points and texture map data through scanning is described in pending U.S. patent application Ser. No. 08/620,684, filed on Mar. 21, 1996 and entitled "System and Method for Rapid Shape Digitization and Adaptive Mesh Generation," and in pending U.S. patent application Ser. No. 08/679,498 filed on Jul. 12, 1996 and entitled, "Portable 3D Scanning System and Method for Rapid Shape Digitizing and Adaptive Shape Generation." Those applications are expressly incorporated herein by reference. The applications describe systems for scanning an object with a laser light, recording the reflections of the light with a device such as a video camera and processing the information to deliver 3D spatial coordinates. The applications also describe systems and methods for collecting several color or black and white images of the scanned object and processing those images to create texture map files. FIG. 2a shows an exemplary plurality of data points 2a which comprise a set of 3D X, Y, Z coordinates that describe an object. FIG. 2b depicts exemplary texture data from the texture map file 2b (which could be in color but is shown in gray scale) which contains bitmap images of the object with each pixel having a color arrangement such as a 3 byte (24 bit) R, G, B color assignment.

In a pre-runtime process, the computer system 3 processes the incoming spatial (X, Y, Z) and texture map data by first creating an initial spatial model of the object (not shown) and then in a "rasterization" process, combining the spatial and texture map data by "wrapping" the texture map data onto the initial spatial model to form a set of multi-dimensional/multi-axis coordinates. In the exemplary embodiment, those complex data points are the 6D (X, Y, Z, R, G, B) coordinates mentioned above. The computer system 3 then constructs a mesh model having dynamic resolution capabilities from the 6D data points created above. For these constructions, the system executes either a "down resolution" construction process (which first creates an initial dense mesh which is simplified through data point removals) or an "up resolution" construction process (which starts from basic simple mesh and adds points to increase the mesh's detail).

The computer system 3 outputs the mesh data structures in different resolutions (represented by meshes 2c–2g) which can be displayed and manipulated. Using the "up resolution" construction process as an example of the system's functioning, the system of the present invention can build meshes having different resolutions of mesh, beginning with 2c. FIG. 2c depicts mesh 2c, a mesh of comparatively low resolution illustrating mesh construction after the addition of just a few hundred 6D data points. FIG. 2d depicts mesh 2d, a mesh of middle resolution after the addition of more 6D data points. FIG. 2e depicts mesh 2e, a mesh of highest resolution. From mesh 2c to 2e, the system adds detail to the mesh incrementally through the insertion of points. Each mesh incrementally generated from 2c–2e has more and more data points, until, as shown in mesh 2e (FIG. 2e) all but a few data points of insignificant detail have been added to the mesh. In the selection process for adding points by "up resolution" construction, the computer system 3 selects 6D data points to add to the mesh according to a technique which determines the point's significance in terms of both spatial and color data. If a 6D data point is significant because it adds spatial characteristics, the system will add it to the mesh. In addition, if a data point adds significant texture, such as important color details, the system will add it to the mesh as well.

As 6D data points are added to the mesh in the "up resolution" mesh construction process, the computer system 3 stores the order of point insertions and a list of changes executed during the insertion process. At run-time, this history can be used to remove points rapidly and decrease the mesh and then rapidly restore the points to "up resolution" the mesh again. In FIG. 1, mesh 2f depicts a mesh of lower resolution than mesh 2e. Mesh 2g returns the mesh to the low resolution quality, similar to mesh 2c. FIGS. 2f–2g show exemplary depictions of such meshes. Because the present invention maintains a specific history of the additions and subtractions of points to and from the mesh, the deletion and addition of the sequence of points can be monitored by the system and that history can be stored in a compact, coded sequence for rapid up and down resolution mesh construction at runtime.

In addition to the "up resolution" mesh construction format, the present invention also provides a "down resolution" construction format, where all 6D points are combined into a single dense mesh which is then simplified through data point removals. The system stores the sequence of point removals so that at runtime the resulting simplified mesh can be rapidly "up resolutioned" and "down resolutioned" like the meshes created by the "up resolution" construction format.

In the exemplary up and down resolution mesh construction processes, the system creates an irregular triangulated mesh as shown in insert 2k in FIG. 1. The edges of the mesh faces, e.g., edges 4, 6 and 8 in mesh 2k create geometrically shaped, planar faces, such as triangle 10. The vertices of any triangle, e.g., points 12, 14 and 16, are 6D data points which the system adds through incremental input in the "up resolution" construction process or deletes in the "down resolution" construction process. Each triangle in the mesh, e.g., triangle 10, has a set of neighboring triangles, e.g., neighbors 18, 20 and 22. The faces, edges and vertices can be associated with other information concerning the object such as normal data and color/texture information. In this way, a mesh model structure contains spatial and texture information to output photorealistic displays of the object.

Each model generated by the system can be used to output depictions or reproductions of the object, with the resolution of the depiction varying according to the resolution of the mesh. FIG. 2h depicts in gray scale an image generated with the relatively low resolution mesh of FIG. 2c. FIG. 2i depicts an image generated with the middle resolution mesh 2d and FIG. 2j depicts an image generated with the high resolution mesh of FIG. 2e. As each of the data points in the mesh carry color as well as spatial information, it is possible to generate an image of the object using only the mesh model. Algorithms for rendering, such as rasterization processes using Gouraud or Phong shading techniques, render mesh triangles in gradient color based on the color values contained in the 6D vertex coordinates of each face, so that a very life-like image of the object can be generated.

In an exemplary embodiment, the computer system 3 employs a computer (not shown) comprising a central processing unit ("CPU" or "processor") to accept input data, manipulate the data and create data structures related to the model building. The processor is coupled to one or more memories which store the data, data structures and programmed elements. In addition, the processor is coupled to graphics hardware such as a VGA card and could be coupled to more specialized graphics hardware (such as a rendering engine which can execute polygonal shading by linear or bilinear interpolation such as Gouraud shading). The computer system 3 also comprises a display device and input devices like a keyboard and a mouse which are coupled to the processor. In an exemplary embodiment, the computer manufactured by Silicon Graphics Incorporated and sold under the product name Indigo2™ is suitable to implement the system of the present invention. The Indigo2™ computer has a R4400, 250 MHZ processor, 32 Mb of primary RAM storage and includes hardware capable of performing the needed rendering. In addition, more powerful computers such as the OCTANE™ or $O_2$™ computers using single or dual MIPS R5000 and R10000 CPU's, which are also manufactured by Silicon Graphics, can also be used. Further, generic PC computers that have an Intel Pentium host processor having a graphics operating system (such as Microsoft Windows), of approximately 16 Mb of RAM, and graphics processing capabilities that support rendering such as Gouraud shading, are suitable for storing mesh constructions and outputting displays. For more information concerning the Silicon Graphics' Indigo2™, OCTANE™ and $O_2$™ computer systems, the reader is referred to information and references listed at the following websites:

http://www.sgi.com/Products/hardware/Indigo2/tech.html and http://www.sgi.com/Products/hardware/desktop/tech.html A set of programmed elements stored in memory provides instructions that the processor executes to perform the operations of the computer system 3. In the exemplary embodiment, programmed elements are written in the C++ programming language. For more information on the C++ programming language the reader is referred to the following publications which are expressly incorporated herein by reference: *The C++ Programming Language*, Bjarne Stroustrup, Addison Wesley Publishing Co., 1991; *C++ Inside & Out*, Bruce Eckel, Osborne McGraw-Hill, 1993.

ii. Process Flows and Data Structures

FIG. 3 depicts an overview of the basic program elements and data structures used to implement the exemplary meshing functions for the computer system 3. A build and wrap function 130 merges the 3D X, Y, Z plurality of data points 2a (the cloud of points) and the texture map file 2b to create the set of 6D (X, Y, Z, R, G, B,) values in a two-step process. The processor uses the build and wrap function 130 to construct an initial spatial mesh (if one has not been provided) and then, in a "rasterization" process, wraps the set of points from the texture map file around the mesh to create a set of 6D coordinates.

Once the 6D coordinates have been constructed, the computer system 3 will use the points in a pre-runtime process to build a mesh structure that has dynamic resolution capabilities following either an "up resolution" construction process 131 or a "down resolution" construction process 132:

In the "up resolution" construction process 131 the system begins with an initial mesh of just a few points and then builds a more complex 6D wireframe mesh point by point through a selection process where it chooses the order of points to insert. In the selection process procedure which is described in further detail below, the system chooses from all the available unmeshed points the next most significant point to add in terms of color or spatial detail. At any point during the mesh building process, the computer system 3 can output or save the mesh, or display a depiction of the object by sending information from the mesh to a rendering function 134. The rendering function 134 prepares the mesh for display.

In the "down resolution" construction process 132, the system first builds a mesh to its fullest density using all the created 6D points and then simplifies it by removing points in successive point deletion steps. In determining which next point to remove from the mesh, the down resolution processing function 132 evaluates the remaining points to locate the data point which adds the least amount of detail to the mesh in terms of color or spatial detail. The procedure for point selection is described in further detail below. Just as the meshes created through the up resolution construction process 131 could be output and rendered at any point during the point insertion process, the meshes created through the sequence of point removal processes in down resolution construction can also be output or saved; in addition, the system can display images of objects using meshes of various "down resolution" detail. The rendering function 134 prepares these meshes for display.

CALCULATING THE SIGNIFICANCE OF DATA POINTS:

In both the up resolution construction process 131 and the down resolution construction process 132, the present invention uses a selection process to choose what next data point to add or remove. In the up resolution process, the decision to add any 6D data point into the mesh is based on a determination of whether that point, of all the remaining unmeshed points, is the "most significant" to the mesh structure in terms of adding spatial, color or other detail. In the down resolution process, the decision to remove any 6D data point from the mesh is based on a determination of whether that point of all the remaining points in the mesh is the "least significant" to the mesh structure in terms of adding spatial, color or other detail.

To find the "most significant" or "least significant" point in any given mesh construction, the system and method of the present invention performs a series of steps (as will be described in further detail below) to calculate a "distance" value which represents significance. In the exemplary embodiment, the present invention can calculate significance by two possible methods:

1) "geometric/color distance" or
2) normal distance

GEOMETRIC/COLOR DISTANCE:

Functions for calculating "geometric/color distance" and the color distance, using 6D (X, Y, Z, R, G, B) data point values, incorporate both the spatial distance and the color distance that a data point has from an associated mesh face when the data point has been removed from the mesh. In the up resolution construction process 131, the unmeshed point that has the highest distance value will be the next most significant point. The exact specifications for distance calculations in exemplary embodiments are set forth below. In the down resolution process 132, the calculation of geometric/color distance requires that the system "hypothetically" remove the point from the mesh and then calculate a distance for the point against a triangle in the mesh that could be associated with the removed point. In contrast to the geometric/color distance calculation in up resolution construction which seeks to locate the unmeshed point with the largest distance. The geometric/color calculation procedure in the down resolution construction process searches for the point of "least" significance and the meshed point that has the lowest distance value will be the "least significant point."

NORMAL DISTANCE:

It is known that when a point has been inserted into a mesh structure, the system can associate with that point a normal vector which gives an indication of the topology of the mesh structure at that point. A vector that is normal to a plane is perpendicular to all the vectors contained in that plane. In the exemplary embodiment, the normal for a point is calculated to represent an average of the sum of the normals for all triangular faces that are connected to the data point and use it as a vertex. FIG. 4 depicts a normal 155 for the point 156 which has been constructed from the normals 157–161 of the triangles 162–166.

In an up resolution construction process, the use of normals for the determination of significance would be most practical if the data points came to the system with their normal vectors already associated. When the initial set of points consists of a random "cloud of points" with no associated connectivity information and no normal data associated with them, it may be too time consuming to execute a point insertion process in up resolution construction using the normal distance calculation as the determinant of significance. However, if the initial plurality of data points 2a came to the present invention with some connectivity information, including normal information, or if normal vectors were derived from the connectivity information available, then the processor could use the normal distance calculation procedures outlined below to create an up resolution procedure that determines significance by normal distance.

In a down resolution construction process, calculating normals can be more practical and in the present invention, a system for calculating normals is presented as part of its process of preparing a mesh for down resolution construction. During the down resolution construction process, the processor can (before down resolution point removal begins) calculate a normal vector for each data point in this dense mesh. Because the mesh is in its most dense and detailed state at the beginning of the down resolution process, the normal vectors provide a good indication of the surface topology for the mesh. Thus, in a down resolution process, normals can be used easily in the selection process that determines what next point to remove.

When considering the effect of any point removal on the mesh structure in a down resolution point removal process, the system can compare the normal of the remaining face at the location of the point removal against both: 1) the normal for the data point removed and/or 2) the normals for all of the previous points removed that are projected into the mesh triangle being compared. Using the set of originally computed normals for comparison, the present invention enables the determination of significance to be based upon the topology of the original dense mesh—i.e. the reference which most closely approximates the original object. In the exemplary embodiment this procedure is described in detail below.

The present invention can also be configured to recompute normal vectors for each data point remaining in the mesh as the mesh changes in the down resolution mesh construction process 132. Thus, as points are removed from the mesh and the topology of the mesh changes, the system can recompute the normal vectors for each remaining point. In such an embodiment, using "dynamic normal calculations," the system evaluates both the current normal vector for the point under consideration as well as normals for points that have been removed from the mesh that were associated with the triangle in question. This determination of significance allows the system to create a smooth transition between point removals in the mesh.

CHECKING THE MESH CONSTRUCTION FOR OPTIMALITY:

As points are added to a mesh in up resolution construction or removed from a mesh in down resolution construction, each of those processes (131 and 132) execute a checking procedure which examines the connectivity of the mesh and insures that the mesh maintains an optimal structure. In the exemplary embodiment, checking of the mesh structure in the up resolution process can be accomplished by a number of checking procedures which optimizes by:

Delaunayian optimization principles; or

Data dependent principles

The Delaunayian and data dependent checking procedures flip edges to change the connectivity of the edges and data points as necessary to achieve better structural quality for each mesh. Delaunay triangulation optimality principles help to insure that the irregular triangulated mesh maintains a construction of evenly proportioned triangles. As stated above, Delaunayian triangulation principles teach that a circumcircle defined by the vertices of a triangle will not contain another data point of the mesh. Delaunay triangulation is recognized as one type of optimization for mesh construction which insures homogeneous, regular triangles.

Data dependent optimization techniques use the information available about the shape of the object and will adjust the edges of the mesh so that they are aligned with the contours of the object. Data dependent optimization techniques evaluate object related data such as:

Geometric and color distances; and

Normal distances when attempting to optimize mesh connectivity. Data dependent edge checking routines can be used in both the up resolution construction process 131 and the down resolution construction process 132. Again, as normal vectors are more easily and readily compatible in a down resolution construction process, data dependent checking would more ordinarily be performed in a down resolution construction process. However, normal-based data dependent checking could be used in up resolution mesh construction, especially if the data points came to the mesh construction system with associated normal information.

CREATING HISTORY LIST DATA:

As the system either adds or removes selected points in the up resolution construction process 131 and the down resolution construction process 132, the system also tracks the history of steps taken for those point insertions or removals, including the checking steps taken to achieve the optimal quality characteristics (such as by Delaunay or data dependent optimality principles). Both the up resolution construction process 131 and the down resolution construction process 132 store information concerning those steps—the history data.

The history data permit the up resolution and down resolution construction procedures 131 and 132 to create meshes with dynamic resolution capabilities. The processor uses the history data to undo or reverse a point insertion by deleting the point or reversing a point deletion by inserting the point. To take advantage of those dynamic resolution qualities, the system of the present invention provides in FIG. 3 an up/down resolution toggle function 136 to dynamically adjust the resolution quality of any mesh using the values stored in mesh's history list data. The up/down resolution toggle function 136 follows back and forth over the list of inserted or deleted points and the information in the history list (described below) to execute rapid resolution adjustments. The up/down resolution toggle function 136 in the exemplary embodiment also functions with the rendering function 134 to output displays of meshes at any given resolution. In addition, an interface 138, provides a user or application interface for the mesh construction, toggle and display functions (131,132,134 and 136).

To perform their functions, each of the programmed elements for up resolution or down resolution processing 130–136 will access a number of data structures 140. Although many different data structures are suitable, the following are exemplary for the data structures 140:

6D DATA POINT LIST 142:

In the exemplary embodiment, the data structure for the 6D data point list 142 contains two arrays: an X,Y,Z array (141), which contains spatial coordinates, and an R,G,B array (143) which contains color coordinates. Each array (141 and 143) is dynamically allocated and sized to the number of data points created through the wrapping process (build and wrap 130). In the exemplary embodiment each X, Y, Z array slot has three floating point numbers (e.g., 32 bits each) allocated to it. The R, G, B array has 24 bit locations in each slot (8 bits per color). Each X, Y, Z value is combined or linked to a specific R, G, B value. At each entry in the X, Y, Z array 141 in the exemplary embodiment there will be a R, G, B color value corresponding to that point at the same location in the R, G, B array 143. For the three color values, red, green and blue (R, G and B), it is understood that color or texture values can be represented in other ways, such as by black/white/gray, cyan-magenta-yellow (CMY), hue/saturation/intensity (HSI), y-signal, u-signal and v-signal (YUV) or other color space systems, and the R, G, B array 143 in the 6D data point list 142 would contain data slots for such other representations.

In an alternative embodiment, the 6D data point lists could also be stored using a tree structure in which the X, Y, Z and R, G, B, arrays are created not as corresponding lists but as two corresponding trees, where for each node in the X, Y, Z array 141 there is a corresponding node in the R, G, B array 143.

NORMAL LIST 149:

In addition to the spatial and color data maintained for each point in the data point list 142, the present invention also provides a data structure to store other "per-vertex" information, such as normal information. As stated above when a vertex has been placed in a mesh configuration, it is possible to calculate for that point a normal vector which gives an indication of the curvature or topology of the mesh. Also, in some situations, normal information can either be included with the data point information or derived from connectivity information. When such normals are available, such as in the exemplary down resolution process 132, the system stores the normal vectors associated with each set of X, Y, Z, R, G, B coordinates in a normal list 149. Like the X, Y, Z and R, G, B arrays 141 and 143, the normal list 149 is a dynamically allocated array corresponding to the number of available 6D data points. For each entry in the X, Y, Z array 141 there will be a corresponding entry in the normal list 149 into which the system can write computed normal values, such as three 32 bit floating point numbers.

MESH DATA STRUCTURE 144:

As the initial mesh is constructed and points are either inserted or removed by the up resolution construction process 131 or the down resolution construction process 132 (and the up/down resolution toggle function 136), the system will access and alter a mesh data structure 144. The mesh data structure 144 maintains information for each mesh face, its vertices, edges and neighboring faces. The mesh data structure 144 contains a plurality of face records (e.g., 145) (such as a linked list) each of which contains information concerning a particular geometric mesh face. The set of face records together form the data structure for the mesh model. In an exemplary embodiment, the system represents a face record in an irregular, triangulated mesh as follows:

| Record: "FACE" | |
|---|---|
| NEIGHBORS: | Neighbor #0, Neighbor #1, Neighbor #2 (Array of 3 pointers to other FACE records) |
| VERTICES: | Vertex #0, Vertex #1, Vertex #2 (An index array containing the slot location references to each of the three 6D (X, Y, Z, R, G, B) coordinates on the data point list 142) |
| FLAGS | Indicators specifying properties of a face, such as its position on a triangulation |
| ASSOCIATED POINT INDICES | Index references to locations on the 6D data point lists for each data point that is "associated with the face of any given construction" (e.g., an index to the first element in a linked list of indices of vertices associated with a face) |
| FACE INDEX | Unique ID of the face |

The data element NEIGHBORS consists of an array of three pointers, each pointing to a FACE record for a neighboring (adjacent) face in the mesh. The data element VERTICES is an index array that references a location on the 6D data point list 142 (and the 6D (X, Y, Z, R, G, B), point information) for each of the triangles' vertices.

The system stores data concerning each vertex and neighbor in the face records of the mesh data structure 144 according to a rigid ordering system. In an exemplary embodiment, as shown by the triangle in FIG. 5, the system orders the points of a triangle in a counterclockwise sequence: 0, 1 and 2. It is understood that the vertices could also be numbered in clockwise order or ordered by another fixed ordering system. The system orders the neighboring triangles in the same counterclockwise order to relate them to the vertices. The system indexes neighbor #0 to be directly opposite vertex 0. Neighbor #1 is directly opposite vertex #1. Neighbor #2 is directly opposite vertex #2. As is described below, the present invention provides a system to maintain this ordering during point insertion and deletion and during any checking procedure to insure the optimality of the mesh such as a check to maintain Delaunayian or data dependent optimality. This system uses the ordering of the vertices and neighbors (as is described in further detail below) to complete the needed mesh reconfigurations.

The associated point indices of the face records contain the 6D data point array locations for each 6D data point that must be associated with the triangle, for purposes of calculating distance values—based on geometric distance or normal distance—or for optimal construction checking. When the faces are altered, such as by point insertions or point deletions, the data points associated with a particular face change. As changes to the faces occur, the system of the present invention will rearrange the set of associated data points for each altered face.

FACE LIST 148:

The vertex list records in the face records (e.g. 145) of the mesh data structure 144 provide a link from face to data point for each of the vertices in the mesh. To build a link from any data point to the mesh, the presented invention provides in the exemplary embodiment a fact list 148. The face list is an array structure containing points whose index entries correspond to the entries in the 6D data point list 142. When a point is inserted into the mesh, the process will associate a point reference to the face in which the point has inserted. The reference to this one initial face permits the system to rapidly access the mesh at the location of that data point.

DISTANCE LIST 146

As stated above, the present invention uses a selection process to choose what next data point to add in the up resolution construction process 131 or remove in the down resolution construction process 132. The decision to add any 6D data point to the mesh in up resolution construction is based on a determination of whether that point, of all the remaining unmeshed points, is the "most significant" to the mesh structure in terms of adding spatial, color or other detail. The decision to remove any 6D data point from any mesh in down resolution construction is based on a determination of whether that point of all the remaining points in the mesh is the "least significant" to the mesh structure in terms of adding spatial, color or other detail. To find the "most significant" or "least significant" point in any given mesh construction, the system and method of the present invention performs a series of steps (as will be described in further detail below) to calculate either: "geometric/color distance" or the normal distance.

When a distance is calculated for a given point in up or down resolution constructions, the distance value is added to a distance list 146. (FIG. 3) In an up resolution construction format, the distance list 146 contains the calculated distance of each unmeshed data point as it exists in from the relevant face on the existing mesh. In a down resolution construction format, the distance list 146 contains the calculated distance value for each meshed point remaining in the mesh. As the processor calculates a distance value for a given 6D data point, in either the up or down resolution constructions, the processor makes the calculation with reference to a particular face and thus, for distance calculation, a point will be "associated" with a particular face. The processor will then store on the distance list 146 information including: (i) the calculated distance value; (ii) an index reference to the location on the 6D data point list containing the 6D (X, Y, Z, R, G, B) coordinates for the point; and (iii) a pointer reference to the particular face record in the mesh data structure 144 for the associated face.

When a point is entered into the mesh in up resolution 131 or removed from the mesh in down resolution 132, the distance value for the point is set to 0 (or its entry can be deleted from the list). As the system of the present invention adds or removes points according to the distance selection process, the computer system 3 organizes the entries in the distance list 146 by a technique that always returns the 6D data point having the largest distance from its associated face in an up resolution construction or the point having the smallest distance in down resolution construction. The computer science technique of "heaping" is one organizational system suitable for storing distance values on the distance list 146 and quickly returning either the largest or smallest distance value. A heap organizes a list into a tree structure where each parent node has a distance value that is larger than each of its children. In the up resolution construction, the processor maintains the largest distance value at the top of the tree structure (e.g., position 147) along with a pointer to its vertex in 6D data point list 142. In the down resolution construction format, the smallest distance value remains at the top of the heap. A set of heap manager functions 147 enable the processor to add and delete values from the heap.

INSERT LIST 150 AND HISTORY LIST 152:

When the computer system 3 adds a 6D data point to the mesh in the up resolution construction 131 or removes a point in down resolution construction 132, it will also write indications of the insertion process on an insert list 150 and a history list 152. The insert list 150 and the history list 152 are data structures that permit the system of the present invention to perform rapid up/down resolution toggling at run-time. These lists provide data structures used to track the sequence of point additions and other changes that occur so that the up resolution and down resolution construction processes can be rapidly reversed and replicated.

The insert list 150 contains locations which store a copy of the 6D X, Y, Z and R, G, B coordinates of the point which the processor has deleted or inserted. These values have been copied from the arrays in the 6D data point list 142. In the exemplary embodiment, the insert list 150 also contains a reference to a face record in the mesh data structure into which the data point was inserted or from which it was removed. For each entry in the insert list 150, the history list 152 contains a sequence of compact indicators which provide information so that the system can reverse steps of the optimality checking that occurred during point insertion or point removal.

In the exemplary embodiment, both the insert list 150 and the history list 152 comprise stack structures where the processor enters data in an order which can be quickly reversed. The insert list and history list can be maintained as separate lists or they can be compared as one single list.

In the up resolution construction process 131, the processor loads the insert list 150 and history list 152 in LIFO (last in first out) order. As the point inserted earlier in up resolution construction are more significant than the points added later, the earlier points should be removed last in any down resolution toggling. In the down resolution construction process, the system constructs the insert list 150 and the history list 152 in the opposite way. As points are removed from the mesh during down resolution the processor loads the insert list 150 and history list 152 stacks in FIFO (first in first out) order. Because the deletion processor removes points of less significance earlier and more significance later, in rapid up resolution toggling the processor will seek to reinsert the most important points first.

In an alternative embodiment, the information contained in the insert list 150 and history list 152 could be maintained in a vertex tree structure instead of a stack structure. The vertex tree structures would support view-dependent multi-resolution.

Once the insert list 150 and history list 152 have been built by either up resolution or down resolution, the system of the present invention can rapidly increase or decrease detail (and provide "dynamic resolution" capabilities using those lists).

The system can then increase or decrease resolution from the mesh simply by following in reverse order the stacks of the insert/delete list 150 and the history list 152. The computer system 3 can also regenerate meshes to specific levels of detail by following the sequences of point removals and reconfiguration already indicated on the insert list 150 and the history list 152. To perform extremely rapid mesh generations, the computer system 3 will first build the insert list 150 and history list 152 in a pre-routine time process following either the up resolution or down resolution process, adding or deleting points in a first pass to the full capacity of the mesh and then, in subsequent mesh model generation processes, simply follow those lists to rapidly regenerate meshes to any level of detail, such as to a user-specified tolerance.

RECALCULATE LIST 154:

As stated above, as 6D data points are added to or removed from the mesh, the faces of the mesh change. When those faces are changed, values calculated for any 6D data points associated with the face can change. In addition, some of the 6D data points which are associated with the mesh face can no longer be associated with the face after the insertion or deletion. When such alterations occur, the computer system 3 must calculate new values for the affected 6D data points or rearrange their associations with particular mesh faces. To streamline the recalculation process, the computer system 3 employs a recalculate list 154 to list face records whose 6D data point values will need reevaluation. In an exemplary embodiment, the recalculate list 154 operates as a stack (maintained in LIFO order) containing pointers to entries in the 6D data point list 142.

The data structures 140 described above are used with the basic program elements to perform system functions. It is understood that the data structures 140 are exemplary; the teachings of the present invention can also be implemented using other data structure configurations. In addition to the elements described above, there are also a number of task performing subroutines and functions which are further described below.

iii. 6D Mesh Construction a. building and wrapping

As stated above, the computer system 3 uses the build and wrap function 130 in an exemplary embodiment to construct a set of 6D (X, Y, Z, R, G, B) data points. The process as depicted in FIG. 6 consists of two steps: first is a step (step 170) of building (if necessary) an initial wire frame mesh (which can be one which uses only the 3D spatial coordinates); second is a step (Step 172) of "wrapping" the pixel coordinates of the texture map around the 3D wire frame mesh and constructing 6D (X, Y, Z, R, G, B) coordinates for each of the available pixels through a rasterization process.

Step 170, the step of generating an initial spatial mesh, requires the processor to create a wire frame mesh using only the 3D X, Y, Z spatial values. Many different techniques currently exist for creating a wire mesh of 3D object coordinates. Pending U.S. patent application Ser. No. 08/730,980, expressly incorporated by reference herein, describes a system and method which is suitable for rapidly building the initial triangulated mesh using spatial values in step 170.

Each X, Y, Z data point in the plurality of data points 2a comes with a reference (—a u, v reference) to a corresponding pixel point in the texture map file 2b. The X, Y, Z and R, G, B values for these data points can also be loaded into the 6D data point list. Alternatively, the initial spatial mesh can be stored in a temporary data structure.

In step 172, the rasterization process can be configured in the exemplary embodiment to generate either a full compliment of X, Y, Z coordinates for every R, G, B texture map coordinate. Alternatively, the rasterization process can be configured to make a more selective pass through the texture map coordinates and create X, Y, Z, coordinates only for certain R, G, B texture map values. Because full rasterizations can potentially generate hundreds of thousands of new 6D data points, it may not be advantageous to introduce them all into the mesh construction. In the up resolution construction process 131, it may not pose a problem to first generate a full compliment of X, Y, Z values for each R, G, B value because the up resolution mesh construction process itself can serve to discriminate and select which points it would choose to add into the mesh. However, it may not be advantageous to first build an extremely dense mesh with a 6D data point to represent each texture map coordinate which would then have to be simplified in a time-consuming down resolution process 132. In such situations, it may be more advantageous to be discriminating when generating the 6D points in the rasterization process. However, if the processing hardware is available, the full complement of point values could be generated even for a down resolution process.

There are many techniques currently available which would be suitable for rasterizing X, Y, Z coordinates from texture map coordinates according to the present invention.

The rasterization process creates 3D X, Y, Z coordinates by interpolation. FIG. 7 depicts an exemplary pixel 250 from an area in a texture map file which is limited to a mesh triangle and shows how the processor can determine a 3D X, Y, Z value for the pixel. Pixel 250 is bounded by vertices of a triangle having known X, Y, Z values: i.e., point A (point 252); B (point 254); and C (point 256). Pixel point 250 falls along a scan line of pixels, identified as line P 258. Line P 258 intersects two edges of the triangle edge AB 260 and edge AC 262. The processor can determine 3D equations for edges AB 260 and AC 262 and correspondingly, an equation for line P 258 based on intersections with the AB/AC edges. From those determinations, the processor can calculate 3D X, Y, Z values for pixel 250.

FIG. 8 depicts an exemplary process flow for generating points according to a rasterization process. The process of FIG. 8 generates a full set of 6D (X, Y, Z, R, G, B) values from the available spatial and texture data. In step 200, the processor begins a loop that will rasterize X, Y, Z coordinate values for the associated texture map pixels with a mesh triangle. The processor accesses the triangle information from an initial mesh data structure created by the process in step 170. In step 202, the processor gets the next available triangle.

In step 204, the processor locates the u, v links that each vertex in the mesh triangle has as a reference to a corresponding point in the texture map file. As noted above, to locate the texture map pixels, the processor uses the (u, v) links that each vertex in the mesh triangle has to a pixel value in the texture map file. If the spatial and object modeling data has been obtained from a scanning system, that data was obtained simultaneously from the same camera and the X,Y values of the 3D spatial coordinates of each vertex will match the u, v 2D coordinates of a designated bitmap image in the texture map file 2b.

In step 206, the processor determines from the u, v texture map coordinate values the minimum and maximum texture map coordinates vmax and vmin for the three triangle vertices. As the pixels in the texture map are arranged in "scan line" rows corresponding to v, each v scan line will contain R, G, B coordinate values for each u. The rasterization process will loop through each v scan line creating X, Y, Z values for the corresponding R, G, B values. The umin and umax values are used for rasterizing those values determined for later processing.

In step 208, the processor loops to calculate, for each edge of the texture map triangle found by the three u, v coordinate values, the change in X, Y, Z for each change in the v value and the change in X, Y, Z for each change in the u value. For each edge, the processor, in step 210, computes:

| dv | du |
|---|---|
| dXdv | dXdu |
| dYdv | dYdu |
| dZdv | dZdu |

In this step, the processor also arranges the edges to identify the two edges that have the vmin value. It is from that part of the triangle that the rasterization process will begin.

In step 212, the processor begins a set of processes to set the edge values between which the processor will compare the X, Y, Z values. For each v line of pixels, the processor will need to establish a right and left u position and a corresponding X, Y, Z value. As the v scan lines change the X, Y, Z values will change following the dv values. Along each u scan line the X, Y, Z values will change along the du values. In step 212, the processor sets the right and left edge points at the outset to be the shared endpoint of the edges (right and left) which share the vmin value. Next, the processor proceeds to step 214 to establish a stepping factor for each of the variables based on the delta values, dXdv, dYdv, dZdv and dZdv for each scan line step through the pixel values.

In step 216, the processor begins a loop to process the pixels in the scan line. The loop processes each scan line from vmin to vmax. The first step is to begin a check on the edges which use the vmin value to see if they have not run out (step 218). If either the right or left edge has run its length, and the v scan line is beyond it, the processor will swap the third edge with that edge.

In step 220, the processor establishes the boundary of right and left edges along the v scan line and the X, Y, Z values that are associated with it. The step uses the dv values to establish a left edge u point and a right edge u point and the associated X, Y, Z values. With the right and left edge of the scan line established, the processor can now generate in X, Y, Z value for each texture map coordinate R, G, B value.

There are functions available to generate their point values through rasterization, such as the "draw scan line" left functions. In addition, FIG. 8 presents a loop which processes X, Y, Z values for each u position moving from the left to the right along the scan line. For each u increment, the processor creates X, Y, Z values and loads them into the 6D data point list 142 using the dXdu, dYdu and dZdu delta values (step 224).

In step 226, the processor loops to step 222 and continues processing X, Y, Z values for each u position in the current scan line. The processor loops in step 228 to step 216 to process another scan line. When each scan line for the triangle has been processed, the processor loops in step 230 to step 200 and processes the next triangle until all triangles have been processed.

The rasterization process described in FIG. 8 generates one X Y, Z spatial coordinate for each texture map coordinate. As stated above, there are situations when it would not be advantageous to generate for each texture map coordinate a corresponding X, Y, Z value. For these situations the present invention provides a system and method of generating 6D data points with some discrimination. The procedure functions very much like the procedure outlined in FIG. 8, except that in addition to processing delta values for dX, dY and dZ, the process would also process delta values for dR, dG and dB using the R, G, B values from the texture map that were associated with the original three mesh data points. The rasterized R, G, B could be compared against the actual R, G, B values in the texture map. If the difference between these points was greater than a threshold (as determined in a comparison step (before step 224 in FIG. 8 for example) then the processor would generate a X, Y, Z value and create a 6D data point. If the difference fell below a threshold, it would not.

iv. Mesh Building in 6D with Multi-Dimensional/Multi-Axis Coordinates

As stated above, a mesh with dynamic resolution capabilities can be created with the above-generated 6D data points using either an up resolution construction process 131 or a down resolution construction process 132.

a. Dynamic Mesh Construction Using the Up Resolution process

In the exemplary embodiment, the processor executes the up resolution construction process 131 (FIG. 3) to build a mesh model point by point with ever increasing resolution of detail. The up resolution function 131 has two basic steps as set forth in FIG. 9. First, the processor creates an initial mesh structure (in step 270) and second, the processor incrementally adds 6D data points to that mesh structure following a selection process that assesses the significance of each unmeshed data point (in step 272).

The processor in the up resolution construction process builds an initial mesh structure with reference to an initial object, such as a plane or sphere, which is selected in the exemplary embodiment by user-specification. (For topologically complex surfaces whose connectivity is given before up resolution construction, the highest resolution mesh itself may be used as the reference object.) In the down resolution process, it is possible to use the original mesh (vertices, connectivity and normals) as the reference object, against which error is measured.

In step 270, the processor provides functions to assist in the selection of the initial reference object. For a planar reference object, a user can select an equation for a plane that exists above, below or within the set of 6D data points, depending on user preference. For a spherical reference object, the user typically will select an equation for a unit sphere at a center point location within the mass of the 6D data points thus providing separation between back, front, left, right, top and bottom. Many different techniques are currently available and can be used to determine "proximity to" the initial reference object. For example, the processor could determine an equation distance from an initial reference plane by a minimum sum of squares method. For a spherical reference object, the processor can determine the sphere's equation by a fitting function which determines center of mass. FIG. 10a depicts a sphere fitted to a cloud of data points fitted to a sphere. FIG. 10b depicts a plane fitted to a cloud of data points. In the exemplary embodiment, the processor uses the 3D X, Y, Z values of the 6D coordinates in the fitting equations. Although it would be possible to include color data as a factor in determining the initial reference object, the exemplary system does not include such calculations.

The processor, step 270 (FIG. 9), constructs an initial mesh, the structure of which depends on whether a sphere, plane, or other object was chosen as the initial reference object. If a sphere is selected as the initial reference object, the processor constructs the initial mesh in the form of a tetrahedron. Such a tetrahedron is depicted in FIG. 10c. The processor builds mesh faces and adds them to the mesh data structure based on the selection of four data points from the cloud of 6D data points. In an exemplary embodiment, the processor executes a procedure to select four points from the group which most closely determine a tetrahedron of equilateral triangles. However, in alternative embodiments any initial 3 or 4 points from the set of 6D data points, even randomly selected points, will be sufficient for the initial mesh. The processor uses these points to build face records and places the face records in the mesh data structure 144.

If the initial reference object is a plane, the processor creates an initial mesh in the form of either a single triangle or a quadrilateral (constructed from two triangles). In the exemplary embodiment, the points for this initial mesh will be points that exist on the reference plane itself as "Steiner" points. The processor selects the initial points so that the area bounded by the initial mesh on the initial reference plane includes all of the 6D data points as projected on that plane. A representation of such an initial mesh face is set forth in FIG. 10d.

In selecting the points of the initial mesh faces in the planar example, the processor must also designate a color value for each initial vertex selected, as the present invention incorporates both spatial and texture data into the construction. As initial 6D values are added to the mesh, the selection criteria incorporate color values as one selection determinant. In the exemplary embodiment, the processor will select black as the initial color for the mesh construction, and 6D points of light color will contrast and will be added by the selection procedure (as will be described below). However, other colors can be used in the initial color setting, such as white, neutral colors such as a gray (when the 6D pixel values have both light and dark settings), and vibrant colors such as red. When the processor has completed the procedure to build the initial mesh in step 270, it proceeds in step 272 to add points to the mesh.

Finally, the highest resolution mesh itself, or some topological equivalent thereto, may be used as the reference object. This approach is most appropriate for surfaces that are too complex to be projected onto a plane or sphere and whose connectivity is given before up resolution construction.

v. Incremental Addition of Multi-Dimensional/Multi-Axis (6D) Coordinates

The selection process of step 272 follows the principle that mesh points can be ordered according to their significance in describing the basic shape and color features of the object. By selecting those points which are most descriptive in terms of color and shape from the list of points, the computer system 3 of the present invention can fully approximate, describe and reproduce both the basic shape contours and color details of an object with relatively few selected points. As more detail is required, a system following the up resolution selection principle can add more details by simply adding the next most significant points. Using the selection process of the present invention, it is possible to generate a very low resolution mesh model of an object which contains enough detail to create an acceptable image of the object on most displays. For example, a set of 6D data points obtained from a laser scan of a person's face can be typically simplified from an initial set of 100,000 data points to a mesh of a few thousand data points which describe the contours and color details with good resolution.

In the exemplary embodiment, the procedure operates by up resolution—incrementally adding 6D points of detail from the mesh until the mesh meets the resolution set by the user's specification, or until the mesh is created to the highest density of resolution. When the system adds a point to the mesh, a reference to the point is added to the insert list 150 (FIG. 3)—the LIFO-ordered stack which tracks the sequence of point additions. (As stated above, the insert list may also be structured as a tree to provide "view-dependent" multi-resolution). The addition of a point also causes changes to the mesh structure as is described below. The sequence of changes that occurs due to point addition is maintained in the history list 152 (FIG. 3, which is also maintained as a LIFO stack or tree). When the insertion and history lists (150 and 152) contain the full sequence of point additions from initial mesh to highest resolution mesh, it is possible, as is described below, to follow the insert list 150 and the history list 152 to rapidly generate a mesh model of the object to any level of detail.

vi. The Up Resolution Selection Process

As stated above, determination of a 6D data point's significance in the up resolution construction process depends upon how much spatial or color detail a 6D data point would add to the mesh's current configuration. Initially, the mesh is in the form of a plane or a tetrahedron. The selection procedure seeks to add, at the earliest stage, the points which are the most significant in describing the basic shape and color details of the object and, thereafter to continue adding points where each next point is the most significant point from the remaining unmeshed points in terms of adding spatial or color significance.

To make the determination of what next data point to add to the mesh, the processor 3 in step 272 (FIG. 9) calculates a "distance" value for each unmeshed 6D data point and selects the next point to add based on this "distance" value. Pending U.S. patent application Ser. No. 08/730,980 and pending U.S. patent application Ser. No. 08/730,979, both referenced above and incorporated by reference herein, describe systems and methods for calculating a distance value that a data point value would have in relation to a mesh using 3D spatial coordinates. The present invention goes beyond that basic teaching and permits a distance value to be calculated based on 6D coordinates, using both the X, Y, Z and R, G, B values of each unmeshed data point.

FIG. 11 depicts triangle 300 formed as part of a mesh construction and a 6D data point 302 which has yet to be incorporated into the mesh. In this depicted example, the initial reference object for the mesh is sphere 303. A projection of triangle 300 (triangle 304) appears on sphere 303. 6D data point 302 can be associated with triangle 300 when the point lies within the bounds of the triangle. To prove that condition, a line 308 can be drawn from the center point of triangle 300 (point 310) to 6D data point 302 and it can be shown that the projection of that line segment (projection 312) on sphere 303 does not intersect any edge of the projected triangle 304.

Using ordinary 3D geometric principles, the system of the present invention can calculate the spatial distance 6D data point 302 has in relation to triangle 300. The three vertices A, B, and C of triangle 300 form a plane, and the distance of point 302 from that plane can be defined Euclideanly in terms of unit vector n (314) normal to the plane as follows:

$$d = k - (\text{point } 302) \cdot n$$

where $k = n \cdot A$.

Distance may also be defined in a non-Euclidean way. In the down resolution process, each point removed is associated to a face which remains after the removal. Distance may therefore be defined as:

$$\sqrt{\sum_{i=1}^{m} (1 - n_i \cdot n_p)^2}$$

where $n_1$ through $n_m$ are the respective normals of the points associated with the face, whether because the point is a vertex of the face or because the point was associated to the face in the down resolution process.

Color deviation may be measured non-Euclideanly. In the exemplary embodiment, for example, the deviation is set at:

$$L_R |R_{302} - R_P| + L_G |G_{302} - G_P| + L_B |B_{302} - B_P|$$

where $L_R$, for example, is the luminance or phosphor value of the color red.

The spatial metric and the color metric, whatever those respective metrics may be, can be fused into a combined metric incorporating both spatial features and color features as significance determinants. For example, the variables of space and color can be related through the use of a factor value (alpha). Alpha could relate color to space by providing a weighing factor indicating the relative significance of color and space. Thus, to incorporate color and space for the determination of significance as an expression of the distance a point will have from a mesh face, the equation in 6D can be written as follows:

$$(\text{point } 302) - p = \vec{d} = (d_X, d_Y, d_Z, d_R, d_G, d_B)$$

$$\text{distance} = \overline{\sqrt{d_X^2 + d_Y^2 + d_Z^2}} + \alpha(L_R |d_R| + L_G |d_G| + L_B |d_B|)$$

During the incremental insertion procedure of step 272, the processor 3 calculates a 6D distance value for each unmeshed 6D data point and compares those distance values (through the heaping procedure) to identify the point having the largest distance value. The point with the greatest distance value is determined to be the "most significant" and will be added to the mesh.

vii. Up Resolution Incremental Insertion of Points

Using the selection process describe above, the processor 3 in step 272 executes a procedure to incrementally add 6D data points into the mesh. An exemplary process flow for an incremental insertion process is set forth in FIG. 12 is and described in what follows.

In step 400, the processor 3 performs the initial calculation of 6D distance values for each unmeshed data point. Initially, that calculation will be for all of the data points on the 6D data point list 142. To find these distance values, the processor 3 executes some combination of distance calculations described above for each data point. In this step 400, the processor: i) locates the relevant face with which the 6D data point can be associated; ii) makes the distance calculation described above; and iii) adds the distance calculation and a reference to the 6D data point to the associated face in the distance list 146.

In the exemplary embodiment, the processor 3 locates the proper mesh face to make a distance calculation for a particular 6D data point by executing a locate function 401. The locate function 401 identifies the triangle in the current mesh configuration which is spatially closest to the 6D data point and can be used when calculating a distance value for the unmeshed data point. As stated above, a data point can be associated with a particular triangle when the projection of the data point on the reference object falls within the bounds of the projection of the triangle (see FIG. 11 above). If the projection of a line from the unmeshed point in question to the center point of the triangle in question does not intersect any edge of the triangle's projection, the triangle can be associated with the data point and the processor can calculate the distance based on this triangle. Pending U.S. patent application Ser. No. 08/730,980 and pending U.S. patent application Ser. No. 08/730,979, both referenced above and incorporated by reference herein, describe systems and methods for locate functions which are suitable for locate function 401 of the present invention.

When the processor 3 locates a triangular face for a particular data point, the data point and the face will be associated. The processor will place a reference to this association on the face record for the particular face in question in the mesh data structure 144. The face record will carry in its association indices an index reference to the location of the data points coordinates or the 6D data point list 142. Then the processor 3 (executing a distance function 403) calculates a distance value for the data point, using the equations outlined above. The processor then places the calculated distance value (along with a reference to the 6D data point) onto the distance list 146, using the set of heap manager functions 147 described above. When distance values for all the unmeshed data points have been calculated, the processor then begins the incremental addition of data points.

Referring again to FIG. 12, in step 402 the processor begins a loop for incremental addition of data points into the mesh. The loop permits processing of, for example, one data point, all of the remaining unmeshed data points, or a set of unmeshed data points up to a user set distance tolerance (such as when the largest distance value falls below a user defined tolerance). The incremental addition process creates a mesh that has "dynamic resolution" capabilities.

In step 404, processing begins by obtaining the 6D data point with the largest distance. As seen above, the system maintains distance list in a heap structure, so that the node at the top of the heap contains i) a distance value for the point that is the "most significant" in terms of adding spatial or color detail, ii) reference in the 6D data point list 142 to the 6D (X, Y, Z, R, G, B) coordinate values for that data point; and (iii) a reference to the face that is associated with the point. In the exemplary embodiment, the processor reads the value from the 6D data point list 142, removes the point's distance value from the heap (or nullifies it to zero) and reconfigures the heap (using the heap manager 147). The point will be inserted into the face, and that insertion causes the processor to make a number of adjustments to the mesh.

For one adjustment, insertion of a point into a face necessitates readjustment of all other unmeshed points that are associated with the face. Their distance to the mesh face must be recalculated. In step 408, the processor places pointers to those points on the recalculation list 154. (Later, if additional adjustments must be made in checking for optimization, the unmeshed points related to those other faces are also added to the recalculation list 154.) Once the processor identifies the face for point insertion and provides for the unmeshed points related to it (see steps 406–408), the processor proceeds in step 409 to place a reference to the 6D data point on the insert list 150 and moves in step 410 to insert the next point into the mesh. The addition of the new point splits the current triangle into three new triangles. An insert function 412 splits the selected mesh face and reorganizes the points and edges to create new face records. As stated above, the system orders the vertices and neighbor of the newly created and reorganized triangles by a specific and rigid ordering system.

FIG. 13 depicts an addition of point 360 to triangular face 362 ("FACE") and shows the alteration of the face, vertices and neighbor relationships that the addition requires. Before the addition of point 360, triangle 362 with vertex points A, B and C (points 350, 351 and 352 ordered counterclockwise) carried the following relationships in its face data structure record:

Record: "FACE" (Triangle 362)

| | |
|---|---|
| NEIGHBORS: | Neighbor 0 (Triangle 364), Neighbor 1 (Triangle 366), Neighbor 2 (Triangle 368) |
| VERTICES: | V0(point 350), V1 (point 351), V2 (point 352) |

Adding point 360 requires changes to the data structure links. The addition creates two addition faces: a RIGHT face (with vertices 360, 350, 352) and a LEFT face (with vertices 360, 350 and 351).

The original triangle "FACE" no longer has its Vertex 0 at point 350. The processor sets Vertex 0 for FACE to point 360. The new, smaller triangle has as vertices points 360, 351 and 352. The links to Neighbor 1 (triangle 366) and Neighbor 2 (triangle 368) also must be changed, because these triangles are no longer neighbors of FACE. The process will first change FACE's neighbor link from "Neighbor 2" to "LEFT". The processor will also change FACE's neighbor from "Neighbor 1" to "RIGHT". The data structure for the revised FACE will appear as follows:

Record: "FACE"

| | |
|---|---|
| NEIGHBORS: | Neighbor 0, RIGHT, LEFT |
| VERTICES: | V0 (new point 360), V1 (point 351), V2 (point 352) |

The processor creates new face records, RIGHT and LEFT, as follows:

Record: "RIGHT"

| | |
|---|---|
| NEIGHBORS: | Neighbor 1, LEFT, FACE |
| VERTICES: | V0 (new point 360), V1 (point 352), V2 (point 350) |

Record: "LEFT"

NEIGHBORS: Neighbor 2, FACE, RIGHT
VERTICES: V0 (new point 360), V1 (point 350), V2 (1)point 351)

The processor also replaces Neighbor 1 (triangle 366)'s neighbor link to FACE with a link to RIGHT. The processor finds the link to FACE by searching each of Neighbor 1's neighbor links until it finds the one that points to FACE. The processor replaces Neighbor 2 (triangle 368)'s neighbor link to FACE with a link to LEFT in the same manner.

This configuration has particular advantages, because it guarantees that the new vertex is always V0 for each face. Also, since each vertex corresponds to an opposite edge and neighbor, the ordering creates a way to check the configuration for optimality in a regularized way. First, the neighbor that will be checked for optimality will always be the side involving neighbor 0. Further, the indexing system guarantees that, by repeatedly moving toward "Neighbor 1" of each face, the system will circle around all the faces containing the new point and will eventually get back to the original face. Thus, the indexing creates a way to make a complete optimality check. To complete the indexing process, the system will place a reference to the record face on the face list 148 at a location that corresponds to the newly inserted point. That reference permits a quick reference from data point to mesh.

Referring again to FIG. 12, incremental mesh building proceeds to step 414 and checks the new point addition for optimality, re-organizing the mesh (see steps 415–416) if the configuration created with the new point is not optimal in quality. All triangles changes are pushed into the recalculation heap(154).

The basic procedure of the checking procedure of step 414 is to check the triangles either by the Delaunay or other data dependent methods as necessary to determine whether they should be flipped. For each triangle tested, the processor in step 414 makes a call to a basic flip function 416 which tests a triangle, executes a flip of necessary and returns a yes/no flag showing whether it executed a flip. The checking procedure stores an indication of the flip function on the history list 152. Pending U.S. patent application Ser. No. 08/730,980 and Pending U.S. patent application Ser. No. 08/730,979 both referenced above and incorporated by reference herein, describe systems and methods for moving about the mesh using the adjacency relationship of triangles to rapidly complete a check of the triangles in the local area around the insertion of a data point. Such a system and method would be suitable for navigating the mesh structure to execute a checking procedure according to the present invention.

There are a number of different methods and techniques to check the optimality of a mesh structure after the insertion of a data point. In the exemplary embodiment, one method for optimality checking follows the principals of Delaunay Triangulation. In an alternative embodiment, the system can check the mesh structure based on data dependent considerations, such as by a test which uses calculated distance values for the unmeshed points. Exemplary procedures for Delaunay and data dependent checking are set forth below.

a. Delaunayian Triangulation Check

To implement a Delaunay triangulation check, the present invention projects the data point values in the 3D mesh configuration onto the reference object. Delaunay principles hold that a circumcircle described by the three vertices of the triangle will not contain any other points of the mesh. When a triangle does not conform to the principle, it is not optimal and requires "flipping". In such a case, Delaunay principles hold that the edge that exists between the triangle examined and the triangle which contains the extra point must be flipped to create a new edge between those two triangles. In creating the new configuration after point insertion, it may be necessary to make many flips while checking the resulting triangles for optimality. Pending U.S. patent application Ser. No. 08/730,980 and pending U.S. patent application Ser. No. 08/730,979, both referenced above and incorporated by reference herein, describe systems and methods for Delaunayian optimality checking and flipping procedures which are suitable for the checking and flipping procedures of the present invention. If a triangle must be flipped the processor places a reference to all of the unmeshed data points plus a reference to their formerly associated triangle onto the recalculate list 154.

b. Data Dependent Checking based on Distance values

It is also possible in the up resolution construction process 131 to perform a data dependent check using the distance calculations for the unmeshed data points which are associated with each face. The basic procedure for this data dependent check is to examine the edge that exists between the two triangles being checked and determine whether the edge should be flipped based on the data that is available concerning the shape of the object.

FIGS. 14a and b depict a representation of a two triangle configuration which the system evaluates by a data dependent principle which considers normals. FIG. 14a depicts two triangles 370 and 372. For each of those triangles there are a number of unmeshed points (points 374 to 378 for triangle 370) (points 380 to 384 for triangle 372). The two triangles share edge 371. FIG. 14b depicts the same two triangles with their shared edge flipped. The unmeshed points associated with the two triangles are now different. A data dependent checking algorithm will use the distance values calculated for the unmeshed points as they relate to each triangle configuration to determine which triangle configuration is better. In the calculation, the configuration with the least overall "distance" is considered to be better.

FIG. 15 depicts an exemplary process flow for executing an edge check based on data dependent distance criteria. The checking procedure would operate just as the checking procedure for Delaunayian optimality, except that in the flip procedure instead of calculating a circumcircle and making the Delaunayian check, the data dependent procedure would operate as follows: first, for both of the triangles in question the data dependent checking algorithm would calculate a value for all of the unmeshed points that are associated with the mesh equal to the distance of the square root of the sum of their squared distances. In step 390, the processor receives pointers to two mesh faces and begins in step 392 to process the distance values that are associated with each face. References to those points can be found by searching the associated data point indices that are part of each face record (e.g. 145 in the mesh data structure 144). For the two triangles, the processor in step 392 calculates the distance value as by taking the square root of the square distances all of the associated unmeshed data points in both triangles. This value is used for comparing the second configuration.

In step 394, the processor executes a hypothetical flip of the shared edge between the triangles (e.g., flipping the edge as depicted in FIGS. 14a and b). The flip causes a rearrangement of the associations of the unmeshed data points and their corresponding triangular faces. In step 396, the processor begins a loop to determine the associated triangle for each unmeshed data point, incorporating its distance in the comparison value computation. In step 396, the process loops until new distances for all of the associated points are calculated. In step 397, the processor then compares the distance value calculated for the first triangle configuration against the distance value calculated for the second configuration. If the second distance value is lower then the first, the procedure will execute a flip of the edge in step 398, make the new associations for the data point and then heap the new distance values.

Referring again to FIG. 12 the processor will execute a checking procedure using either a Delaunayian or data dependent checking algorithm. After the checking procedure, the processor moves in step 416 to reset the heap distances for additional up resolution insertions. In step 416, the processor executes a loop to recalculate distances for all unmeshed points referenced on the recalculation list 154. For each data point on that list, the processor must first locate a new face for distance calculations using the locate function 401 described above. The processor then calculates a distance value for the data point using the distance function 403 and it adds that new distance to the distance list 146, reheaping as necessary. When these points are processed, the system is again ready to insert additional points of increasing detail. In step 420, the processor loops to step 402 and continues inserting points adding references to each inserted point on the insert list 150 and history list 152. The procedure is complete when points are inserted to the user-specified amount.

viii. Down Resolution Removal of Points Using the Insertion and History Lists

After the processor has built the mesh to a desired level of detail, and has created a point insertion list 150 and a history list 152 that tracks the sequence of point insertions, the present invention can perform functions which require "Dynamic resolution"—functions which rapidly vary the resolution of the mesh. The Up/Down resolution toggle function 136 enables the dynamic resolution capability. Starting from a mesh of relatively high resolution, the insert list 150 provides an ordered list of data points ready for removal if the user requires that the mesh be more streamlined. When the up/resolution toggle function 136 removes a point from the mesh, it uses the history list 152 to play back all the flips in reverse order for that point insertion until the data point sits again within the triangle into which it was inserted (see FIG. 12).

After the processor plays back the flips to reach an initial insertion configuration (such as that depicted in FIG. 12), the data point can be removed from the mesh and the LEFT and RIGHT faces deleted. The system removes points in last-in-first-out (LIFO) order, such that the finer details are removed first, keeping points of most significant detail in the mesh. The up/down resolution function can remove as many points as the user or application requires and then rebuild the mesh following the sequence of point insertions in the history list in reverse order. The mesh can be continuously up resolutioned and down resolutioned as needed to the extent that the point additions are specified.

ix. Additional Uses of the History List

The complete history of data point insertions from the initial mesh to full resolution can be computed in advance and then later used for even more rapid mesh generation. Such a use has advantages in applications such as computer games and other graphic applications, where the generation of objects and surfaces must occur at a rapid pace. For those applications, the computer system 3 of the present invention would be further configured to generate a complete, full detail insert list 150 and history list 152 for the object in question, before the object is used. Then to create an object model having only a certain number of points the computer system 3 would save in an object model file a set of data points (following the insert list 150 to the desired number of points), the history list 152 (showing the sequence of insertions up to that point) and the mesh data structure 144 of the mesh at that resolution. That file can be used in a graphics application and during execution of the application, the computer can output images using that mesh and also further manipulate the mesh through down resolution and up resolution, following the order of the insertion list and the history list. This model saves much data space in the application as no texture map file need be included in the object model file. Further, the use of the history list saves computation time in application. First as new points are added or removed from the mesh, distance values for the altered points would not have to be calculated. Second, use of the history list would save additional processing time because the computations in the sequence of checking steps to insure Delaunayian or data dependent optimization would not have to be repeated.

x. Alternative Embodiment for 3D Mesh Building

Like the up resolution construction process 131, the down resolution construction process 132 also builds meshes with dynamic resolution capabilities. In down resolution construction, the system executes the general steps of 1) generating an initial dense mesh of 6D data point coordinates and 2) "down resolutioning" the mesh through successive data point removals to build the insertion list 150 and the history list 152. The insertion list 150 and the history list 152 permit the present invention to provide the dynamic resolution capability and allow functions, such as the up/down resolution toggle function 136 to rapidly add or delete point of resolution from the mesh. Each of these steps is further described in the following sections.

a. Generating an initial dense mesh of 6D data points

Down resolution requires at the outset an initial dense mesh of 6D data points from which the processor can remove points and simplify. This initial mesh can have an optimal connectivity, such as one that follows Delaunayian construction principles. However, an optimal structure is not necessary in this initial mesh. Many different mesh construction techniques are suitable.

One construction technique of the present invention builds an initial 6D triangular mesh through a rapid insertion of points. The system described in Pending U.S. patent application Ser. No. 08/730,980, which is expressly incorporated by reference herein, describes such a system and method for rapid mesh generation. That procedure accepts a random set of points, orders the points and builds a desired mesh through point insertions. Such a system and method could be applied using the teachings herein to build a 6D data point mesh. After the system generates the 6D data point by the build and wrap function described above (see FIG. 8), the system of the present invention could then generate an initial 6D mesh using such a technique.

During the execution of the build and wrap function 130, the present invention can also build a 6D mesh for down resolution construction as follows:

When the build up and wrap function 130 functions, it takes each triangular face from that 3D mesh and views the texture map coordinates for the face to create 6D (X, Y, Z, R, G, B) coordinates. To further build a 6D mesh, the processor when following the build and wrap process, will take steps to transform that mesh in addition to generating 6D point values. First, for each of the mesh triangles and 3D vertices, the build and wrap function can locate the corresponding R, G, B values for each point and associate X, Y, Z with R, G, B thus, creating a 6D value for each point in the mesh. Second, after the processor generates each X, Y, Z value and associates that value with a texture map R, G, B value, the processor will take a further step of inserting that new point into the mesh. The processor can insert the point without performing any edge check or edge alteration so that the original edges of the mesh processed by the build and wrap function 130 are not changed. Such a meshing technique allows the build and wrap function 130 to process uninterrupted while at the same time the processor can hold a 6D mesh suitable for down resolution mesh construction.

After the processor transforms the initial mesh into a device 6D mesh, the processor can then calculate a normal vector for each 6D data point. As stated above, a normal vector gives an indication of the object's surface topology. (See FIG. 4) For each data point in the mesh, there will be a number of faces which use that data as one of its vertices. To compute a normal vector for a particular data point in the mesh, the system calculates a normal vector for each face that uses the data point as a vertex and then compiles an average normal for that vertex through a summation process (such as the square root of the sum of squares method). The system of the present invention then stores this normal vector for the 6D value in an indexed location in the normal list 149. (See FIG. 3) In the exemplary embodiment, the system can store the normals for the faces in the mesh data structure face records. The index number for the normal list matches the 6D data points index number for the coordinates on the 5D data point list. To calculate a normal vector the system of the present invention loops through the list of 6D data points on the 6D data point list. For each point the processor locates (using the corresponding reference found in the face list 148 (FIG. 3)) a pointer to one of the mesh faces which used that data point or a vertex. The processor calculates a normal for that face (if one is not found in the face record) and uses that vector in the summation function. Because the system and method of the present invention follows a rigid counter-clockwise ordering system of vertices and neighbors, the processor can quickly traverse the mesh structure to locate each face which uses the data point. The processor calculates a normal for the first triangle and then moves in a counter-clockwise direction to the next neighboring triangle. (In the face record, the neighbor reference associated with the vertex one counter-clockwise moves away from the data point in question will provide the next counter-clockwise triangle.) The system will process the mesh until all normal vectors are calculated and loaded into the normal list 149. Having now prepared a 6D dense mesh, the present invention can now create a mesh with "dynamic resolution" capabilities through the down resolution construction process.

b. Dynamic Mesh Construction Using the Down Resolution Construction Process

The processor executes the down resolution mesh construction process 132 (FIG. 3) to incrementally remove points of detail from the dense 6D mesh construction above. Integral to this process of point removal are the steps of (i) evaluating the significance of the data point in terms of adding spatial or color detail, (ii) removing from the given mesh configuration that point which has the least significance in terms of adding spatial and color detail, and (iii) storing this information on the insert list 150 and history list 152.

To remove data points from the mesh in simplification, the present invention uses a selection process which accesses the data point's significance in terms of adding color or spatial detail into the mesh. In the down resolution construction process 132, the decision to remove any 6D data point from the mesh is based on a determination of whether the point considered as compared to the other points remaining in the mesh is the "least significant" in terms of adding color, spatial or other detail. To find the least significant point, the system of the present invention calculates a distance value for each point which represents significance such as by a geometric/color distance or normal distance calculation technique. In the up resolution construction process described above, the present invention provides geometric and color distance values for each unmeshed data point. These calculations are also suitable in down resolution mesh construction; however, an additional step must be taken in down resolution construction: in down resolution construction, before the geometric distance can be calculated, the point must be "hypothetically removed" from the mesh before the processor can calculate its geometric and color distance from the mesh. This hypothetical process can actually remove the point and immediately reinsert it, or simulate the point removal using temporary data structures. The process of removing the point entails executing a series of (actual or hypothetical) edge flips so that the point in the mesh is in a configuration that permits removal. When the processor makes that determination, it calculates a distance value for the point using the mesh structure that exists after its hypothetical removal.

FIG. 16 depicts a sequence of flips which transform a mesh area from 602a to 602e so that a point (point 600) can be readied for removal. In the exemplary embodiment of the system and method of the present invention, data points are always inserted into an existing triangle. This configuration is described above with reference to FIG. 13. The flipping procedure in down resolution point deletion seeks to place the data point under consideration back into that original configuration so it can be disconnected from the mesh in a reversal of its insertion process. A point is always connected within a triangle using a minimum of three edge connections. When a data point again has three edge connections, it can be easily disconnected from the mesh without interrupting the mesh optimal construction. In the mesh transformation depicted in FIG. 16, a comparison of mesh configuration 602a to 602b reveals the transformation process flipped edge 604 to edge 604a. Comparing mesh configuration 602b to 602c reveals that the transformation process flipped edge 608 to 608a. Comparing mesh configuration 602c to 602d reveals that the transformation process has flipped edge 606 to 606a. Mesh configuration 602d now contains point 600. Point 600 could now be removed from the mesh (as shown in mesh configuration 602e). During the process of transforming the mesh, the determination of which edge to flip (e.g., determining the flip from edge 604 to 604a, then from edge 606 to 606a) is determined in the present invention using deterministic means which preserve the structural optimality of the mesh construction. In the mesh transformation for hypothetical or actual point removal, the present invention can execute flips which seek to preserve the mesh's Delaunayian or data dependent construction. Examples of such checking are set forth in the point removal process described below.

For determining the significance of any data point in relation to the mesh, the system and method of the present invention shall perform a transformation as described above to hypothetically remove the point from the mesh. Then the system will calculate a distance for the point, such as by the geometric/color distance calculation technique described above. In FIG. 16, mesh configuration 602f shows a representation of point 600 as hypothetically removed form the mesh and in a position for distance calculation by the geometric/color distance formula. The processor will then heap the calculated distance value on the distance list 146. In contrast to the up resolution process (where the data point with the largest distance value was placed at the top of the heap) down resolution process loads the heap so that the data point having the smallest distance bubbles to the top of the heap. That data point has the least significance to the mesh and shall be removed.

In calculating distance values for down resolution point removals, the present invention provides for both Euclidean and non-Euclidean calculations. One non-Euclidean method is to calculate distance using the normal vectors.

FIG. 17 depicts a hypothetical point removal in which a distance value for the point is computed using normal vectors. In FIG. 17, mesh configuration 610 contains a point 612. Point 612 has a normal vector 614 (normal p) associated with it. The system of the present invention may calculate this normal vector during the process which created the initial dense mesh. Thus, the normal vector could give an indication of the original topology of the most detailed mesh.

To calculate a distance value which measures the significance of the point using a normal vector, the system must execute a mesh transformation process as described above in FIG. 16 to hypothetically remove the point. Referring to FIG. 17, mesh configuration 610a shows the final result of a transformation process that the system executed on mesh 610. Mesh configuration 610a shows that point 612 would lie within triangle 616 and could be removed from it if it were to be deleted. Triangle 616 has a normal vector which can be computed using the vertices. That normal vector (normal t) is depicted at 618. To compute a distance value for the point 612 in determining whether it should be removed, the system of the present invention calculates the angular distance that exists between the two normal vectors through the metric:

$$\sqrt{\sum_{i=1}^{m}(1-n_i \cdot n_p)^2}$$

That distance value is heaped to compare it with the distance value of other points as described above.

In a more advanced calculation of the distance function, the present invention can incorporate the normal vectors from previously removed points in addition to the normal of the point in question. FIG. 18 shows the mesh 610 from FIG. 17 but in the example of FIG. 18 it is understood that there have been a number of point removals before the processor makes the determination of whether to remove point 612. These points and their normal vectors are depicted by vectors 621 and 623. As indicated, the system and method of the present invention can continue to associate a particular data point with a mesh triangle even after its removal from the mesh.

FIG. 18 also shows mesh construction 610a, the mesh construction which results from the flipping transformation. The transformation allows for the removal of point 612. The transformation causes changes to the connectivity of the mesh triangles. The transformation also causes a rearrangement of the associations that existed between the previously deleted data points and the mesh faces. For example, in FIG. 18, it can be seen that data point 622 (and its vector) is now associated with triangle 616 in mesh configuration 610a.

In the calculation of distance using normals discussed above, the processor compared the normal of triangle 616 (normal 618) against the normal for point 612 (normal 614). In the more advanced normal calculations, the normal vectors for the data points previously removed from the mesh can be incorporated into the process as follows. In triangle 616 in FIG. 18, it can be seen that there are a number of normal vectors from former data points which are now associated with triangle 616. These normal vectors can be averaged with the normal vector for point 612 (normal 614) to create a weighted average normal vector representing a vector to which the triangle 616 should correspond. In the exemplary embodiment, the processor averages the normal for point 612 with the normals of the previously removed points using the square root of the sum of the squares method and compares the resultant vector to the normal for the associated triangle (e.g., through 616). The angular distance between the normal of the triangle and the average normal for the data points is the distance value for the point. That distance is the measure of significance that point has to the mesh. The processor stores that distance value on the distance list, comparing its value to values created in this manner.

c. Flipping edges for data point removal

After the processor has calculated the distance values for the points as necessary (i.e., in an initial pass for all the points and in subsequent passes only for the points related to these faces that were altered in the previous point removal sequence), the processor will then actually remove the point from the mesh (or allow a hypothetical removal to stand), store a reference to the point on the insert list 150 and store information concerning the flips necessary to remove the point on the inserting list 152.

The procedure for actual flipping is the same as the procedure for any hypothetical flipping. Thus, the function to remove a point proceeds as depicted as in FIG. 16. However, as stated above, when deciding to make an edge flip, the processor of the present invention can use one of a number of deterministic algorithms to make intelligent flips which preserve the quality or structure of the mesh. In exemplary embodiments, such deterministic algorithms can preserve mesh qualities such as Delaunayian structure or data dependent structures.

FIG. 19 depicts an exemplary process flow for a point removal flipping procedure which minimizes the structure deviations. In step 650, the processor receives as arguments the index reference for the data point to be removed. In step 652, the processor proceeds to get from the face list 148 (FIG. 3) a reference to a face record in the mesh data structure 144. That reference provides a pointer to one of the faces which uses the data point as a vertex. From that face reference it is possible to count all of the triangles (and their edges) which share the data point and use it as one of the vertices. In step 654, the processor executes a proceeding to count the faces (or edges) sharing the point. The process in step 654 uses the rigid ordering of the face records to traverse the faces which share the data point. Because the vertices of each face are numbered in a rigid order (such as the counter-clockwise order) it is possible to move in a circular direction around the data point and count the connected faces. In the exemplary embodiment, the present invention uses a rigid counter-clockwise ordering system and the neighbor triangle associated with the first counter-clockwise vertex from the data point in any triangle always yields the next counter-clockwise face to check. In step 654, the processor loops in a counter-clockwise direction using the references to vertices and neighbors in the mesh data structure until it counts up all of the links to the data point.

When there are more than three links, the processor must make flips to transform the mesh and bring it into a configuration that allows for point removal. If there are 5 edge links to the data points in the mesh for example, the loop of step 656 will make 2 flips to bring the number of links to 3. In step 656, the processor begins a loop to determine the one flip that has the least amount of error in terms of moving the mesh away from an optimal structure. In step 658, the processor begins a second loop to examine each link and determine the "error" that would be incurred if the processor flipped that link. The system of the present invention permits many different types of error evaluation techniques. For purposes of an exemplary embodiment, the present invention presents two different types of flip evaluation techniques. When the down resolution construction process seeks to build a mesh with Delaunayian optimality characteristics, the system will evaluate an effort for a flip in point removal using a Delaunay error evaluation technique. When the down resolution construction process seeks to optimize the mesh construction according to data dependent criteria (such as by normal distance) the system will evaluate an error for a flip using data dependent techniques. Examples for each of these processes are as follows.

Delaunayian checking insures regularity in the mesh triangles by following the rule that for any triangle in the mesh, there is no other mesh point that will fall within a circumcircle defined by the triangle's points. FIG. 20 depicts a data point 670 to be removed from a mesh configuration 800. There are 6 edges (edges 672–677) connected to point 670; three must be flipped to remove the point. For each edge the process determines, using a Delaunayian error evaluation algorithm, how far an edge flip will take the configuration away from Delaunayian optimality. In FIG. 20, mesh configuration 800 begins the comparison at edge 672. The two triangles (triangles 671 and its neighbor) which share edge 672 are Delaunayian in this configuration as their circumcircles include no other points. However, flipping edge 672 to edge 672a creates a configuration that is not optimal by Delaunayian principles. As shown in mesh configuration 800a, the revised triangles 671 and its neighbor are not Delaunayian. The circumcircle for revised triangle 671a now includes point 801 from its neighbor. The distance into which the point 801 falls into the circumcircle is indicated by the distance value d (678). The distance value d represents the error value for the edge in the Delaunayian checking procedure. During the checking procedure, the system will compute a d value for each edge (e.g., edges 672–677). The processor will then flip the edge with the smallest value. That flip will add the smallest amount of error to the system.

In addition to the procedure to check for edge error by Delaunayian optimality principles, the system of the present invention also permits the checking for error by using data dependent criteria such as normal information. FIG. 21 depicts an exemplary data point 680 which is linked to six edges and six triangles in a mesh configuration 679. Associated with each triangle are a number of points which have been deleted from the mesh whose normals are indicated on the figure. In determining which of the six edges to flip, the processor begins comparing the normals of the triangles against the normals of the data points associated with the triangles. For each triangle the processor computes a distance value representing the angular distance that exists between the normal for the triangle and the averaged normal for the data points. For example, in FIG. 21 triangle normal 681 will be compared against the average of all of the normals associated with triangle 682 (see set of normals 683) and, further, normal 684 will be compared against the averaged value of all the normals associated with triangle 686. The present invention then combines the two distance values for the two triangles into a single value for comparison against the mesh configuration when the processor flips edges between the triangles in FIG. 21. Mesh configuration 679a depicts the triangles 682 and 686 after the processor flips the shared edge. The processor must execute the same normal comparison process for these two new triangles and sum the value for each triangle together. The processor will then subtract the value of the new triangle configuration from the value of the old triangle configuration. That value represents the error that shall be incurred for that edge flip. The processor will calculate a similar error value for each other edge connected to the data point to be removed. The edge with the lowest error value is the edge the process will flip.

Referring again to FIG. 19, the processor uses the error calculation functions described above to determine an error value for each error examined in the loop 656. As each edge is evaluated, if the error value calculated for the error is the lowest, the processor will allow the edge to be the edge with the least error (see step 662). The process loops in step 664 until the computer processes all the edges connected to the data point.

Moving out of that loop in step 667, the processor executes a flip for the link with the lowest error. The flip function executes a set of changes in the data structure replacing an edge shared by two triangles with an edge connecting the unshared vertices of the two triangles. An exemplary flip function which is suitable for the flip function of the present invention was described in U.S. patent application Ser. Nos. 08/730,980 and 08/730,979 which are expressly incorporated herein by reference. After executing the flip, the present invention will place an indication of the flip on the history list.

It is noted that when removing points in the down resolution construction process, the present invention stores information concerning the removed data point and the history of flips on the insert list 150 and the history list 152 in an order that is the reverse of the order by which the up resolution process 131 added data to these lists. In an exemplary embodiment, the down resolution process builds the insert list 150 and history list 152 so that the important details will always be inserted first. In step 668, the processor loops to step 654 to continue flipping links until the mesh can be transformed into a state which will all other data point removal. The processor may make one, two or more flips until only three edges remain connected to the data point in question.

However, after that flipping procedure, there still may be some clean-up work to do. After flipping to transform the mesh for point removal, the processor moves to step 669 to execute a second loop which will determine if the flips just taken will require any further adjustments to the mesh. As noted, a flip to remove a point may take the mesh out of an optimal state. In making flips to remove a point from the mesh, it will also be necessary to check the triangles in the area around the flips to determine if the mesh needs adjustment to maintain its optimal construction. When an edge is flipped in the process described above, the flip will disconnect one data point from its edge relationship with the point to be removed (e.g., in FIG. 20 point 656 is now disconnected from point 640). For each disconnected point 668, the processor will execute a flip propagation loop after the flip, moving each disconnected point to this point to perform the evaluation of error similar to steps 656–667 above. For each edge that is connected to the disconnected point, the procedure first performs the error calculation either by Delaunayian or normals and then executes a hypothetical flip for that edge and computes the error value. If the error is less after the flip, the processor will leave the edge flipped (or actually flip the edge) and then go on to repeat the procedure for the newly disconnected point. The procedure at step 669 continues this way until each newly disconnected edge has been flipped. The processor places indications of all flips on the history list 152.

As an overall process, the down resolution construction operates in a way similar to the up resolution construction process—removing points until a desired resolution is achieved, and building a history file that permits dynamic resolution. FIG. 22 depicts an exemplary process flow for the for the down resolution construction process.

Mesh Construction Using 2D Data

In addition to its use with 3D spatial and texture map data, the teachings of the present invention can also be used with 2D data to create mesh constructions from 2D bitmap images such as digitized photographs, film frames and other images.

FIG. 23a depicts a digitized photographic image. As stated above a digitized photographic image is typically stored in bitmap format and consists of a 2D array of pixels with each pixel having a color value such as a 3 byte (24 bit) or 1 byte (8 bit) R, G, B color assignment. The computer system 3 of the present invention can transform the bitmap pixel assignments of a 2D photographic image into a mesh model construction with a resolution of detail which can be dynamically increased or decreased. FIG. 23b depicts a mesh model constructed using the system of the present invention from the bitmap of 23a. Using the insertion list and history list (as described above) down resolution can also be supported in the meshing of 2D images.

The technique above for constructing a 6D mesh can also be used to construct a mesh using 5D data points. The processor can combine the X, Y and R, G, B values of the bitmap image and these values can be used to create meshes using the up resolution and down resolution construction processes described above. The meshes created by these processes will have dynamic resolution capabilities, and detail can be added to and removed from the mesh using the up/down resolution toggle function 136. In addition to the processes described above, it is also possible to build a mesh construction of an image with dynamic resolution capabilities using the exemplary algorithm of FIG. 24, using a rasterization process to compare the pixel values of the triangle against the color values which would be generated by the triangles of the mesh rather than a geometric/color distance function or a normal distance function to determine points of significance. As can be seen above in reference to the rasterization process set forth above in FIG. 8, the rasterization process can generate color or other values interpolating them from the known values of triangle points.

Referring to FIG. 24, the processor creates an initial mesh into which it will insert data points from the bitmap image to create the mesh (step 700). In the exemplary embodiment, the initial mesh will have a two triangle configuration made from four points which match or exceed the bounds of the image. For example, if a bitmap image is of size 640×480 in dimension, the X, Y coordinates of the initial mesh (stored in a data structure equivalent to the 6D data point list above) will be sized to contain that image. The four selected points will create a flat, rectangular plane consisting of two triangles. Additionally, the mesh structure can include one or more Steiner points outside of the bounds of those four points to speed processing. For each of the initial four points of the plane mesh, the processor will also select R, G, B coordinates for the initial mesh data points so that the mesh has an initial color which will serve as the point of comparison when determining whether to add R, G, B values from the bitmap image.

In step 702, the processor begins a loop (steps 704, 706, 710, 711, 712, 714, 716) to incrementally insert points and construct a 5D data point mesh for a 2D bitmap image. In step 702, the processor will incrementally insert data points according to any user-defined threshold. For example, the processor may insert points until the mesh contains the desired number, or until the comparison distance between any bitmap pixel point and its counterpart in the mesh fall below a given threshold, the "comparison distance" being the distance between the colors of the pixels of the bitmap image and the area of the mesh triangle which corresponds to that pixel. The rasterization process uses the R, G, B values of the mesh triangle to generate, a la Gouraud, a set of color values that correspond to each pixel in the bitmap image which would be bounded by the mesh triangle, pixel by pixel, within the bounds of the triangle. The process compares the R, G, B values of the bitmap pixel against the corresponding R, G, B value rasterized from the coordinates of the mesh triangle. The difference between the bitmap and rasterized R, G, B values can be measured by many difference functions such as by:

$$\text{difference}=\sqrt{d_R^2+d_G^2+d_B^2}$$

or $$\text{difference}=L_R|d_R|+L_G|d_G|+L_B|d_B|$$

Where $d_R$, for example, denotes the difference in red coloring between the actual pixel and the Gouraud approximation, and where $L_R$, for example, denotes the luminescence value of the color red.

In the rasterization step 708, the process compares each pixel value in the bitmap with a corresponding rasterized value until for that triangle the processor finds the pixel with the largest distance value. In step 710, the processor inserts the bitmap data point into the mesh triangle using the process described above with regard to the incremental insert function. The insertion of the new point alters the mesh face into which a bitmap point was inserted. The insertion also creates two new faces. The process in step 717 places references to each altered point and the associated face and new faces are placed in the recalculation list (712). The recalculation list for this process is constructed as a stack for later processing. This allows faces where there have been substantial insertion activity to be processed first. After the point insertion, the processor proceeds to step 714 to check the mesh structure for optimal construction using, e.g., Delaunayian checking routines as described above. For each flip made during the checking procedure, the processor places an indication of that change on the history list 152. In addition, if the flipping process changes any face, the processor will place a reference to that face on the recalculation list (step 720).

In step 718, the processor loops to step 704 where it will process each face inserted on the recalculation list stack. The process continues until the process has inserted the desired number of points or until the resolution of the mesh has increased until the distance between any bitmap data point and its rasterized mesh counterpart does not surpass a set threshold.

Rendering Images From the Meshes Using Triangle Strips

To display a triangulation, the faces of the mesh must be "walked" to read each and every triangle exactly once for display. In the exemplary embodiment, there are two "iterators" for walking across the mesh in the aforementioned fashion: face iterators and strip iterators.

Face iterators use the same algorithm as that promulgated in U.S. patent application Ser. No. 08/730,980 to order the data points for rapid mesh generation and to visit each triangle in a mesh at a given mesh resolution once and only once. Each triangle is then sent to the display system as a display structure or command without regard to its position or connectivity in the overall mesh. The shared per-vertex information (position, color, normals, etc.) and the use of a standard graphics techniques such as like Gouraud shading allow the display to seem smooth and continuous even though the faces are being sent individually.

Strip iterators, on the other hand, send continuously connected "strips," called "tristrips" in standard computer graphics, to the display engine. The strips are a series of connected triangles, where the first one is specified by three vertices, and each successive one is specified by an additional vertex in an alternating left and right manner, such that a tristrip of n vertices describes n−2 triangles.

Tristrips are more efficient than triangles, because they use less bandwidth, and hence less rendering time, for the same number of faces. In the exemplary embodiment, tristrips have a range of 1–50 triangles, with a median of 5 (though results can vary widely depending on the initial data and connectivity).

Multiresolution modeling may employ the stripification process in realtime as follows. First, the processor generates a linked list of tristrips using the ordering algorithm above, terminating one strip and starting a new one whenever the algorithm's traversal from one triangle to the next (at the highest resolution of the mesh) violates the ordering required for tristrips. Subsequently, the processor maintains strips and maximizes strip length by performing edge flips and by reconnecting severed links between strips when points are added or removed.

In the exemplary embodiment, it is also possible to use tristrips and trifans in conjunction with a slightly modified initial construction. Trifans are similar to tristrips, except that the first vertex is always used by every triangle in the fan.

The invention continues as described above. The above described embodiment of the invention is meant to be representative only, as certain changes may be made therein without departing from the clear teachings of the invention. Accordingly, reference should be made to the following claims which alone define the invention.

We claim:

1. A computer based system for combining a set of spatial coordinate data points from a mesh model describing a three dimensional object or surface and a two dimensional color map of the same object or surface into a set of data points containing both spatial and color data, the system comprising:

(a) the spatial mesh generation element to generate a mesh model using a set of data points containing the spatial coordinate data of the object or surface;

(b) a linking element to link the three dimensional spatial data points to the corresponding color data in the texture map to create a set of data points containing both color and spatial data for those three dimensional spatial data points contained in the original spatial mesh model; and (c) an interpolation element to assign spatial coordinates to at least some of the remaining texture map data points which do not correspond to the three dimensional spatial data points contained in the original spatial mesh model resulting in a set of data points containing both spatial and color data of the object or surface to be modeled.

2. The system of claim 1, further comprising:

(d) an increasing resolution element to insert data points into the mesh model based on the significance of the data points in describing details of the object to be depicted.

3. A computer based method for combining a set of spatial coordinate data points from a mesh model describing a three dimensional object or surface and a two dimensional color map of the same object or surface into a set of data points containing both spatial and color data, comprising:

(a) generating an initial spatial mesh model using a set of data points containing the three dimensional spatial coordinate data of the object or surface;

(b) linking the three dimensional spatial data points to the corresponding color data in the texture map to create a set of data points containing both color and spatial data for those three dimensional spatial data points contained in the initial spatial mesh model; and (c) assigning spatial coordinates to at least some of the remaining texture map data points which do not correspond to the three dimensional spatial data points contained in the initial spatial mesh model resulting in a set of data points containing both spatial and color data of the object or surface to be modeled.

* * * * *